(12) United States Patent
Oshita et al.

(10) Patent No.: US 8,158,226 B2
(45) Date of Patent: Apr. 17, 2012

(54) PAPER CONTAINER

(75) Inventors: Tatsuya Oshita, Kurashiki (JP); Goki Uehara, Kurashiki (JP); Manabu Shibata, Kurashiki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 0 days.

(21) Appl. No.: 11/909,562

(22) PCT Filed: Mar. 24, 2006

(86) PCT No.: PCT/JP2006/306002
§ 371 (c)(1),
(2), (4) Date: Dec. 4, 2008

(87) PCT Pub. No.: WO2006/104053
PCT Pub. Date: Oct. 5, 2006

(65) Prior Publication Data
US 2009/0297741 A1    Dec. 3, 2009

(30) Foreign Application Priority Data

| Mar. 25, 2005 | (JP) | 2005-087370 |
| Mar. 25, 2005 | (JP) | 2005-087371 |
| Mar. 30, 2005 | (JP) | 2005-096784 |
| Mar. 30, 2005 | (JP) | 2005-096786 |
| Mar. 31, 2005 | (JP) | 2005-101470 |
| Jun. 3, 2005 | (JP) | 2005-164318 |
| Jun. 3, 2005 | (JP) | 2005-164319 |
| Jun. 3, 2005 | (JP) | 2005-164320 |

(51) Int. Cl.
*B32B 27/10* (2006.01)
*B32B 27/06* (2006.01)
*B32B 29/00* (2006.01)
*B32B 9/04* (2006.01)
*B05D 3/02* (2006.01)
*B05D 3/10* (2006.01)

(52) U.S. Cl. .................. 428/35.2; 428/35.7; 428/411.1; 428/537.5; 427/372.2; 427/331

(58) Field of Classification Search .................. 428/34.2, 428/34.1, 35.7, 411.1, 537.5; 427/331, 372.2; 229/162.1; 206/776
See application file for complete search history.

(56) References Cited

U.S. PATENT DOCUMENTS 5,725,958 A * 3/1998 Matsuda et al. .............. 428/446
(Continued)

FOREIGN PATENT DOCUMENTS
EP    0 240 571 A1    10/1987
(Continued)

OTHER PUBLICATIONS

Machine Translation JP 2003-292713 (Oct. 2003).*
(Continued)

*Primary Examiner* — Rena Dye
*Assistant Examiner* — Erik Kashnikow
(74) *Attorney, Agent, or Firm* — Oblon, Spivak, McClelland, Maier & Neustadt, L.L.P.

(57) ABSTRACT

Provided is a paper container having a window and being formed of a laminate that includes at least a paper layer and a gas barrier laminate, the paper layer having a cutout part for the window, the cutout part being covered with the gas barrier laminate, and the gas barrier laminate including a substrate and a gas barrier layer laminated on at least one surface of the substrate, wherein the gas barrier layer is formed of a composition containing a polymer having at least one functional group selected from a carboxyl group and a carboxylic anhydride group, and wherein —COO— groups contained in the at least one functional group are neutralized at least partly with a metal ion having a valence of two or more.

21 Claims, 6 Drawing Sheets

U.S. PATENT DOCUMENTS

| | | |
|---|---|---|
| 6,596,807 B2 | 7/2003 | Oshita et al. |
| 2002/0048680 A1 | 4/2002 | Yamanaka |
| 2005/0131162 A1 | 6/2005 | Tanaka et al. |
| 2007/0111005 A1 | 5/2007 | Oshita et al. |
| 2009/0030126 A1 | 1/2009 | Uehara et al. |

FOREIGN PATENT DOCUMENTS

| | | | |
|---|---|---|---|
| JP | 57-030745 | | 6/1982 |
| JP | 62 94834 | | 6/1987 |
| JP | 62-094834 | | 6/1987 |
| JP | 62 158677 | | 7/1987 |
| JP | 3-3532 U | | 1/1991 |
| JP | 7-118543 | | 5/1995 |
| JP | 7-308994 | | 11/1995 |
| JP | 8-099390 | | 4/1996 |
| JP | 8 99390 | | 4/1996 |
| JP | 8-142256 | | 6/1996 |
| JP | 9-239911 | | 9/1997 |
| JP | 9-262943 | | 10/1997 |
| JP | 10-122477 | | 5/1998 |
| JP | 10-194273 | | 7/1998 |
| JP | 10 244613 | | 9/1998 |
| JP | 10-244613 | | 9/1998 |
| JP | 10-249987 | | 9/1998 |
| JP | 10237180 | | 9/1998 |
| JP | 11-129380 | | 5/1999 |
| JP | 11-508502 | | 7/1999 |
| JP | 11 227752 | | 8/1999 |
| JP | 11-227752 | | 8/1999 |
| JP | 11-256094 | | 9/1999 |
| JP | 11-257574 | | 9/1999 |
| JP | 2000-211674 | | 8/2000 |
| JP | 2000-233478 | | 8/2000 |
| JP | 2001-328681 | | 11/2001 |
| JP | 2002-080028 | * | 3/2002 |
| JP | 2002-138109 | | 5/2002 |
| JP | 2002-294153 | | 10/2002 |
| JP | 2002 326303 | | 11/2002 |
| JP | 2003-54537 | | 2/2003 |
| JP | 2003-112719 | | 4/2003 |
| JP | 2003 112719 | | 4/2003 |
| JP | 2003-191364 A | | 7/2003 |
| JP | 2003 292713 | | 10/2003 |
| JP | 2003-292713 | | 10/2003 |
| JP | 2004-314563 A | | 11/2004 |
| JP | 2005-8160 | | 1/2005 |
| JP | 2005-40489 | | 2/2005 |
| WO | WO 97/02140 | | 1/1997 |
| WO | 03 091317 | | 11/2003 |

OTHER PUBLICATIONS

Machine Translation of JP 411227752 (Aug. 1999).*
Machine Translation of JP 2002-326303 (Nov. 2003).*
Machine Translation of JP 2002-080028 Mar. 2002.*
U.S. Appl. No. 12/768,485, filed Apr. 27, 2010, Oshita, et al.
Japanese Office Action issued Sep. 6, 2011, in Patent Application No. 2006-082952 (with English-language translation).
Japanese Office Action issued Sep. 6, 2011, in Patent Application No. 2006-082953 (with English-language translation).

* cited by examiner

PAPER CONTAINER

TECHNICAL FIELD

The present invention relates to a paper container that has excellent gas barrier properties and a window through which the contents can be checked. The present invention also relates to a paper container including a paper layer, with the paper container having excellent gas barrier properties and heat resistance that allows the paper container to be resistant to a retort sterilization process. These paper containers of the present invention also are suitable for microwave oven heating.

BACKGROUND ART

Conventional known paper containers with a window are, for example, those described in Patent Document 1, Patent Document 2, and Patent Document 3. Patent Documents 1 to 3 each describe a paper container with a paper layer provided with a cutout part that is covered with a transparent material. In Patent Document 1, however, there is no description about a gas barrier material. On the other hand, Patent Documents 2 and 3 each describe that a cutout part is covered with a gas barrier material. The gas barrier material described in Patent Document 2 is a metal oxide-deposited, biaxially-oriented plastic film, and examples of the gas barrier material described in Patent Document 3 include films of, for example, polyvinyl alcohol and a saponified ethylene-vinyl acetate copolymer, films formed by coating, for example, polyethylene terephthalate, polyamide, polyvinyl alcohol, or a saponified ethylene-vinyl acetate copolymer with polyvinylidene chloride, and films subjected to vapor deposition of an inorganic material, such as silicon oxide or aluminum oxide.

Recently, however, with an increase in applications of paper containers where increasingly higher barrier properties are required, sufficiently high gas barrier properties for such applications cannot be obtained by films of, for example, polyvinyl alcohol and a saponified ethylene-vinyl acetate copolymer, or films formed by coating, for example, polyethylene terephthalate, polyamide, polyvinyl alcohol, or a saponified ethylene-vinyl acetate copolymer with polyvinylidene chloride. In the films obtained by vapor depositing an inorganic material such as silicon oxide or aluminum oxide on, for example, polyethylene terephthalate, polyamide, polyvinyl alcohol, or a saponified ethylene-vinyl acetate copolymer, since the inorganic material layer lacks in flexibility, defects tend to be caused when they are subjected to bending or impact and the gas barrier properties may be deteriorated during the production or transportation of the containers. Accordingly, they are not satisfactory in terms of productivity, and they also lack in reliability as containers.

A laminate in which paper is used as a substrate and one surface to be located on the inner side of the container or both surfaces thereof are laminated with low density polyethylene having, for example, heat adhesiveness and water resistance is used for a paper container. When a paper container is to be subjected to a retort sterilization process, heat-resistant polyolefin such as linear low density polyethylene resin, high density polyethylene resin, or polypropylene resin that has high heat resistance and heat adhesiveness is selected instead of the low density polyethylene.

Furthermore, a laminated material is described in Patent Document 4, in which aluminum, aluminum oxide coating, silica coating, metalized oriented polyester, metalized oriented polypropylene, metalized (usually with aluminum) oriented polyester, metalized (usually with aluminum) oriented polypropylene, ethylene/vinyl alcohol, or polyvinyl alcohol is included as a barrier layer when a paper container is required to have gas barrier properties.

However, when aluminum, aluminum oxide coating, silica coating, metalized oriented polyester, or metalized oriented polypropylene is used for a gas barrier layer, there is a problem in that since the gas barrier layer does not have sufficiently high durability against bending during formation thereof, the gas barrier layer has poor formability and pinholes tend to be formed during the formation of paper containers to impair the barrier properties thereof considerably. Furthermore, in the case of using aluminum, there is a problem in that when the paper container is disposed by, for example, incineration, aluminum remains and therefore it is not suitable in terms of disposal. Furthermore, there also is a disadvantage in that the contents cannot be warmed with a microwave oven in the case of a product including food packaged in a paper container in which metal such as aluminum is used.

On the other hand, when, for example, ethylene/vinyl alcohol, ethylene/vinyl alcohol containing polyvinyl alcohol, or polyvinyl alcohol is used, it has a certain degree of durability against bending but the gas barrier properties thereof degrade in the wet condition. Accordingly, when it is subjected to a process in a high-temperature water-wet condition, such as a retort process, the gas barrier properties tend not to be exhibited satisfactorily.

As described above, currently there are no paper containers that can be subjected to a retort process, that have a high forming processability, and that have sufficiently high gas barrier properties in various shapes.

Conventionally, heat insulators containing polyurethane foam have been used as heat insulation materials for refrigerators and insulation panels for insulated walls for housing. Recently, however, a vacuum heat insulator composed of a gas barrier laminate film and a core material is used as a better material that replaces the above-mentioned heat insulators. Mainly, aluminum foil is used as a gas barrier material but aluminum is a good conductor of heat. Therefore the phenomenon that heat transfers through the aluminum portion of a laminate film, i.e. so-called "heat bridge" occurs and thereby the heat insulation performance is deteriorated.

In order to solve the problem of heat bridge, there are attempts to reduce the thickness of the metal layer and to use a gas barrier material having a gas barrier layer formed using metal oxide instead of metal. In other words, there is a method in which a gas barrier material including a deposited layer as a gas barrier layer is used, wherein the deposited layer is formed by vapor depositing metal such as aluminum or metal oxide such as silica or alumina on the surface of a film such as a polyester film or an ethylene-vinyl alcohol copolymer film. For example, Patent Document 5 describes a vacuum heat insulator including a gas barrier layer formed by vapor depositing aluminum on a film made of ethylene-vinyl alcohol copolymer resin.

However, pinholes tend to be formed in deposited layers obtained by the vapor deposition method, and defects such as pinholes tend to occur in deposited layers in producing laminate films or transporting the products. As a result, the gas barrier properties are poor and are not exhibited stably, and thereby there is a problem in reliability.

In order to solve such a problem, Patent Document 6 proposes a vacuum heat insulator including a gas barrier material having a gas barrier layer composed of resin and an inorganic layered compound that is used on top of a deposited layer formed of a compound of metal such as alumina that has been deposited on a substrate resin. However, the gas barrier properties thereof are still not sufficiently high and the heat insulating effect cannot be maintained satisfactorily over a long period of time.

Conventionally, glass containers that are excellent in transparency, storage stability, and heat resistance are used as infusion containers. However, glass containers have problems in that, for instance, they tend to be damaged by impact, are heavy, tend to generate glass flakes, and generate insoluble fine particles. Plastic containers have come to be used widely as infusion containers, since they solve these problems. There are plastic infusion containers in the form of a bag and those in the form of a bottle.

Infusion bags in the form of a bag are made of, for example, polyolefin resin such as polyethylene or polyvinyl chloride resin. The polyolefin resin cannot be considered to have sufficiently high gas barrier properties and has a problem in that infusion solutions such as amino acid preparations, glucose preparations, fat emulsion preparations, or electrolyte solutions, with which the infusion bags are filled, tend to be deteriorated by gas such as oxygen. Since the polyvinyl chloride resin contains additives such as a plasticizer and a stabilizer, there is a fear of elution thereof. As described above, there is a problem in that the polyolefin resin has poor gas barrier properties.

Accordingly, when a drug solution such as the above-mentioned amino acid is enclosed, the outer side of an infusion bag made of, for example, polyolefin was double-packaged with a bag having gas barrier properties that have been prepared separately, i.e. with an outer packaging material such as a multilayer film formed using ethylene-vinyl alcohol copolymer resin and polyvinylidene chloride as constituent materials, for instance, a multilayer film formed of a polyester layer/ethylene-vinyl alcohol copolymer layer/non-oriented polypropylene layer (see, for instance, Patent Document 7). However, in the method in which a separate outer packaging material is used, once the outer packaging material is opened, for example, for mixing a drug solution thereinto, air tightness is lost. Accordingly, the content thereof needs to be used within a short period of time thereafter. For such usage, it is desired that gas barrier properties be imparted to infusion bags themselves.

Methods of imparting the gas barrier properties to infusion bags themselves also are proposed in, for example, Patent Document 8 and Patent Document 9. Patent Document 8 describes an infusion bag formed using a polyamide resin. However, such polyamide resin does not have sufficiently high barrier properties for applications that require a high degree of gas barrier properties and tends to have degraded barrier properties when being subjected to high temperature steam sterilization. Patent Document 9 descries an infusion bag whose outer surface is provided with a gas barrier coating material layer formed thereon, which is then coated with a protectant. However, the barrier layer described therein, for example, deposited alumina or silica, has poor flexibility. Accordingly, there are concerns that the bag is damaged during transportation or handling thereof and the barrier properties are degraded. Furthermore, when EVOH, PVA, or PVDC is subjected to high temperature steam sterilization, barrier properties thereof are degraded. Moreover, since PVDC contains chlorine, care needs to be taken during disposal and incineration thereof.

Recently, containers with a cover, each of which is composed of a cover member and a cup or tray having a flange portion, are used often as containers for preserving contents such as foodstuffs. In these containers with a cover, it is necessary to impart oxygen gas barrier properties not only to the containers such as cups or trays but also to cover members depending on the type of contents. Therefore it has been proposed conventionally to use, as a cover member, a laminate including another film laminated on a film with excellent oxygen gas barrier properties such as a film formed of polyvinylidene chloride resin (hereinafter described as a "PVDC film"), a film formed of an ethylene-vinyl alcohol copolymer (hereinafter described as a "EVOH film"), or a deposited film having a deposited layer of an inorganic material such as silica, alumina, or aluminum on a substrate film (hereinafter described as a "deposited film"). For example, Patent Documents 10, 11, and 12 describe a cover member including a PVDC film, a cover member including an EVOH film, and a cover member including a deposited film, respectively.

When a PVDC film is used for a cover member, the oxygen barrier properties thereof may meet desired performance although it also depends on the contents to be packaged in the container with a cover. However, when it is disposed as waste after being used as a cover member, there is a problem in that, for example, it causes poisonous gas such as dioxin to be generated upon incineration and therefore the environmental suitability is impaired.

Furthermore, when an EVOH film is used, it exhibits excellent oxygen barrier properties in a low humidity atmosphere. However, there is a problem in that when the EVOH film absorbs moisture, the oxygen barrier properties thereof are degraded.

Moreover, when a deposited film is used, there is a problem in reliability to gas barrier properties, that is, an inorganic deposited layer that serves as a gas barrier layer tends to crack and have degraded gas barrier properties. Gas barrier properties may be degraded due to, for example, cracks caused in a printing process or a lamination process through which a multilayer laminate is produced with a deposited film and another film, or cracks caused in a gas barrier layer due to vibrations during transportation when a number of containers with a cover are to be transported, with respective containers with a cover being stacked together.

Laminate tube containers that are used for packaging cosmetics, chemicals, pharmaceutical agents, toiletry articles such as toothpastes, and foodstuffs such as a mustard paste and a green horseradish paste are required to have excellent gas barrier properties and aroma retention properties. Accordingly, laminate materials formed using a resin film having aluminum foil or a deposited aluminum layer are often used conventionally. However, since the laminate material cannot be made transparent, the design of packaging materials is limited. Furthermore, since it is difficult to see the contents through it, it is not easy to check, for example, deterioration or remaining amount of the contents and further it was inconvenient for squeezing all the contents out thereof. Moreover, when the tube containers are used as packaging containers and thereafter are disposed as waste, since aluminum remains, they lack disposability and remaining aluminum damages incinerators, which are problems.

Examples of the gas barrier film having transparency and excellent disposability include a transparent deposited film having a deposited layer formed of inorganic oxide by a vacuum vapor deposition method, a film formed using polyvinylidene chloride resin, and a film formed using an ethylene-vinyl alcohol copolymer. These films also are used for laminate tube containers (see, for instance, Patent Documents 13 and 14).

However, the transparent deposited films tend to have defects such as cracks caused in a deposited layer that serves as a gas barrier layer in the processes for manufacturing a laminate tube container, for example, a printing process and a lamination process. Furthermore, when the laminate tube containers are squeezed, defects such as cracks also tend to be caused. As a result, the transparent deposited film has poor gas barrier properties.

The film formed using polyvinylidene chloride resin has a problem from an environmental viewpoint because when the laminate tube container is used as a packaging container and is then incinerated as waste, harmful gas such as dioxin may be generated.

The ethylene-vinyl alcohol copolymer is an excellent barrier film from all of the viewpoints of gas barrier properties, transparency, and environmental friendliness. However, the ethylene-vinyl alcohol copolymer has a problem in that when it absorbs moisture, the gas barrier properties thereof are degraded.

Conventionally, vacuum packaging characterized in that contents such as corn on the cob, tea leaves, coffee beans, meat, fish, and confectionery each are enclosed in a bag-type article and then the inside thereof is deaerated under reduced pressure has been employed widely as an effective method for preventing chemical changes and microbial changes of the contents to preserve them for a long period of time. Although heat sterilization is carried out after vacuum packaging in many cases, another method also may be employed in which contents are vacuum-packaged in a sterile state and are not subjected to heat sterilization. In both cases of carrying out and not carrying out heat sterilization, in order to prevent the microbial changes and chemical changes for a long period of time after vacuum packaging, the inside of the packaging material needs to have a low oxygen concentration, and therefore a material that has high gas barrier properties and can change its shape easily according to the contour of foodstuffs is used as a material for vacuum packaging.

Such materials for vacuum packaging having high gas barrier properties that have been used up to now include laminates, each of which has, as a gas barrier layer, a polyvinylidene chloride resin layer, a saponified ethylene-vinyl acetate copolymer (EVOH) layer, an aluminum foil layer, or a deposited layer formed of, for example, silicon oxide or aluminum oxide. However, all the laminates have the problems described below and are not satisfactory as materials for vacuum packaging. Recently, there is a tendency to refrain from using the laminates including an aluminum foil layer and those including a polyvinylidene chloride resin layer in consideration of the environment. The laminate containing aluminum foil and the laminate including a polyvinylidene chloride resin layer have the following problems, respectively. When the laminate containing aluminum foil is incinerated after use, the aluminum foil remains as a residue. When the laminate including a polyvinylidene chloride resin layer is incinerated after use, a harmful compound containing chlorine may be generated. Furthermore, the following problems also have been pointed out. That is, the laminate including an aluminum foil layer is not transparent and therefore does not allow the state of contents to be checked or does not allow a metal detector to be used for inspection of the contents.

A laminate including, as a gas barrier layer, a deposited layer formed by vapor depositing inorganic oxide such as aluminum oxide or silicon oxide on a substrate film is transparent and has excellent gas barrier properties. However, cracks and pinholes are generated in the deposited layer due to deformation of the packaging material that occurs during vacuum packaging and thereby the gas barrier properties thereof are degraded. In other words, defects such as cracks and pinholes are caused in the deposited layer due to deformation of the packaging material that occurs according to the contour of contents, or due to bending at the boundary between a heat sealed portion and a portion that comes into contact with the contents. Furthermore, it also has problems in that cracks and pinholes are caused in the deposited layer to degrade the gas barrier properties thereof due to expansion and contraction caused during heat sterilization processing as well as shock and bending caused during handling the packaged products. Accordingly, there are attempts to improve crack resistance and pinhole resistance by further providing a resin layer on a deposited layer. However, the improvement effect thereof is not satisfactory and the use thereof as a vacuum packaging bag is limited at present. A laminate including, as a gas barrier layer, a saponified ethylene-vinyl acetate copolymer (EVOH) layer is excellent in gas barrier properties but has a problem in that the gas barrier properties are degraded by the heat sterilization process following the vacuum packaging.

Vacuum packaging carried out as described above prolongs shelf life of the contents, foodstuffs. However, if the contents are foodstuffs containing solids, the packaging bag is deformed according to the contours of the foodstuffs and also is bent at the boundary between the heat sealed portion and a portion that is in contact with the foodstuffs, and thereby the gas barrier properties are degraded, which results in shorter shelf life of the foodstuffs. At present, there are still no packaging bags that have solved the problems concerning the environment and safety that have been highlighted recently and have solved the aforementioned problems accompanying the vacuum packaging.

Conventionally, liquid agents such as, for example, liquid detergents, shampoos, and conditioners, liquid beverages such as soft drinks, as well as liquid or fluid foodstuffs are packaged in rigid containers such as glass bottles, metal cans, or plastic bottles. However, such containers result in high packaging material cost and have poor disposability because the packaging materials cannot be reduced in volume at the time of disposal. Accordingly, plastic film pouches with a spout part formed in one sealing surface are used widely as lightweight, inexpensive, easy, and simple containers that are used for packaging recently. Pouch containers with a spout include those of a standing type (FIG. 1) and a pillow type (FIG. 2).

The plastic film and layer structure to be employed for a pouch with a spout can be selected according to the properties of contents to be packaged in the pouch. For example, a laminated film with a two-layer structure can be used for a pouch that is required to be produced at low cost, such as a packaging bag for a detergent refill. However, when contents that are required to have storage stability, such as beverages, seasonings, and pouch-packed food are to be packaged, it is preferable to use a laminated film with at least three layers including a barrier layer formed of a film provided with aluminum foil or an inorganic deposited layer, a gas barrier resin film, or a film obtained by coating any one of them.

With respect to a method of imparting gas barrier properties to pouches including a pouch with a spout, a packaging bag formed using a polyamide resin has been proposed (see, for example, Patent Document 8). However, the polyamide resin as described above does not have sufficiently high barrier properties for applications that require a high degree of gas barrier properties and tend to have degraded barrier properties when being subjected to a retort sterilization process. Furthermore, there is a problem in that for example, vinylidene chloride or polyacrylonitrile may become a source of harmful substance at the time of disposal and incineration. Although metal foils are excellent in gas barrier properties, they have problems in that they do not allow contents to be seen through the packaging material to be checked, they do not allow a metal detector to be used for inspection, and they are environmentally undesirable because it is difficult to separate a metal layer from other layers for disposal after use and therefore they have to be treated as an incombustible. Moreover, the use of a plastic film having an inorganic oxide deposited layer such as an aluminum oxide deposited layer or a silicon oxide deposited layer was proposed. An inorganic oxide deposited layer is a thin film with a thickness of up to 800 Å, has transparency, and does not cause any environmental problems because it is treated in the same manner as in the case of printing ink and therefore is not required to be separated for incineration.

However, when these films are bent or impacted accidentally during packaging the contents or distribution, the spout-attached part or heat sealed portion of the spout pouch body, especially an edge portion thereof, may be damaged and the inorganic oxide deposited layer may be cracked, which causes degradations in gas barrier properties and steam barrier properties. In order to prevent the cracks from occurring, various studies are being made about resin coating or film laminate to serve as a protective layer on one surface or both surfaces of the inorganic oxide deposited film. Furthermore, similarly in the case where, for instance, retort cooking sterilization carried out after packaging of the contents causes the inner pressure to increase, the inorganic oxide deposited layer also may be cracked in the vicinity of the portion sealed to form a bag. However, due to its flexibility, a packaging bag formed of a film laminate cannot be prevented from being bent during packaging of the contents or distribution, or cannot prevent tension from occurring due to change in inner pressure during sterilization cooking. Thus there are disadvantages that damage occurs at the spout-attached part or heat sealed portion of the spout pouch body, especially an edge portion thereof, which results in degradation in gas barrier properties of the container.

Patent Document 1 JP 10 (1998)-194273 A
Patent Document 2 JP 2003-054537 A
Patent Document 3 JP 11 (1999)-227752 A
Patent Document 4 JP 11 (1999)-508502 A
Patent Document 5 JP 10 (1998)-122477 A
Patent Document 6 JP 11 (1999)-257574 A
Patent Document 7 JP 09 (1997)-262943 A
Patent Document 8 JP 2001-328681 A
Patent Document 9 JP 2005-040489 A
Patent Document 10 JP 57 (1982)-030745 B
Patent Document 11 JP 09 (1997)-239911 A
Patent Document 12 JP 2005-8160 A
Patent Document 13 JP 11 (1999)-129380A
Patent Document 14 JP 07 (1995)-308994A

DISCLOSURE OF INVENTION

An object of the present invention is to provide a paper container with a window that is easy to produce, does not undergo, for example, degradation in gas barrier properties during transportation thereof, and has excellent gas barrier properties.

Another object of the present invention is to provide a retort paper container that can be subjected to a retort process and has excellent forming processability and excellent gas barrier properties.

In order to achieve the above-mentioned objects, the present inventors made keen studies and as a result, they found the following to complete the present invention. That is, the object is achieved when a paper container formed of a laminate including at least a paper layer is a paper container with a window as shown in, for example, FIGS. 1 and 2, in which the paper layer has a cutout part, the cutout part is covered with a gas barrier laminate, and the gas barrier laminate includes a substrate and a gas barrier layer laminated on at least one surface of the substrate, wherein the gas barrier layer is formed of a composition containing a polymer having at least one functional group selected from a carboxyl group and a carboxylic anhydride group, and —COO— groups contained in the at least one functional group are neutralized at least partly with a metal ion having a valence of two or more.

In other words, the present invention provides a paper container having a window, wherein in a paper container formed of a laminate including at least a paper layer, the paper layer has a cutout part, the cutout part is covered with a gas barrier laminate, the gas barrier laminate includes a substrate and a gas barrier layer laminated on at least one surface of the substrate. The gas barrier layer is formed of a composition containing a polymer having at least one functional group selected from a carboxyl group and a carboxylic anhydride group, and —COO— groups contained in the at least one functional group are neutralized at least partly with a metal ion having a valence of two or more.

Furthermore, the present inventors made keen studies to achieve the above-mentioned object and as a result, they found the following to complete the present invention. That is, it is possible to provide a retort paper container that can be subjected to a retort process and has excellent forming processability and excellent gas barrier properties by employing a gas barrier layer in a paper container including at least a paper layer, a heat-resistant polyolefin layer, and a gas barrier layer, wherein the gas barrier layer is formed of a composition containing a polymer having at least one functional group selected from a carboxyl group and a carboxylic anhydride group, and —COO— groups contained in the at least one functional group are neutralized at least partly with a metal ion having a valence of two or more.

In other words, another aspect of the present invention relates to a retort paper container, wherein in a paper container including at least a paper layer, a heat-resistant polyolefin layer, and a gas barrier layer, the gas barrier layer is formed of a composition containing a polymer having at least one functional group selected from a carboxyl group and a carboxylic anhydride group, and —COO— groups contained in the at least one functional group are neutralized at least partly with a metal ion having a valence of two or more.

DESCRIPTION OF THE PREFERABLE EMBODIMENTS

Figure 1:
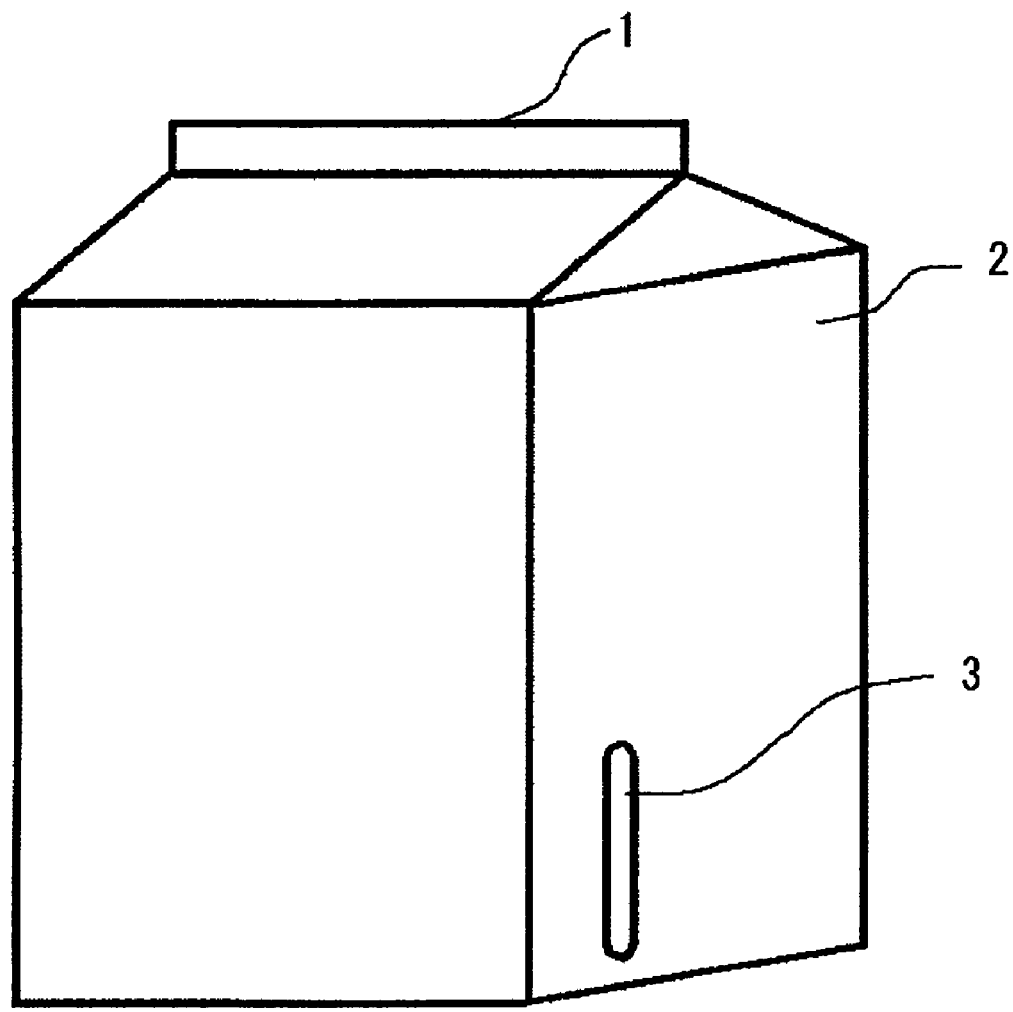
FIG. 1 is a perspective view showing an embodiment of the paper container with a window according to the present invention.
Figure 2:
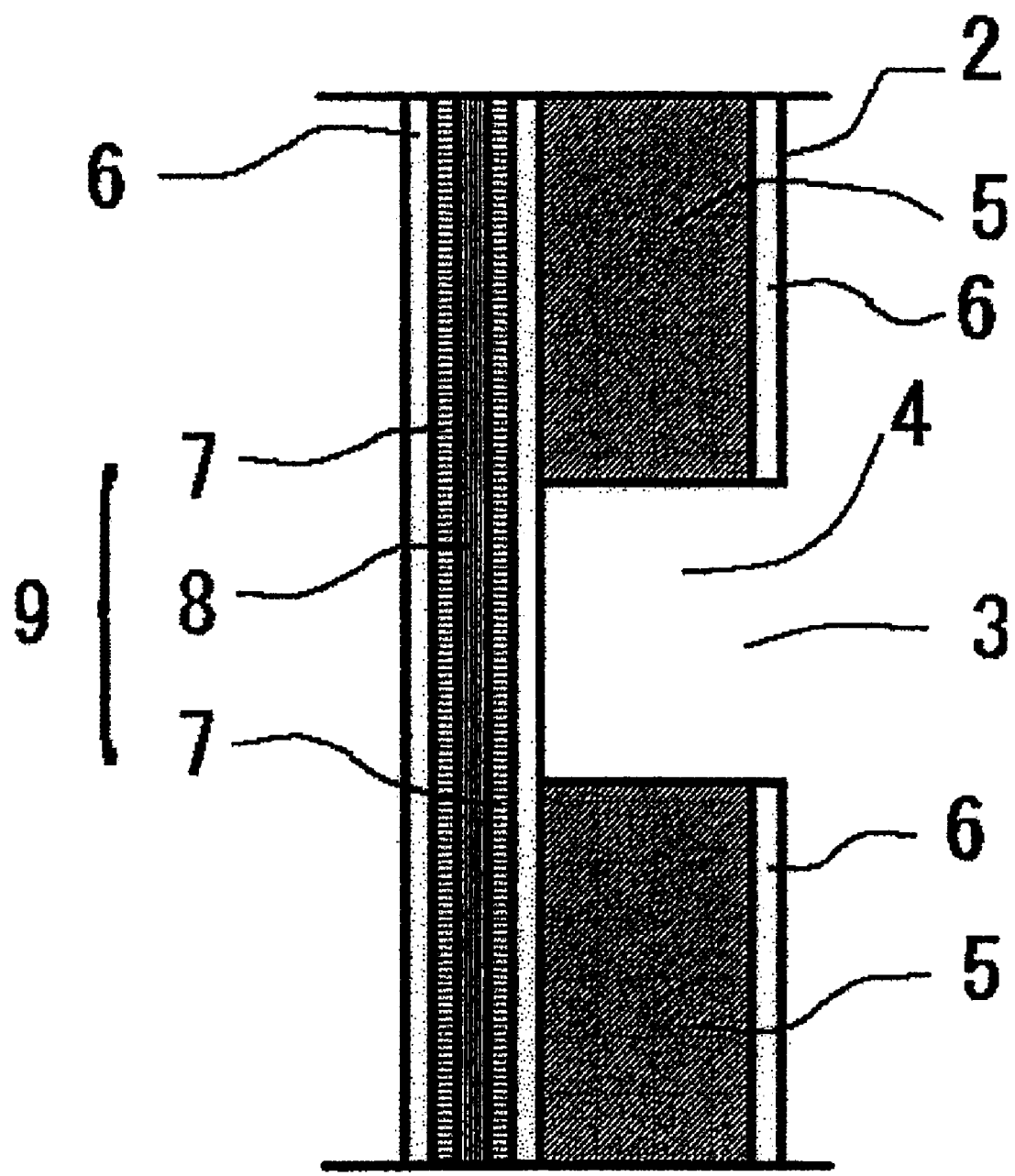
FIG. 2 is a cross-sectional view of a main part showing an embodiment of the paper container with a window according to the present invention.

Hereinafter, embodiments of the present invention are described. In the following description, specific compounds may be described as examples of substances that exhibit specific functions, but the present invention is not limited thereto. Furthermore, the materials described as examples can be used individually or in combination unless otherwise specified.

In the present invention, in a paper container formed of a laminate including at least a paper layer, the paper layer has a cutout part, and the cutout part is covered with a gas barrier laminate. The present invention is characterized in that the gas barrier layer included in the gas barrier laminate is a specific gas barrier layer. Although the details will be described later, this specific gas barrier layer also may be indicated below as a "gas barrier layer of the present invention". Furthermore, it also will be described later in detail that a laminate including the specific gas barrier layer laminated on at least one surface of a substrate also may be indicated as a "gas barrier laminate of the present invention".

First, a paper container to be used for a paper container with a window of the present invention is described. The type of the paper container is not particularly limited. Examples thereof include paper containers of a gable top type, a brick type, a rectangular parallelepiped type, and a circular cone type of a single board type, paper containers of a cup type, paper containers of a spiral type, and paper containers of an insert molding type.

Examples of the laminate including at least a paper layer that is used for the paper container of the present invention include: polyolefin (PO) layer/paper layer/PO layer/laminate including gas barrier layer/PO layer, PO layer/paper layer/PO layer/laminate including gas barrier layer/PO layer/hydroxyl group-containing polymer layer, PO layer/paper layer/PO layer/laminate including gas barrier layer/PO layer/polyester layer, PO layer/paper layer/PO layer/laminate including gas barrier layer/PO layer/polyamide layer, PO layer/paper layer/PO layer/biaxially-oriented polypropylene (OPP) layer/laminate including gas barrier layer/PO layer, PO layer/paper layer/PO layer/OPP layer/laminate including gas barrier layer/PO layer/hydroxyl group-containing polymer layer, PO layer/paper layer/PO layer/OPP layer/laminate including gas barrier layer/PO layer/polyester layer, PO layer/paper layer/PO layer/OPP layer/laminate including gas barrier layer/PO layer/polyamide layer, paper layer/PO layer/laminate including gas barrier layer/PO layer, paper layer/PO layer/laminate including gas barrier layer/PO layer/hydroxyl group-containing polymer layer, paper layer/PO layer/laminate including gas barrier layer/PO layer/polyester layer, paper layer/PO layer/laminate including gas barrier layer/PO layer/polyamide layer, PO layer/paper layer/laminate including gas barrier layer/PO layer, PO layer/paper layer/laminate including gas barrier layer/PO layer/hydroxyl group-containing polymer layer, PO layer/paper layer/laminate including gas barrier layer/PO layer/polyester layer, paper layer/laminate including gas barrier layer/PO layer/polyamide layer, laminate including gas barrier layer/paper layer/PO layer, laminate including gas barrier layer/paper layer/PO layer/hydroxyl group-containing polymer, laminate including gas barrier layer/paper layer/PO layer/polyester layer, and laminate including gas barrier layer/paper layer/PO layer/polyamide layer. The above-mentioned laminate including a gas barrier layer embraces one formed of a gas barrier layer alone. An adhesive layer can be provided suitably between layers. The above-mentioned respective layers and laminates are described below in further detail.

The paper layer of the laminate including the paper layer is a layer for maintaining the shape retaining properties when a container is formed thereof. When it is used for a beverage container, special properties such as water resistance and oil resistance are required in addition to general properties that are necessary for a rigid container. Generally, for example, a white paperboard, manila board, milk carton paper, cup paper, or ivory paper can be used.

One selected from or a resin composed of at least two selected from resins such as low density polyethylene, medium density polyethylene, high density polyethylene, straight-chain (linear) low density polyethylene, polypropylene, an ethylene-vinyl acetate copolymer, an ethylene-α olefin copolymer, an ionomer, an ethylene-acrylic acid copolymer, an ethylene-methyl acrylate copolymer, an ethylene-methacrylic acid copolymer, and an ethylene-propylene copolymer, or a sheet obtained by forming it into a film can be used for the above-mentioned polyolefin (PO) layers. These polyolefin layers can be either oriented ones or non-oriented ones. Preferable polyolefin layers are resins of low density polyethylene, straight-chain (linear) low density polyethylene, and polypropylene, or sheets obtained by forming them into films. When the paper container with a window of the present invention is subjected to a retort process, a straight-chain (linear) low density polyethylene or polypropylene is preferable. From the viewpoint of ease of forming process, it is preferable that all the PO layers of the laminates described above be formed of non-oriented low density polyethylene, non-oriented straight-chain (linear) low density polyethylene, or non-oriented polypropylene, and particularly the PO layers disposed as the outermost layers and innermost layers of the laminates described above be formed of non-oriented low density polyethylene, non-oriented straight-chain (linear) low density polyethylene, or non-oriented polypropylene.

Furthermore, when the paper container with a window of the present invention is subjected to a retort process, all the PO layers are formed preferably of straight-chain low density polyethylene or polypropylene from the viewpoint of heat resistance, and furthermore they are formed preferably of non-oriented straight-chain low density polyethylene or non-oriented polypropylene and more preferably of non-oriented polypropylene from the viewpoint of ease of forming process.

The method of forming a polyolefin (PO) layer to be employed herein can be, for example, a method of bonding a non-oriented polyolefin film or an oriented polyolefin film that has been prepared beforehand and a film forming another layer to each other by, for example, a well-known dry lamination process, wet lamination process, or hot-melt lamination process, or a method of forming a polyolefin layer on a film forming another layer by, for example, a well-known T-die extrusion method. Moreover, an adhesive layer can be disposed between a polyolefin layer and another layer if necessary. The adhesive layer is formed using, for example, an anchor coating agent, an adhesive, or an adhesive resin. From the viewpoints of, for example, mechanical toughness, impact resistance, and piercing resistance, the thickness of the polypropylene layer is preferably in the range of 10 to 200 μm and more preferably in the range of 20 to 150 μm.

Examples of the laminate including a gas barrier layer, i.e. the laminate including a gas barrier layer that is employed for the part other than the cutout part of the paper layer, include a gas barrier layer alone such as a layer formed of aluminum foil, a deposited layer formed of silicon oxide, a deposited layer formed of aluminum oxide, a layer formed of polyvinyl alcohol, a layer formed of a saponified ethylene-vinyl acetate copolymer, or a gas barrier layer of the present invention, a laminate composed of these gas barrier layers, a laminate including a gas barrier layer having, for example, a deposited layer formed of silicon oxide, a deposited layer formed of aluminum oxide, or a layer formed of polyvinyl alcohol on at least one surface of a substrate, and a gas barrier laminate of the present invention. An adhesive layer can be provided suitably between the substrate and a gas barrier layer. The substrate to be used herein can be the same as that used for the gas barrier laminate of the present invention.

Preferably, the laminate including a gas barrier layer is a gas barrier layer of the present invention from the viewpoints of, for example, gas barrier properties, processability, and impact resistance. More preferably, it includes the same gas barrier layer as that included in the gas barrier laminate with which the cutout part is covered as described later. When the barrier layer of the paper container is identical to the gas barrier laminate with which the cutout part of the paper layer is covered, the container with a window is easy to produce. For instance, after a laminate formed of polyethylene (PE) layer/paper layer/PE layer is produced by the extrusion lamination process beforehand, a cutout part is provided in a predetermined place. On the other hand, a gas barrier laminate of the present invention is laminated by the method described later to produce a laminate formed of PE layer/gas barrier laminate of the present invention/PE layer. Thereafter, both are laminated together and thus a laminate for a paper container with a window can be produced.

The following description is directed to a laminate including the gas barrier laminate of the present invention with which the cutout part of the paper layer is covered. The laminate including a gas barrier laminate with which the cutout part of the paper layer is covered can be provided so as to allow the contents to be checked by cutting out a part of the laminate of a paper container, i.e. a paper layer or a layer including a paper layer and another layer of the layers composing the laminate as described above, or it can be provided to be attached from the outer side of the container or/and the inner side of the container so as to cover the cutout part of the paper layer. Preferably, the laminate including a gas barrier laminate is provided as a part of the laminate composing the paper container.

The following description is directed to a laminate including a gas barrier laminate, which is attached from the outer side of the container and/or the inner side of the container so as to cover the cutout part of the paper layer. In this case, the gas barrier laminate is attached preferably with an adhesive layer formed of polyolefin that is provided for one surface or both surfaces thereof. The adhesive layer formed of polyolefin that is provided for one surface or both surfaces of the gas barrier laminate is not limited as long as it can be bonded thermally to a polyolefin layer provided for the outer layer and/or inner layer of the paper container strongly enough to an extent that prevents the contents from leaking. Preferably, it is an adhesive layer compatible with the polyolefin layer provided for the inner layer of the paper container. This adhesive layer to be used can be selected suitably according to the type of the polyolefin layer provided for the outer layer and/or the inner layer of the paper container.

Specific examples of the laminate including a gas barrier laminate with which the cutout part of the paper layer is covered include a laminate formed of polyolefin layer/gas barrier laminate/polyolefin layer and a laminate formed of a gas barrier laminate/olefin layer. An adhesive layer can be provided suitably between the olefin layer and the gas barrier laminate. Examples of the olefin layer include the same olefin layers indicated as examples in the description of the laminate including a paper layer. Preferable olefins that can be used for the olefin layer are non-oriented low density polyolefin, non-oriented straight-chain low density polyolefin, and non-oriented polypropylene.

An adhesive layer formed of a resin layer that can be bonded thermally to the polyolefin layer can be formed on one surface or both surfaces of the gas barrier laminate of the present invention by suitably using, for example, the well-known T-die extrusion method or dry lamination process. Moreover, for example, an anchor coating agent also can be used if necessary. Furthermore, the sealing sheet may be produced using, for example, a well-known coextrusion method. The thickness of the sealing sheet is preferably 20 to 150 μm from the viewpoints of, for example, mechanical toughness, impact resistance, and piercing resistance.

When the laminate including a gas barrier laminate of the present invention is placed to cover the cutout part of the paper layer from the inner side of the container, a protective sheet may be provided further to cover the laminate. The protective sheet is formed of a thermally adhesive resin layer and serves to protect the laminate including the gas barrier laminate, with which the cutout part is covered, from the contents so that the laminate does not come into contact with the contents. This protective sheet also is not limited, as long as it can be bonded thermally to the thermally adhesive resin layer provided as the inner layer of the paper container strongly enough to an extent that prevents the contents from permeating the laminate. A preferable protective sheet, of course, is one compatible with the thermally adhesive resin layer provided as the inner layer of the paper container.

Accordingly, the protective sheet to be used also can be selected suitably according to the type of the thermally adhesive resin layer provided as the inner layer of the paper container as per the adhesive layer of the laminate. A thermally adhesive resin layer indicated as an example that can be used for the adhesive layer of the laminate, i.e. one selected from or a resin composed of at least two selected from resins such as low density polyethylene, medium density polyethylene, high density polyethylene, straight-chain (linear) low density polyethylene, polypropylene, an ethylene-vinyl acetate copolymer, an ethylene-α olefin copolymer, an ionomer, an ethylene-acrylic acid copolymer, an ethylene-methyl acrylate copolymer, an ethylene-methacrylic acid copolymer, and an ethylene-propylene copolymer, or a sheet obtained by forming it into a film can be used for the protective sheet. A suitable thickness of the thermally adhesive resin layer, the protective sheet, is 50 to 220 μm.

Furthermore, when the protective sheet is thermally bonded to the adhesive layer provided on the content side of the laminate, it is naturally necessary that the protective sheet can be thermally bonded to the adhesive layer provided on the content side of the laminate strongly enough to an extent that prevents the protective sheet from being separated therefrom. Preferable protective sheets are those compatible with the adhesive layer provided on the content side of the sealing sheet. Furthermore, the thermally adhesive resin layer to be provided as the inner layer of the paper container, the adhesive layer formed on the laminate, and the thermally adhesive resin layer to be formed as the protective sheet each can be selected suitably according to the contents or required functions.

When the laminate containing a paper layer is cut out simply, an end of the paper layer appears in the cutout part.

When the end contacts with the exterior of the container, the paper container is damaged from the end of the paper layer. On the other hand, when the end contacts with the contents of the container, water contents permeate from the end of the paper layer. Accordingly, it is preferable that the end of the paper layer be coated with, for example, resin. For example, the following method can be employed as a specific method of coating the end of the paper layer. That is, paper is provided with a cutout part beforehand, and a laminate composed of polyethylene (PE) layer/paper layer/PE layer is produced by the extrusion lamination process. The laminate is pressed before the PE is solidified, and thereby the cutout part of the paper layer allows a PE layer to be bonded to the PE layer located on the opposite side thereto with respect to the paper layer. Thereafter, the PE layer/PE layer of the cutout part of the paper layer is cut out in such a manner as to prevent the end of the paper layer from appearing. Thus, a window part where the end of the paper layer is not exposed can be produced. Similarly, a window part where the end of the paper layer is not exposed also can be produced by the following method. That is, paper is provided with a cutout part beforehand, a hot-melt adhesive is applied to the paper surface by a gravure process, and the cutout part of the paper layer is cut out in such a manner as to prevent the end of the paper layer from appearing.

The retort paper container according to the present invention includes at least a paper layer, a heat-resistant polyolefin layer, and a gas barrier layer. The present invention is characterized in that the gas barrier layer is a specific gas barrier layer.

First, the retort paper container of the present invention is described. The type of the paper container is not particularly limited. Examples thereof include paper containers of a gable top type, a brick type, a rectangular parallelepiped type, and a circular cone type of a single board type, paper containers of a cup type, paper containers of a spiral type, and paper containers of an insert molding type.

The paper layer of the laminate of the present invention is a layer for maintaining the shape retaining properties when a container is formed thereof. When it is used as a beverage container, special properties such as water resistance and oil resistance are required in addition to general properties that are necessary for a rigid container. Generally, a white paperboard, manila board, milk carton paper, cup paper, or ivory paper can be used.

Examples of the resin to be used for the heat-resistant polyolefin layer of the laminate of the present invention include linear low density polyethylene resin, high density polyethylene resin, and polypropylene resin. Polypropylene is used suitably due to high heat resistance thereof. Polypropylene resin has a melting point of at least 100° C., preferably at least 120° C., and further preferably at least 130° C. The polypropylene resin can be a homopolymer of polypropylene, a random copolymer or block copolymer formed through copolymerization of propylene and at least one other monomer, or a polymer formed by graft-polymerizing at least one monomer other than polypropylene onto polypropylene. The tacticity of polypropylene can be any one of, for example, isotactic, atactic, and syndiotactic.

Examples of the monomer that can be copolymerized with propylene include ethylene, 1-butene, 1-pentane, 1-hexene, 1-octene, 1-nonene, 1-decene, 1-undecene, 1-dodecene, 3-methyl-1-butene, 3-methyl-1-pentene, 4-methyl-1-pentene, and 2,2,4-trimethylpentene.

Examples of the monomer that can be graft-polymerized onto polypropylene include acrylic acid, methacrylic acid, glycidyl methacrylate, 2-hydroxyethyl acrylate, 2-hydroxyethyl methacrylate, diethyl maleate, monoethyl maleate, di-n-butyl maleate, maleic acid, maleic acid anhydride, fumaric acid, itaconic acid, itaconic acid anhydride, 5-norbornene-2,3-anhydride, citraconic acid, citraconic anhydride, crotonic acid, crotonic anhydride, acrylonitrile, methacrylonitrile, sodium acrylate, calcium acrylate, and magnesium acrylate.

Examples of the laminate including at least a paper layer, a heat-resistant polyolefin layer, and a gas barrier layer, which is used for the retort paper container, include heat-resistant polyolefin layer/paper layer/heat-resistant polyolefin layer/laminate including gas barrier layer/heat-resistant polyolefin layer, heat-resistant polyolefin layer/paper layer/heat-resistant polyolefin layer/laminate including gas barrier layer/heat-resistant polyolefin layer/hydroxyl group-containing polymer layer, heat-resistant polyolefin layer/paper layer/heat-resistant polyolefin layer/laminate including gas barrier layer/heat-resistant polyolefin layer/polyester layer, heat-resistant polyolefin layer/paper layer/heat-resistant polyolefin layer/laminate including gas barrier layer/heat-resistant polyolefin layer/polyamide layer, heat-resistant polyolefin layer/paper layer/heat-resistant polyolefin layer/biaxially-oriented, heat-resistant polyolefin layer/laminate including gas barrier layer/heat-resistant polyolefin layer, heat-resistant polyolefin layer/paper layer/heat-resistant polyolefin layer/biaxially-oriented, heat-resistant polyolefin layer/laminate including gas barrier layer/heat-resistant polyolefin layer/hydroxyl group-containing polymer layer, heat-resistant polyolefin layer/paper layer/heat-resistant polyolefin layer/biaxially-oriented, heat-resistant polyolefin layer/laminate including gas barrier layer/heat-resistant polyolefin layer/polyester layer, heat-resistant polyolefin layer/paper layer/heat-resistant polyolefin layer/biaxially-oriented, heat-resistant polyolefin layer/laminate including gas barrier layer/heat-resistant polyolefin layer/polyamide layer, paper layer/heat-resistant polyolefin layer/laminate including gas barrier layer/heat-resistant polyolefin layer, paper layer/heat-resistant polyolefin layer/laminate including gas barrier layer/heat-resistant polyolefin layer/hydroxyl group-containing polymer layer, paper layer/heat-resistant polyolefin layer/laminate including gas barrier layer/heat-resistant polyolefin layer/polyester layer, paper layer/heat-resistant polyolefin layer/laminate including gas barrier layer/heat-resistant polyolefin layer/polyamide layer, heat-resistant polyolefin layer/paper layer/laminate including gas barrier layer/heat-resistant polyolefin layer, heat-resistant polyolefin layer/paper layer/laminate including gas barrier layer/heat-resistant polyolefin layer/hydroxyl group-containing polymer layer, heat-resistant polyolefin layer/paper layer/laminate including gas barrier layer/heat-resistant polyolefin layer/polyester layer, paper layer/laminate including gas barrier layer/heat-resistant polyolefin layer/polyamide layer, laminate including gas barrier layer/paper layer/heat-resistant polyolefin layer, laminate including gas barrier layer/paper layer/heat-resistant polyolefin layer/hydroxyl group-containing polymer, laminate including gas barrier layer/paper layer/heat-resistant polyolefin layer/polyester layer, and laminate including gas barrier layer/paper layer/heat-resistant polyolefin layer/polyamide layer. An adhesive layer can be provided suitably between layers. The heat-resistant polyolefin layer is formed of either a biaxially-oriented, heat-resistant polyolefin film or a non-oriented, heat-resistant polyolefin film. From the viewpoint of ease of forming process, it is preferable that all the heat-resistant polyolefin layers of the laminates described above be formed of non-oriented polypropylene films. Particularly, it is preferable that the polypropylene layer disposed as the outermost layer or the innermost layer of each laminate described above be formed of a non-oriented polypropylene film. Examples of the above-mentioned laminate including a gas barrier layer includes a laminate of gas barrier layer/substrate layer/gas barrier layer, a laminate of gas barrier layer/substrate layer, and a laminate formed of a substrate layer. An adhesive layer can be provided between layers. The substrate (film) forming the substrate layer is described later.

The method of forming the heat-resistant polyolefin layer to be employed can be, for example, a method of bonding a non-oriented, heat-resistant polyolefin film or an oriented heat-resistant polyolefin film, which has been prepared beforehand, to a film forming another layer by, for example, the well-known dry lamination process, wet lamination process, or hot-melt lamination process, or a method of forming a heat-resistant polyolefin layer on a film of another layer by, for example, the well-known T-die extrusion process. Furthermore, an adhesive layer can be disposed between the heat-resistant polyolefin layer and another layer as required. The adhesive layer is formed using, for example, an anchor coating agent, an adhesive, or an adhesive resin. From the viewpoints of, for example, mechanical toughness, impact resistance, and piercing resistance, the thickness of the heat-resistant polyolefin layer is preferably in the range of 10 to 200 µm and more preferably in the range of 20 to 150 µm.

Another aspect of the present invention relates to a vacuum heat insulator in which a core material is packaged with a packaging material including at least a gas barrier laminate and the space inside the packaging material is in a vacuum condition. The vacuum heat insulator is characterized in that the gas barrier laminate includes a substrate and a gas barrier layer laminated on at least one surface of the substrate, the gas barrier layer is formed of a composition containing a polymer having at least one functional group selected from a carboxyl group and a carboxylic anhydride group, and —COO— groups contained in the at least one functional group are neutralized at least partly with a metal ion having a valence of two or more.

The vacuum heat insulator of the present invention is composed of a core material and a packaging material, with the space inside the packaging material being in a vacuum condition. It is characterized in that the packaging material contains a specific gas barrier layer, more particularly, a gas barrier layer that is formed of a composition containing a polymer having at least one functional group selected from a carboxyl group and a carboxylic anhydride group, with —COO— groups contained in the at least one functional group are neutralized at least partly with a metal ion having a valence of two or more. Hereinafter, in this description, this specific gas barrier layer may be referred to as a gas barrier layer of the present invention, and a laminate including a substrate and a gas barrier layer of the present invention laminated on at least one surface of the substrate may be referred to as a gas barrier laminate of the present invention.

The use of such a vacuum heat insulator of the present invention makes it possible to provide a vacuum heat insulator that has a high heat insulation performance due to, for example, no heat bridges, and that has gas barrier properties that do not degrade due to, for example, pinholes and therefore exhibits a high heat insulation effect stably over a long period of time.

Although the gas barrier layer of the present invention and the gas barrier laminate of the present invention are described in detail separately, the gas barrier layer of the present invention has high gas barrier properties and excellent flexibility and therefore exhibits a stable gas barrier performance without being affected by, for example, impact during the production or handling thereof. Furthermore, when it is used in combination with a deposited layer formed of metal or metal oxide, it protects the deposited layer to prevent defects such as pinholes from being generated, and even if pinholes are generated, it reduces the effect of the pinholes by high gas barrier properties thereof. Thus, the vacuum heat insulator of the present invention exhibits a stable and high heat insulation performance.

The structure of the packaging material of the vacuum heat insulator according to the present invention is not limited, as long as it includes a gas barrier laminate of the present invention. The structure is selected according to the intended use of the vacuum heat insulator or the method of producing it. For example, a packaging material can be used that is formed by heat-sealing a laminate body including a gas barrier laminate of the present invention. Hereinafter, the laminate body including a gas barrier laminate of the present invention may be abbreviated as a "laminate body (I)".

The laminate body (I) is not particularly limited as long as it has at least a gas barrier laminate. Suitable examples are described below. Examples of the layer structure of the laminate body (I) including a gas barrier laminate include: gas barrier laminate layer/polyolefin layer (hereinafter referred to as "PO layer"), gas barrier laminate layer/gas barrier resin layer/PO layer, gas barrier laminate layer/polyamide layer/PO layer, polyamide layer/gas barrier laminate layer/PO layer, gas barrier laminate layer/polyamide layer/gas barrier resin layer/PO layer, polyamide layer/gas barrier laminate/gas barrier resin layer/PO layer, gas barrier laminate layer/polyester layer/PO layer, polyester layer/gas barrier laminate layer/PO layer, gas barrier laminate layer/polyester layer/gas barrier resin layer/PO layer, polyester layer/gas barrier laminate/gas barrier resin layer/PO layer, PO layer/gas barrier laminate layer/polyolefin layer (hereinafter referred to as "PO layer"), PO layer/gas barrier laminate layer/gas barrier resin layer/PO layer, PO layer/gas barrier laminate layer/polyamide layer/PO layer, PO layer/polyamide layer/gas barrier laminate layer/PO layer, PO layer/gas barrier laminate layer/polyamide layer/gas barrier resin layer/PO layer, PO layer/polyamide layer/gas barrier laminate/gas barrier resin layer/PO layer, PO layer/gas barrier laminate layer/polyester layer/PO layer, PO layer/polyester layer/gas barrier laminate layer/PO layer, PO layer/gas barrier laminate layer/polyester layer/gas barrier resin layer/PO layer, and PO layer/polyester layer/gas barrier laminate/gas barrier resin layer/PO layer. An adhesive layer can be provided suitably between layers. The polyolefin layer, the polyamide layer, the polyester layer, the gas barrier resin layer, and the gas barrier laminate layer are described below in detail.

One selected from or a resin composed of at least two selected from resins such as low density polyethylene, medium density polyethylene, high density polyethylene, straight-chain (linear) low density polyethylene, polypropylene, an ethylene-vinyl acetate copolymer, an ethylene-α olefin copolymer, an ionomer, an ethylene-acrylic acid copolymer, an ethylene-methyl acrylate copolymer, an ethylene-methacrylic acid copolymer, and an ethylene-propylene copolymer, or a sheet obtained by forming it into a film can be used for the above-mentioned polyolefin (PO) layers. Preferable polyolefin layers are resins of low density polyethylene, straight-chain (linear) low density polyethylene, high density polyethylene, and polypropylene, or sheets obtained by forming them into films. Straight-chain (linear) low density polyethylene and polypropylene are more preferable. These polyolefin layers can be either oriented ones or non-oriented ones. However, the PO layer disposed as the innermost layer of the laminate body (I) is preferably non-oriented one from the viewpoint of the heat seal strength. Accordingly, it is most preferable that the PO layer disposed as the innermost layer of the laminate be formed of non-oriented low density polyethylene, non-oriented straight-chain (linear) low density polyethylene, or non-oriented polypropylene.

A resin composed of an ethylene-vinyl alcohol copolymer or a polyvinylidene chloride, or a sheet obtained by forming it into a film can be used for the gas barrier resin layer. Preferably, it is formed of an oriented ethylene-vinyl alcohol copolymer. A deposited layer formed of metal such as aluminum or metal oxide such as aluminum oxide or silicon oxide may be provided on at least one surface of the gas barrier resin layer. For the method of depositing metal or metal oxide, the same method as that described later can be used.

The aforementioned polyester layer and polyamide layer to be used herein can be those described later in the explanation of the gas barrier laminate.

Furthermore, an oxygen absorber such as unsaturated fatty acid, and a moisture absorbent such as synthetic zeolite, silica powder, alumina powder, lithium hydroxide powder, or barium hydroxide powder also can be used as required. The oxygen absorber and moisture absorbent can be contained in each layer of the laminate body (I) or can be used in combination with a core material. It also can be used as an alternative to the core material.

The method of forming the polyolefin (PO) layer, polyester layer, and polyamide layer to be employed herein can be, for example, a method of bonding a non-oriented polyolefin film, an oriented polyolefin film, a non-oriented polyester film, an oriented polyester film, a non-oriented polyamide film, or an oriented polyamide film, which has been prepared beforehand, and a film forming another layer to each other by, for example, the well-known dry lamination process, wet lamination process, or hot-melt lamination process, or a method of forming a polyolefin layer, a polyester layer, or a polyamide layer on a film forming another layer by, for example, the well-known T-die extrusion process. Moreover, an adhesive layer can be disposed between respective layers if necessary. The adhesive layer is formed using, for example, an anchor coating agent, an adhesive, or an adhesive resin.

The core material to be used for the vacuum heat insulator of the present invention is not particularly limited, as long as it has heat insulating properties. Examples thereof include perlite powder, silica powder, precipitated silica powder, diatomaceous earth, calcium silicate, glass wool, rock wool, and open cell foam of resin such as styrene foam or urethane foam. Furthermore, a hollow container made of resin or an inorganic material, or a honeycomb structure also can be used for the core material.

In the vacuum heat insulator of the present invention, the space inside the packaging material is in a vacuum condition. The term "vacuum condition" used herein does not always denote an absolute vacuum condition but indicates that the pressure in the space inside the packaging material is sufficiently lower than atmospheric pressure. The internal pressure is determined according to required performance and ease of production but generally is 2 kPa (about 15 Torr) or lower to allow it to exhibit heat insulation properties. In order to allow the vacuum heat insulator of the present invention to fully exhibit a heat insulation effect, the internal pressure of the packaging material is preferably 200 Pa (about 1.5 Torr) or lower, more preferably 20 Pa or lower, and further preferably 2 Pa or lower.

The vacuum heat insulator of the present invention can be produced by a method usually employed. It can be formed into an arbitrary shape and size according to, for example, the intended use. In a production method, it can be produced by, for example, placing two laminate bodies (I) to be described later in detail on top of each other, with each heat seal layer facing the inner side of the packaging material, heat-sealing arbitrary three sides thereof, packaging a core material therein, bringing the inside of the packaging material into a vacuum condition, and then heat-sealing the remaining side. Alternatively, it also can be produced by folding one laminate body (I), with the heat seal layer facing the inner side of the packaging material, heat-sealing arbitrary two sides thereof, packaging a core material therein, bringing the inside of the packaging material into a vacuum condition, and then heat-sealing the remaining side. Furthermore, it also can be produced by sandwiching a core material with two laminate bodies (I) or with one laminate body (I) folded to surround it, heat-sealing the periphery thereof, with a vacuum outlet being left open, bringing the inside thereof into a vacuum condition, and then heat-sealing the vacuum outlet.

Another aspect of the present invention relates to an infusion bag formed of a laminate including at least a gas barrier laminate, wherein the gas barrier laminate includes a substrate and a gas barrier layer laminated on at least one surface of the substrate, the gas barrier layer is formed of a composition containing a polymer having at least one functional group selected from a carboxyl group and a carboxylic anhydride group, and —COO— groups contained in the at least one functional group are neutralized at least partly with a metal ion having a valence of two or more.

With such an infusion bag of the present invention, it is possible to provide an infusion bag in which the infusion bag itself is provided with oxygen barrier properties, double packaging with outer packaging materials is not necessary, and a fear of elution of the components of the infusion bag during transfusion is eliminated. Furthermore, it is possible to provide an infusion bag that has very good oxygen barrier properties, can be heat-sterilized at a high temperature, has high oxygen barrier properties even after the high-temperature heat sterilization, and can prevent a liquid pharmaceutical agent packaged therein from being deteriorated by oxygen before, during, and after heat sterilization, after transportation, and after storage.

The infusion bag of the present invention can be produced by a bag-making process commonly employed. It can be formed into arbitrary shape and size according to, for example, the intended use. A bag-making process to be employed herein can be a bag-making process in which a single laminate formed of a gas barrier laminate of the present invention (hereinafter also referred to as a "gas barrier laminate (I)") to be described later in detail or a multilayer laminate including a gas barrier laminate (I) is formed and then a bag is made from the laminate. When a bag is made from laminates, after the laminates are placed on top of each other and the periphery thereof is heat-sealed into a predetermined shape to form a bag, a plug member obtained by, for example, injection molding of polyethylene or polypropylene can be attached by heat seal.

The structure of the laminate that forms an infusion bag of the present invention is not limited as long as it contains a gas barrier laminate (I). It can be a laminate formed of the gas barrier laminate (I) alone or can be a multilayer laminate including the gas barrier laminate (I). Examples of the layer structure of the multilayer laminate including the gas barrier laminate (I) include: gas barrier laminate (I) layer/polyolefin layer (hereinafter referred to as "PO layer"), PO layer/gas barrier laminate (I) layer, PO layer/gas barrier laminate (I) layer/PO layer, gas barrier laminate (I) layer/polyamide layer/PO layer, polyamide layer/gas barrier laminate (I)/PO layer, PO layer/gas barrier laminate (I) layer/polyamide layer/PO layer, PO layer/polyamide layer/gas barrier laminate (I)/PO layer, gas barrier laminate (I) layer/thermoplastic elastomer layer, thermoplastic elastomer layer/gas barrier laminate (I) layer, thermoplastic elastomer layer/gas barrier laminate (I)/thermoplastic elastomer layer, gas barrier laminate (I)/thermoplastic elastomer layer/PO layer, thermoplastic elastomer/gas barrier laminate (I)/PO layer, thermoplastic elastomer layer/gas barrier laminate (I)/thermoplastic elastomer layer/PO layer, PO layer/gas barrier laminate (I)/thermoplastic elastomer layer/PO layer, PO layer/gas barrier laminate (I)/thermoplastic elastomer layer/PO layer, PO layer/thermoplastic elastomer/gas barrier laminate (I)/PO layer, PO layer/thermoplastic elastomer layer/gas barrier laminate (I)/thermoplastic elastomer layer/PO layer. An adhesive layer can be provided suitably between layers. The polyolefin layer, the thermoplastic elastomer layer, and the gas barrier laminate (I) layer are described below in detail.

One selected from or a resin composed of at least two selected from resins such as low density polyethylene, medium density polyethylene, high density polyethylene, straight-chain (linear) low density polyethylene, polypropylene, an ethylene-vinyl acetate copolymer, an ethylene-α olefin copolymer, an ionomer, an ethylene-acrylic acid copolymer, an ethylene-methyl acrylate copolymer, an ethylene-methacrylic acid copolymer, and an ethylene-propylene copolymer, or a sheet obtained by forming it into a film can be used for the above-mentioned polyolefin (PO) layers. These polyolefin layers can be either oriented ones or non-oriented ones. Preferable polyolefin layers are resins of low density polyethylene, straight-chain (linear) low density polyethylene, and polypropylene, or sheets obtained by forming them into films. Straight-chain (linear) low density polyethylene or polypropylene is more preferable. From the viewpoints of, for example, ease of forming process and heat resistance, all the PO layers of the laminates described above are preferably non-oriented low density polyethylene, non-oriented straight-chain (linear) low density polyethylene, or non-oriented polypropylene, and further preferably non-oriented straight-chain (linear) low density polyethylene or non-oriented polypropylene.

It is preferable that particularly the PO layers disposed as the innermost layers of the laminates described above be formed of non-oriented low density polyethylene, non-oriented straight-chain (linear) low density polyethylene, or non-oriented polypropylene.

The thermoplastic elastomer layer to be used herein can be one selected from or a resin composed of at least two selected from resins of thermoplastic polyurethane, thermoplastic styrene elastomer, thermoplastic amide elastomer, and thermoplastic ester elastomer, or a sheet obtained by forming it into a film.

The method of forming a polyolefin (PO) layer or a thermoplastic elastomer layer to be employed herein can be, for example, a method of bonding a non-oriented polyolefin film, an oriented polyolefin film, a non-oriented thermoplastic elastomer film, or an oriented thermoplastic elastomer film, which has been prepared beforehand, and a film forming another layer to each other by, for example, the well-known dry lamination process, wet lamination process, or hot-melt lamination process, or a method of forming a polyolefin layer or thermoplastic elastomer on a film forming another layer by, for example, the well-known T-die extrusion process. Moreover, an adhesive layer can be disposed between the polyolefin layer and another layer if necessary. The adhesive layer is formed using, for example, an anchor coating agent, an adhesive, or an adhesive resin.

In the present invention, an infusion bag formed of a laminate including at least a gas barrier laminate (gas barrier laminate (I)) is characterized in that the gas barrier layer included in the gas barrier laminate (I) is a specific gas barrier layer. Hereinafter, the gas barrier laminate including such a specific gas barrier layer may be referred to as a "gas barrier laminate of the present invention".

Another aspect of the present invention relates to a container cover member including at least a gas barrier laminate, wherein the gas barrier laminate includes a substrate and a gas barrier layer laminated on at least one surface of the substrate, the gas barrier layer is formed of a composition containing a polymer having at least one functional group selected from a carboxyl group and a carboxylic anhydride group, and —COO— groups contained in the at least one functional group are neutralized at least partly with a metal ion having a valence of two or more.

The use of such a container cover member of the present invention makes it possible to provide a cover of a container to be used for preserving contents such as foodstuffs that has no problem from an environmental viewpoint, exhibits high gas barrier properties even under high humidity, and does not allow the gas barrier properties to be degraded by, for example, physical impact.

The cover member of the present invention is not particularly limited as long as it can cover a recessed portion of a container and can be joined to a brim of the container that is formed by deep drawing so as to have a storage part with a recessed shape for storing contents and the brim extending, in the form of a flange, outward from an opening edge of the storage part, by vacuum molding or pneumatic molding. A preferable joining method can be a joining method employing heat seal.

The structure of the cover member of the present invention is not limited as long as it includes a gas barrier laminate of the present invention to be described later (hereinafter also referred to as a "gas barrier laminate (I)"). It can be a laminate formed of the gas barrier laminate (I) alone or can be a multilayer laminate including the gas barrier laminate (I). Examples of the layer structure of the multilayer laminate including the gas barrier laminate (I) include, from the outer side toward the inner side, gas barrier laminate (I) layer/polyolefin layer (hereinafter referred to as "PO layer"), gas barrier laminate (I) layer/polyamide layer/PO layer, polyamide layer/gas barrier laminate (I) layer/PO layer, gas barrier laminate (I) layer/EVOH layer/PO layer, gas barrier laminate (I) layer/EVOH layer/polyamide layer/PO layer, paper layer/PO layer/gas barrier laminate (I) layer/polyolefin layer, paper layer/PO layer/gas barrier laminate (I) layer/polyamide layer/PO layer, paper layer/PO layer/polyamide layer/gas barrier laminate (I) layer/PO layer, paper layer/PO layer/gas barrier laminate (I) layer/EVOH layer/PO layer, paper layer/PO layer/gas barrier laminate (I) layer/EVOH layer/polyamide layer/PO layer, PO layer/paper layer/PO layer/gas barrier laminate (I) layer/polyolefin layer, PO layer/paper layer/PO layer/gas barrier laminate (I) layer/polyamide layer/PO layer, PO layer/paper layer/PO layer/polyamide layer/gas barrier laminate (I) layer/PO layer, PO layer/paper layer/PO layer/gas barrier laminate (I) layer/EVOH layer/PO layer, and PO layer/paper layer/PO layer/gas barrier laminate (I) layer/EVOH layer/polyamide layer/PO layer. An adhesive layer can be provided suitably between layers. The polyolefin layer, the paper layer, and the gas barrier laminate (I) layer are described below in detail.

One selected from or a resin composed of at least two selected from resins such as low density polyethylene, medium density polyethylene, high density polyethylene, straight-chain (linear) low density polyethylene, polypropylene, an ethylene-vinyl acetate copolymer, an ethylene-α olefin copolymer, an ionomer, an ethylene-acrylic acid copolymer, an ethylene-methyl acrylate copolymer, an ethylene-methacrylic acid copolymer, and an ethylene-propylene copolymer, or a sheet obtained by forming it into a film can be used for the above-mentioned polyolefin (PO) layers. These polyolefin layers can be either oriented ones or non-oriented ones. Preferable polyolefin layers are resins of low density polyethylene, straight-chain (linear) low density polyethylene, and polypropylene, or sheets obtained by forming them into films. The straight-chain (linear) low density polyethylene or polypropylene is more preferable. From the viewpoints of, for example, ease of forming process and heat resistance, all the PO layers of the laminates described above are preferably non-oriented low density polyethylene, non-oriented straight-chain (linear) low density polyethylene, or non-oriented polypropylene, and further preferably non-oriented straight-chain (linear) low density polyethylene or non-oriented polypropylene.

It is preferable that particularly the PO layers disposed as the innermost layers of the cover members described above be formed of non-oriented low density polyethylene, non-oriented straight-chain (linear) low density polyethylene, or non-oriented polypropylene.

The thickness of the polyamide layer is not particularly limited but is preferably in the range of 10 to 200 μm and more preferably in the range of 20 to 150 μm, from the viewpoints of, for example, mechanical toughness, impact resistance, and piercing resistance.

The polyamide layer to be used can be one selected from or a resin composed of at least two selected from polyamide 6, polyamide 66, polyamide 11, polyamide 12, polyamide 610, polyamide 612, and polyamide MXD6 resins, or a sheet obtained by forming it into a film. These polyamide layers can be either oriented ones or non-oriented ones. A preferable polyamide layer is a sheet obtained by forming polyamide 6 or polyamide 66 into a film and stretching it. The thickness of the polyamide layer is not particularly limited but is preferably in the range of 5 to 200 μm and more preferably in the range of 5 to 100 μm, from the viewpoints of, for example, mechanical toughness, impact resistance, and piercing resistance.

The paper that can be used for the paper layer is, for example, kraft paper, high-quality paper, simili paper, glassine paper, parchment paper, synthetic paper, white paperboard, manila board, milk carton paper, cup paper, or ivory paper.

The method of forming the polyolefin (PO) layer or the polyamide layer to be employed herein can be, for example, a method of bonding a non-oriented polyolefin film, an oriented polyolefin film, a non-oriented polyamide film, or an oriented polyamide film, which has been prepared beforehand, and a film forming another layer to each other by, for example, the well-known dry lamination process, wet lamination process, or hot-melt lamination process, or a method of forming a PO layer or a polyamide layer on a film forming another layer by, for example, the well-known T-die extrusion process. Moreover, an adhesive layer can be disposed between the polyolefin layer and another layer if necessary. The adhesive layer is formed using, for example, an anchor coating agent, an adhesive, or an adhesive resin.

Another aspect of the present invention relates to a laminate tube container including at least a gas barrier laminate, wherein the gas barrier laminate includes a substrate and a gas barrier layer laminated on at least one surface of the substrate, the gas barrier layer is formed of a composition containing a polymer having at least one functional group selected from a carboxyl group and a carboxylic anhydride group, and —COO— groups contained in the at least one functional group are neutralized at least partly with a metal ion having a valence of two or more.

The use of such a laminate tube container of the present invention makes it possible to provide a laminate tube container that is excellent from the viewpoints of, for example, the environment and disposal, has diversity in design thereof, has retort sterilization resistance, has excellent oxygen barrier properties as compared to a conventional laminate tube container, and prevents oxygen barrier properties from degrading even after the laminate tube container is squeezed. In many cases, the contents packaged in laminate tube containers are consumed in a small amount at a time and are consumed over a long period of time. The laminate tube container of the present invention is particularly suitable for contents that tend to be deteriorated by oxygen, for example, pharmaceutical agents, cosmetics, or foodstuffs.

The laminate tube container of the present invention includes a body part, a shoulder part, and a cap part. The body part is formed in a cylindrical shape from a laminate body including a gas barrier laminate (hereinafter also referred to as a "gas barrier laminate (I)") including a substrate and a specific gas barrier layer (hereinafter referred to as a "gas barrier layer used in the present invention") laminated on at least one surface of the substrate. The shoulder part has a threaded spout formed of thermoplastic resin by, for example, an injection molding process. For example, a laminate body including a gas barrier laminate is bent into a cylindrical shape, both ends thereof in the longitudinal direction are placed on top of each other, the regions where they are placed on top of each other are heat-welded with high frequency waves to be joined together, and thus a cylindrical body part is produced.

The laminate tube container of the present invention includes: a body part formed in a cylindrical shape from a laminate body including a gas barrier laminate used in the present invention (hereinafter also referred to as a "gas barrier laminate (I)"); a shoulder part having a threaded spout formed of thermoplastic resin by, for example, an injection molding process; and a cap part. For example, a laminate body including a gas barrier laminate is bent into a cylindrical shape, both ends thereof in the longitudinal direction are placed on top of each other, the regions where they are placed on top of each other are heat-welded with high frequency waves to be joined together, and thus a cylindrical body part is produced. One end of the cylindrical body part is taken as an opening part and the other is taken as a tail part. The shoulder part having a threaded spout formed of thermoplastic resin by, for example, an injection molding process and the opening part of the cylindrical body part are bonded together. The method of bonding the shoulder part to the opening part of the cylindrical body part that can be employed herein is, for example, a method in which the component of the shoulder part is set into the opening part of the cylindrical body part and they are then high-frequency welded or heat-welded with a gas burner, or a method in which a cylindrical body part is fixed to a mold beforehand and thermoplastic resin is molten to be injected onto the opening part of the cylindrical body part thus fixed and to be compression-molded. The cap part formed by injection molding is put on the threaded spout. Subsequently, the contents are loaded from the tail part, and the tail part is sealed together by, for example, high-frequency heat welding. Thus a laminate tube container can be produced.

The structure of the laminate body used in the present invention is not particularly limited as long as it includes a gas barrier laminate (I) having a gas barrier layer used in the present invention. However, the layer to be located on the inner side of the laminate tube container is preferably a polyolefin layer (hereinafter also referred to as a "PO layer") in terms of heat seal properties. Examples of the structure of the laminate body used in the present invention include those that can have structures of, from the layer to be located on the outer side toward the layer to be located on the inner side when it is used for a laminate container, PO layer/gas barrier laminate (I)/PO layer, PO layer/pigment-containing PO layer/PO layer/gas barrier laminate (I)/PO layer, PO layer/polyamide layer/gas barrier laminate (I)/PO layer, PO layer/pigment-containing PO layer/PO layer/polyamide layer/gas barrier laminate (I)/PO layer, PO layer/gas barrier laminate (I)/ethylene vinyl alcohol copolymer layer (hereinafter "EVOH layer")/PO layer, PO layer/pigment-containing PO layer/PO layer/gas barrier laminate (I)/EVOH layer/PO layer, PO layer/polyamide layer/gas barrier laminate (I)/EVOH layer/PO layer, and PO layer/pigment-containing PO layer/PO layer/polyamide layer/gas barrier laminate (I)/EVOH layer/PO layer. Examples of particularly preferable structures of the laminate body include PO layer/gas barrier laminate (I)/PO layer and PO layer/pigment-containing PO layer/PO layer/gas barrier laminate (I)/PO layer. An adhesive layer can be provided suitably between layers. The polyolefin layer, pigment-containing polyolefin layer, polyamide layer, and EVOH layer are described below in detail.

One selected from or a resin composed of at least two selected from resins such as low density polyethylene, medium density polyethylene, high density polyethylene, straight-chain (linear) low density polyethylene, polypropylene, an ethylene-vinyl acetate copolymer, an ethylene-α olefin copolymer, an ionomer, an ethylene-acrylic acid copolymer, an ethylene-methyl acrylate copolymer, an ethylene-methacrylic acid copolymer, and an ethylene-propylene copolymer, or a sheet obtained by forming it into a film can be used for the above-mentioned polyolefin (PO) layers. These polyolefin layers can be either oriented ones or non-oriented ones. Preferable polyolefin layers are resins of low density polyethylene, straight-chain (linear) low density polyethylene, and polypropylene, or sheets obtained by forming them into films. The straight-chain (linear) low density polyethylene or polypropylene is more preferable. From the viewpoints of, for example, ease of forming process and heat resistance, all the PO layers of the laminates described above are preferably non-oriented low density polyethylene, non-oriented straight-chain (linear) low density polyethylene, or non-oriented polypropylene and more preferably non-oriented straight-chain (linear) low density polyethylene or non-oriented polypropylene.

It is preferable that particularly the PO layers disposed as the innermost layers of the laminate bodies described above be formed of non-oriented low density polyethylene, non-oriented straight-chain (linear) low density polyethylene, or non-oriented polypropylene. The thickness of the PO layers is not particularly limited but is preferably in the range of 10 to 300 µm and more preferably in the range of 50 to 200 µm, from the viewpoints of, for example, mechanical toughness, impact resistance, and piercing resistance.

The polyamide layer to be used can be one selected from or a resin composed of at least two selected from polyamide 6, polyamide 66, polyamide 11, polyamide 12, polyamide 610, polyamide 612, and polyamide MXD6 resins, or a sheet obtained by forming it into a film. These polyamide layers can be either oriented ones or non-oriented ones. A preferable polyamide layer is a sheet obtained by forming polyamide 6 or polyamide 66 into a film and stretching it.

The thickness of the polyamide layer is not particularly limited but is preferably in the range of 5 to 200 µm and more preferably in the range of 5 to 100 µm, from the viewpoints of, for example, mechanical toughness, impact resistance, and piercing resistance.

The ethylene vinyl alcohol copolymer (EVOH) layer to be used can be a resin of one ethylene vinyl alcohol copolymer or a resin composed of at least two ethylene vinyl alcohol copolymers whose ethylene contents are different from each other, or a sheet obtained by forming it into a film. The EVOH layer can be either oriented one or non-oriented one. A preferable EVOH layer is a sheet obtained by forming ethylene vinyl alcohol copolymer resin into a film and stretching it.

The thickness of the EVOH layer is not particularly limited but is preferably in the range of 5 to 200 µm and more preferably in the range of 5 to 100 µm, from the viewpoints of, for example, gas barrier properties, mechanical toughness, impact resistance, and piercing resistance.

The method of forming the polyolefin (PO) layer, polyamide layer, or EVOH layer to be employed herein can be, for example, a method of bonding a non-oriented polyolefin film, an oriented polyolefin film, a non-oriented polyamide film, an oriented polyamide film, a non-oriented EVOH, or an oriented EVOH film, which has been prepared beforehand, and a film forming another layer to each other by, for example, the well-known dry lamination process, wet lamination process, or hot-melt lamination process, or a method of forming a PO layer, a polyamide layer, or an EVOH layer on a film forming another layer by, for example, the well-known T-die extrusion process. Moreover, an adhesive layer can be disposed between the polyolefin layer and another layer if necessary. The adhesive layer is formed using, for example, an anchor coating agent, an adhesive, or an adhesive resin.

The threaded shoulder part and cap of the laminate tube container of the present invention each can be produced to have a known structure by a known method. For instance, they can be produced by molding thermoplastic resin by, for example, an injection molding process. The thermoplastic resin to be used can be low density polyethylene, medium density polyethylene, high density polyethylene, straight-chain (linear) low density polyethylene, polypropylene, polyolefin such as olefin elastomer, an ethylene-α olefin copolymer, an ionomer, an ethylene-acrylic acid copolymer, an ethylene-methyl acrylate copolymer, an ethylene-methacrylic acid copolymer, or an ethylene-propylene copolymer, or a blend of a resin thereof with a gas barrier resin such as an ethylene ethylene-vinyl acetate copolymer or MXD6 polyamide.

Another aspect of the present invention relates to a vacuum packaging bag including at least a gas barrier laminate, wherein the gas barrier laminate includes a substrate and a gas barrier layer laminated on at least one surface of the substrate, the gas barrier layer is formed of a composition containing a polymer having at least one functional group selected from a carboxyl group and a carboxylic anhydride group, and —COO— groups contained in the at least one functional group are neutralized at least partly with a metal ion having a valence of two or more.

The use of such a vacuum packaging bag of the present invention makes it possible to provide a vacuum packaging bag that is suitable for packaging foodstuffs containing solid contents, has excellent oxygen barrier properties even after vacuum packaging or vacuum packaging and heat sterilization, and maintains gas barrier properties that are at least equivalent to those obtained before deformation even after the packaging bag is deformed due to, for example, folding, bending, expansion, or contraction at the time of vacuum packaging and the packaging bag is deformed due to, for example, expansion, contraction, or bending at the time of heat sterilization process to be carried out thereafter. Furthermore, the vacuum packaging bag of the present invention allows the state of contents to be checked and is environmentally suitable.

The structure of the gas barrier laminate used in the present invention is not particularly limited as long as it includes a gas barrier layer used in the present invention. However, a polyolefin layer (hereinafter also referred to as a "PO layer") is preferable as a layer to be located on the inner side of a vacuum packaging bag from the viewpoint of heat sealing properties. Examples of the structure of the gas barrier laminate used in the present invention include, from the layer to be located on the outer side toward the layer to be located on the inner side when it is used as a vacuum packaging bag, substrate/gas barrier layer/PO layer, PO layer/substrate/gas barrier layer/PO layer, substrate/gas barrier layer/polyamide layer/PO layer, polyamide layer/substrate/gas barrier layer/PO layer, polyamide layer/substrate/gas barrier layer/polyamide layer/PO layer, substrate/gas barrier layer/EVOH layer/PO layer, PO layer/EVOH layer/substrate/gas barrier layer/PO layer, PO layer/substrate/gas barrier layer/EVOH layer/PO layer, substrate/gas barrier layer/EVOH layer/polyamide layer/PO layer, substrate/gas barrier layer/polyamide layer/EVOH layer/PO layer, substrate/gas barrier layer/polyamide layer/EVOH layer/PO layer, polyamide layer/substrate/gas barrier layer/EVOH layer/PO layer, polyamide layer/substrate/gas barrier layer/EVOH layer/polyamide layer/PO layer, polyamide layer/substrate/gas barrier layer/polyamide layer/EVOH layer/PO layer, gas barrier layer/substrate/PO layer, PO layer/gas barrier layer/substrate/PO layer, gas barrier layer/substrate/polyamide layer/PO layer, polyamide layer/gas barrier layer/substrate/PO layer, polyamide layer/gas barrier layer/substrate/polyamide layer/PO layer, gas barrier layer/substrate/EVOH layer/PO layer, PO layer/EVOH layer/gas barrier layer/substrate/PO layer, PO layer/gas barrier layer/substrate/EVOH layer/PO layer, gas barrier layer/substrate/EVOH layer/polyamide layer/PO layer, gas barrier layer/substrate/polyamide layer/EVOH layer/PO layer, gas barrier layer/substrate/polyamide layer/PO layer, polyamide layer/gas barrier layer/substrate/EVOH layer/PO layer, polyamide layer/gas barrier layer/substrate/EVOH layer/polyamide layer/PO layer, polyamide layer/gas barrier layer/substrate/polyamide layer/EVOH layer/PO layer, gas barrier layer/substrate/gas barrier layer/PO layer, PO layer/gas barrier layer/substrate/gas barrier layer/PO layer, substrate/gas barrier layer/polyamide layer/PO layer, substrate/gas barrier layer/polyamide layer/PO layer, polyamide layer/gas barrier layer/substrate/gas barrier layer/PO layer, PO layer/polyamide layer/gas barrier layer/substrate/gas barrier layer/polyamide layer/PO layer, gas barrier layer/substrate/gas barrier layer/EVOH layer/PO layer, PO layer/EVOH layer/gas barrier layer/substrate/gas barrier layer/PO layer, PO layer/gas barrier layer/substrate/gas barrier layer/EVOH layer/PO layer, gas barrier layer/substrate/gas barrier layer/EVOH layer/polyamide layer/PO layer, gas barrier layer/substrate/gas barrier layer/polyamide layer/EVOH layer/PO layer, gas barrier layer/substrate/gas barrier layer/polyamide layer/PO layer, polyamide layer/gas barrier layer/substrate/gas barrier layer/EVOH layer/PO layer, polyamide layer/gas barrier layer/substrate/gas barrier layer/EVOH layer/polyamide layer/PO layer, and polyamide layer/gas barrier layer/substrate/gas barrier layer/polyamide layer/EVOH layer/PO layer. Particularly preferable structures of the gas barrier laminate are substrate/gas barrier layer/PO layer, gas barrier layer/substrate/PO layer, and gas barrier layer/substrate/gas barrier layer/PO layer as well as a structure of a film whose substrate is formed of polyamide. The vacuum packaging bag is excellent particularly in gas barrier properties after vacuum packaging or after vacuum packaging and heat sterilization. An adhesive layer can be provided suitably between layers of the above-mentioned vacuum packaging bags. The polyolefin layer, polyamide layer, and gas barrier layer are described below in detail.

One selected from or a resin composed of at least two selected from resins such as low density polyethylene, medium density polyethylene, high density polyethylene, straight-chain (linear) low density polyethylene, polypropylene, an ethylene-vinyl acetate copolymer, an ethylene-α olefin copolymer, an ionomer, an ethylene-acrylic acid copolymer, an ethylene-methyl acrylate copolymer, an ethylene-methacrylic acid copolymer, and an ethylene-propylene copolymer, or a sheet obtained by forming it into a film can be used for the above-mentioned polyolefin (PO) layers. These polyolefin layers can be either oriented ones or non-oriented ones. Preferable polyolefin layers are resins of low density polyethylene, straight-chain (linear) low density polyethylene, and polypropylene, or sheets obtained by forming them into films. Straight-chain (linear) low density polyethylene or polypropylene is more preferable. From the viewpoints of, for example, ease of forming process and heat resistance, all the PO layers of the laminates described above are preferably non-oriented low density polyethylene, non-oriented straight-chain (linear) low density polyethylene, or non-oriented polypropylene and further preferably non-oriented straight-chain (linear) low density polyethylene or non-oriented polypropylene.

It is preferable that particularly the PO layers disposed as the innermost layers of the packaging bags described above be formed of non-oriented low density polyethylene, non-oriented straight-chain (linear) low density polyethylene, or non-oriented polypropylene.

The thickness of the PO layers is not particularly limited but is preferably in the range of 10 to 200 μm and more preferably in the range of 20 to 150 μm, from the viewpoints of, for example, mechanical toughness, impact resistance, and piercing resistance.

The polyamide layer to be used can be a sheet obtained by forming, into a film, at least one resin selected from polyamide 6, polyamide 66, polyamide 11, polyamide 12, polyamide 610, polyamide 612, and polyamide MXD6 resins. These polyamide layers can be either oriented ones or non-oriented ones. A preferable polyamide layer is a sheet obtained by forming polyamide 6 or polyamide 66 into a film and stretching it. The thickness of the polyamide layer is not particularly limited but is preferably in the range of 5 to 200 μm and more preferably in the range of 5 to 100 μm, from the viewpoints of, for example, mechanical toughness, impact resistance, and piercing resistance.

A vacuum packaging bag having particularly a structure including a gas barrier layer as the outermost layer and a polyamide layer on the inner side among the structures employed for the cover member of the present invention is used suitably because dynamic or mechanical properties thereof after retort processing are not degraded as compared to the conventional structure including a polyamide layer.

The method of forming the polyolefin (PO) layer and polyamide layer to be employed herein can be, for example, a method of bonding a non-oriented polyolefin film, an oriented polyolefin film, a non-oriented polyamide film, or an oriented polyamide film, which has been prepared beforehand, and a film forming another layer to each other by, for example, the well-known dry lamination process, wet lamination process, or hot-melt lamination process, or a method of forming a PO layer or a polyamide layer on a film forming another layer by, for example, the well-known T-die extrusion process. Moreover, an adhesive layer can be disposed between the polyolefin layer and another layer if necessary. The adhesive layer is formed using, for example, an anchor coating agent, an adhesive, or an adhesive resin.

The vacuum packaging bag of the present invention can be produced by a process usually employed. It can be formed into arbitrary shape and size according to, for example, the intended use. A bag-making process to be employed herein can be, for example, a process in which a laminate including a gas barrier layer used in the present invention, which is described later in detail, is formed and then a bag is made from the laminate. When a bag is made from a laminate, it can be made by placing two laminates on top of each other, heat-sealing three sides of the periphery thereof, packaging contents, deaerating the inside of the packaging bag, and then heat-sealing the remaining side.

Another aspect of the present invention relates to a pouch with a spout that is formed of a laminate including at least a gas barrier laminate, wherein the gas barrier laminate includes a substrate and a gas barrier layer laminated on at least one surface of the substrate, the gas barrier layer is formed of a composition containing a polymer having at least one functional group selected from a carboxyl group and a carboxylic anhydride group, and —COO— groups contained in the at least one functional group are neutralized at least partly with a metal ion having a valence of two or more.

The use of such a pouch with a spout of the present invention makes it possible to provide a pouch with a spout that has a pouch body having transparency and high oxygen barrier properties even after a high-temperature heat sterilization process, allows a metal detector to be used, prevents damages from occurring in the spout-attached part or heat sealing part of the spout pouch body, especially an edge portion thereof, due to bending or impact during packaging of contents or transportation and thereby prevents barrier properties from degrading. Furthermore, a pouch with a spout can be provided that can be subjected to a high-temperature heat sterilization process, has high oxygen barrier properties even after a heat sterilization process, and can prevent the packaged contents such as liquid beverage, a foodstuff, or a pharmaceutical agent that has been packaged therein from being deteriorated by oxygen before, during, and after heat sterilization, after transportation, and after storage.

The pouch with a spout of the present invention can be formed of a gas barrier laminate (hereinafter also referred to as a "gas barrier laminate (I)") including a substrate and a specific gas barrier layer (hereinafter also referred to as a "gas barrier layer used in the present invention") laminated on at least one surface of the substrate. For example, it is provided in the form of a packaging bag formed by placing the gas barrier laminates on top of each other and heat-sealing three sides of the periphery thereof. This can be used by filling the packaging bag with contents, deaerating the inside of the packaging bag, and then heat-sealing the remaining side.

The structure of the laminate that forms the pouch with a spout of the present invention is not limited as long as it includes a gas barrier layer. However, the layer to be located on the inner side of the pouch with a spout is preferably a polyolefin layer (hereinafter also referred to as a "PO layer") in terms of heat seal properties. Examples of the structure of the gas barrier laminate used in the present invention are structures including, from the layer to be located on the outer side toward the layer to be located on the inner side when it is used for a pouch with a spout, gas barrier layer/substrate/PO layer, gas barrier layer/substrate/polyamide layer/PO layer, polyamide layer/gas barrier layer/substrate/PO layer, substrate/gas barrier layer/polyamide layer/PO layer, polyamide layer/substrate/gas barrier layer/PO layer, gas barrier layer/substrate/gas barrier layer/polyamide layer/PO layer, and polyamide layer/gas barrier layer/substrate/gas barrier layer/PO layer. In the pouch with a spout, an adhesive layer can be provided suitably between layers. The polyolefin layer and thermoplastic elastomer layer are described below in detail.

One selected from or a resin composed of at least two selected from resins such as low density polyethylene, medium density polyethylene, high density polyethylene, straight-chain (linear) low density polyethylene, polypropylene, an ethylene-vinyl acetate copolymer, an ethylene-α olefin copolymer, an ionomer, an ethylene-acrylic acid copolymer, an ethylene-methyl acrylate copolymer, an ethylene-methacrylic acid copolymer, and an ethylene-propylene copolymer, or a sheet obtained by forming it into a film can be used for the above-mentioned polyolefin (PO) layers. These polyolefin layers can be either oriented ones or non-oriented ones. Preferable polyolefin layers are resins of low density polyethylene, straight-chain (linear) low density polyethylene, and polypropylene, or sheets obtained by forming them into films. The straight-chain (linear) low density polyethylene or polypropylene is more preferable. From the viewpoints of, for example, ease of forming process and heat resistance, all the PO layers of the laminates described above are preferably non-oriented low density polyethylene, non-oriented straight-chain (linear) low density polyethylene, or non-oriented polypropylene and further preferably non-oriented straight-chain (linear) low density polyethylene or non-oriented polypropylene.

It is preferable that particularly the PO layers disposed as the innermost layers of the laminates described above be formed of non-oriented low density polyethylene, non-oriented straight-chain (linear) low density polyethylene, or non-oriented polypropylene.

The method of forming a polyolefin (PO) layer or a thermoplastic elastomer layer to be employed herein can be, for example, a method of bonding a non-oriented polyolefin film, an oriented polyolefin film, a non-oriented thermoplastic elastomer film, or an oriented thermoplastic elastomer film, which has been prepared beforehand, and a film forming another layer to each other by, for example, the well-known dry lamination process, wet lamination process, or hot-melt lamination process, or a method of forming a polyolefin layer or thermoplastic elastomer on a film forming another layer by, for example, the well-known T-die extrusion process. Moreover, an adhesive layer can be disposed between the polyolefin layer and another layer if necessary. The adhesive layer is formed using, for example, an anchor coating agent, an adhesive, or an adhesive resin.

Hereinafter, a gas barrier layer and a gas barrier laminate of the present invention are described in detail.

<Gas Barrier Laminate>

A gas barrier layer of the present invention, i.e. a gas barrier layer included in a gas barrier laminate of the present invention, is characterized in that it is formed of a composition containing a polymer having at least one functional group selected from a carboxyl group and a carboxylic anhydride group, and —COO— groups contained in the at least one functional group are neutralized at least partly with a metal ion having a valence of two or more, in other words, at least a part of the at least one functional group has formed a salt with a metal ion having a valence of two or more.

<Carboxylic Acid-containing Polymer>

The composition of the gas barrier layer contains a polymer having at least one functional group selected from a carboxyl group and a carboxylic anhydride group. In the composition, the content of neutralized product of the polymer is not particularly limited and can be in the range of, for example, 25 wt % to 95 wt %. The neutralized product of the polymer is a polymer obtained as follows. That is, with respect to a polymer having at least one functional group selected from a carboxyl group and a carboxylic anhydride group (hereinafter also referred to as a "carboxylic acid-containing polymer"), the at least one functional group is neutralized at least partly with a metal ion having a valence of two or more.

The carboxylic acid-containing polymer has at least two carboxyl groups or at least one carboxylic anhydride group in one molecule of the polymer. Specifically, polymers can be used that have, in one molecule of the polymer, at least two structural units having at least one carboxyl group, such as an acrylic acid unit, a methacrylic acid unit, a maleic acid unit, and an itaconic acid unit. Furthermore, polymers also can be used that have a structural unit having a structure of a carboxylic anhydride such as maleic anhydride unit or phthalic anhydride unit. The polymer can contain one or two or more of the structural units having at least one carboxyl group and/or structural units having a structure of carboxylic anhydride (hereinafter both of them may be abbreviated collectively as a "carboxylic acid-containing unit (C)").

When the content of the carboxylic acid-containing unit (C) in all the structural units of the carboxylic acid-containing polymer is at least 10 mol %, a gas barrier laminate having good gas barrier properties under high humidity can be obtained. This content is more preferably at least 20 mol %, further preferably at least 40 mol %, and particularly preferably at least 70 mol %. When the carboxylic acid-containing polymer contains both the structural unit having at least one carboxyl group and the structural unit having a structure of carboxylic anhydride, the sum total of both should be in the above-mentioned range.

Structural units other than the carboxylic acid-containing unit (C) that can be contained in the carboxylic acid-containing polymer are not particularly limited. Examples thereof include at least one structural unit selected from: for example, structural units derived from (meth)acrylic esters, such as a methyl acrylate unit, a methyl methacrylate unit, an ethyl acrylate unit, an ethyl methacrylate unit, a butyl acrylate unit, and a butyl methacrylate unit; structural units derived from vinyl esters, such as a vinyl formate unit and a vinyl acetate unit; a styrene unit or a p-styrenesulfonic acid unit; and structural units derived from olefins, such as an ethylene unit, a propylene unit, and an isobutylene unit. When the carboxylic acid-containing polymer contains at least two structural units, the carboxylic acid-containing polymer can be in any one of the form of an alternating copolymer, the form of a random copolymer, the form of a block copolymer, and further the form of a tapered copolymer.

Examples of a preferable carboxylic acid-containing polymer include polyacrylic acid, polymethacrylic acid, and poly(acrylic acid/methacrylic acid). The carboxylic acid-containing polymer can be of one type or can be a mixture of two polymers or more. For instance, a polymer of at least one selected from a polyacrylic acid and a polymethacrylic acid can be used. Furthermore, specific examples of the carboxylic acid-containing polymer containing the structural units other than the carboxylic acid-containing unit (C) include saponified products of an ethylene-maleic anhydride copolymer, a styrene-maleic anhydride copolymer, an isobutylene-maleic anhydride alternating copolymer, an ethylene-acrylic acid copolymer, and an ethylene-ethyl acrylate copolymer.

The molecular weight of the carboxylic acid-containing polymer is not particularly limited. However, the number average molecular weight thereof is preferably at least 5,000, more preferably at least 10,000, and further preferably at least 20,000, from the viewpoints of excellent gas barrier properties of a gas barrier laminate to be obtained and excellent dynamic properties such as drop impact strength. The upper limit of the molecular weight of the carboxylic acid-containing polymer is not particularly limited but generally is not more than 1,500,000.

Moreover, the molecular weight distribution of the carboxylic acid-containing polymer also is not particularly limited. However, the molecular weight distribution expressed by the ratio of weight average molecular weight/number average molecular weight of the carboxylic acid-containing polymer is preferably in the range of 1 to 6, more preferably in the range of 1 to 5, and further preferably in the range of 1 to 4, from the viewpoints that, for example, better surface appearance in terms of, for example, haze of the gas barrier laminate and better storage stability of the solution (S) described later are obtained.

The polymer composing the gas barrier layer of the gas barrier laminate of the present invention is obtained by neutralizing, at least partly, at least one functional group (hereinafter also may be referred to as a "functional group (F)") selected from a carboxyl group and a carboxylic anhydride group of the carboxylic acid-containing polymer, with a metal ion having a valence of two or more. In other words, this polymer contains a carboxyl group neutralized with a metal ion having a valence of two or more.

In the polymer composing the gas barrier layer, for example, at least 10 mol % (for instance, at least 15 mol %) of the —COO— groups contained in the functional group (F) are neutralized with a metal ion having a valence of two or more. The carboxylic anhydride group is considered to contain two —COO— groups. That is, when a mol of carboxyl group and b mol of carboxylic anhydride group are present, the number of —COO— groups contained therein is (a+2b) mol in total. With respect to the —COO— groups contained in the functional group (F), the ratio of those that have been neutralized with a metal ion having a valence of two or more is preferably at least 20 mol %, more preferably at least 30 mol %, further preferably at least 40 mol %, and particularly preferably at least 50 mol % (for example, at least 60 mol %). The upper limit of the ratio of the —COO— groups that have been neutralized with a metal ion having a valence of two or more with respect to those contained in the functional group (F) is not particularly limited. For example, it can be 95 mol % or lower. When the carboxyl group and/or the carboxylic anhydride group contained in the carboxylic acid-containing polymer are/is neutralized with a metal ion having a valence of two or more, the gas barrier laminate of the present invention exhibits good gas barrier properties under both a dry condition and a high humidity condition.

The neutralization degree (ionization degree) of the functional group (F) can be determined by measuring the infrared absorption spectrum of the gas barrier laminate by the ATR (Attenuated Total Reflection) method, or by scraping the gas barrier layer from the gas barrier laminate and then measuring the infrared absorption spectrum thereof by the KBr method. The peak attributed to C=O stretching vibration of the carboxyl group or carboxylic anhydride group obtained before neutralization (before ionization) is observed in the range of 1600 $cm^{-1}$ to 1850 $cm^{-1}$. On the other hand, the C=O stretching vibration of the carboxyl group obtained after the neutralization (ionization) is observed in the range of 1500 $cm^{-1}$ to 1600 $cm^{-1}$. Accordingly, they can be evaluated separately with the infrared absorption spectra thereof. Specifically, the ratio between them is determined from the maximum absorbances in the respective ranges, and then the ionization degree of the polymer composing the gas barrier layer of the gas barrier laminate can be calculated using an analytical curve prepared beforehand. The analytical curve can be prepared through the measurements of infrared absorption spectra of a plurality of standard samples that are different in neutralization degree from each other.

It is important that the metal ions that neutralize the functional group (F) have a valence of two or more. When the functional group (F) has not been neutralized or has been neutralized by only the univalent ions to be described later, the laminate obtained thereby does not have good gas barrier properties. However, when the functional group (F) has been neutralized with a small amount of univalent ions (positive ions) in addition to metal ions with a valence of two or more, the haze of the gas barrier laminate is reduced and thereby a good surface appearance is obtained. Thus, the present invention embraces the case where the functional group (F) of the carboxylic acid-containing polymer is neutralized with both metal ions having a valence of two or more and univalent ions. Examples of the metal ions having a valence of two or more include a calcium ion, a magnesium ion, a divalent iron ion, a trivalent iron ion, a zinc ion, a divalent copper ion, a lead ion, a divalent mercury ion, a barium ion, a nickel ion, a zirconium ion, an aluminum ion, and a titanium ion. For example, at least one ion selected from a calcium ion, a magnesium ion, and a zinc ion may be used as the metal ion having a valence of two or more.

In the present invention, it is preferable that 0.1 to 10 mol % of the —COO— groups contained in the functional group (F) (the carboxyl group and/or the carboxylic anhydride) of the carboxylic acid-containing polymer are neutralized with univalent ions. However, when the degree of the neutralization achieved with univalent ions is high, the gas barrier properties of the gas barrier laminate degrade. The degree of the neutralization of the functional group (F) achieved with univalent ions is more preferably in the range of 0.5 to 5 mol % and further preferably in the range of 0.7 to 3 mol %. Examples of the univalent ions include an ammonium ion, a pyridinium ion, a sodium ion, a potassium ion, and a lithium ion, and an ammonium ion is preferable.

Preferably, the composition forming the gas barrier layer of the gas barrier laminate of the present invention contains a hydrolysis condensate of at least one compound (L) containing a metal atom to which at least one characteristic group (atomic group) selected from a halogen atom and an alkoxy group has been bonded, in addition to the carboxylic acid-containing polymer and a neutralized product thereof. The hydrolysis condensate of the compound (L) contained therein allows very good gas barrier properties to be obtained.

<Hydrolysis Condensate>

For the compound (L), at least one of a compound (A) and/or a compound (B) that are described below can be used. The compound (A) and the compound (B) are described as follows.

The compound (A) is at least one compound that is expressed by Chemical Formula (I) below:

$$M^1(OR^1)_n X^1_k Z^1_{m-n-k} \qquad (I).$$

In Chemical Formula (I), Ml denotes an atom selected from Si, Al, Ti, Zr, Cu, Ca, Sr, Ba, Zn, B, Ga, Y, Ge, Pb, P, Sb, V, Ta, W, La, and Nd. $M^1$ is preferably Si, Al, Ti, or Zr and particularly preferably Si. In Chemical Formula (I), $R^1$ indicates an alkyl group such as a methyl group, an ethyl group, an n-propyl group, an iso-propyl group, an n-butyl group, or a t-butyl group and is preferably a methyl group or an ethyl group. Furthermore, in Chemical Formula (I), $X^1$ indicates a halogen atom. Examples of the halogen atom that is indicated by $X^1$ include, for example, a chlorine atom, a bromine atom, and an iodine atom, but a chlorine atom is preferable. In Chemical Formula (I), $Z^1$ denotes an alkyl group having a substituted functional group reactive with a carboxyl group. In this case, examples of the functional group reactive with a carboxyl group include an epoxy group, an amino group, a hydroxyl group, a halogen atom, a mercapto group, an isocyanate group, a ureide group, an oxazoline group, and a carboduimide group. Among them, an epoxy group, an amino group, a mercapto group, an isocyanate group, a ureide group, or a halogen atom is preferable. Examples of the alkyl group that is substituted by these functional groups can be those described earlier. Moreover, in Chemical Formula (I), m is equal to the valence of a metallic element $M^1$. In Chemical Formula (I), n denotes an integer of 0 to (m−1). Furthermore, in Chemical Formula (I), k indicates an integer of 0 to (m−1), and $1 \leq n+k \leq (m-1)$.

Specific examples of the compound (A) include gamma-glycidoxypropyltrimethoxysilane, (3,4-epoxycyclohexyl)ethyltrimethoxysilane, gamma-aminopropyltrimethoxysilane, gamma-chloropropyltrimethoxysilane, gamma-bromopropyltrimethoxysilane, gamma-mercaptopropyltrimethoxysilane, gamma-isocyanatepropyltrimethoxysilane, and gamma-ureidepropyltrimethoxysilane. Moreover, other compounds also can be used that are obtained by replacing the methoxy groups of the above-mentioned compounds by a chlorine group or an alkoxy group such as an ethoxy group, an n-propoxy group, an iso-propoxy group, an n-butoxy group, or a t-butoxy group. Furthermore, specific examples of the compound (A) also include chloromethylmethyldimethoxysilane, chloromethyldimethylmethoxysilane, 2-chloroethylmethyldimethoxysilane, 2-chloroethyldimethylmethoxysilane, 3-chloropropylmethyldimethoxysilane, 3-chloropropyldimethylmethoxysilane, mercaptomethylmethyldimethoxysilane, mercaptomethyldimethylmethoxysilane, 2-mercaptoethylmethyldimethoxysilane, 2-mercaptoethyldimethylmethoxysilane, 3-mercaptopropylmethyldimethoxysilane, 3-mercaptopropyldimethylmethoxysilane, isocyanatemethylmethyldimethoxysilane, isocyanatemethyldimethylmethoxysilane, 2-isocyanateethylmethyldimethoxysilane, 2-isocyanateethyldimethylmethoxysilane, 3-isocyanatepropylmethyldimethoxysilane, 3-isocyanatepropyldimethylmethoxysilane, ureidemethylmethyldimethoxysilane, ureidemethyldimethylmethoxysilane, 2-ureideethylmethyldimethoxysilane, 2-ureideethyldimethylmethoxysilane, 3-ureidepropylmethyldimethoxysilane, 3-ureidepropyldimethylmethoxysilane, and bis(chloromethyl)methylchlorosilane. Furthermore, other compounds also may be used that are obtained by replacing the methoxy groups of the above-mentioned compounds by a chlorine group or an alkoxy group, such as an ethoxy group, an n-propoxy group, an iso-propoxy group, an n-butoxy group, or t-butoxy group. Further specific examples include chloromethyltrimethoxysilane, 2-chloroethyltrimethoxysilane, 3-chloropropyltrimethoxysilane, 2-chloropropyltrimethoxysilane, 4-chlorobutyltrimethoxysilane, 5-chloropentyltrimethoxysilane, 6-chlorohexyltrimethoxysilane, (dichloromethyl)dimethoxysilane, (dichloroethyl)dimethoxysilane, (dichloropropyl)dimethoxysilane, (trichloromethyl)methoxysilane, (trichloroethyl)methoxysilane, (trichloropropyl)methoxysilane, mercaptomethyltrimethoxysilane, 2-mercaptoethyltrimethoxysilane, 3-mercaptopropyltrimethoxysilane, 2-mercaptopropyltrimethoxysilane, 4-mercaptobutyltrimethoxysilane, 5-mercaptopentyltrimethoxysilane, 6-mercaptohexyltrimethoxysilane, (dimercaptomethyl)dimethoxysilane, (dimercaptoethyl)dimethoxysilane, (dimercaptopropyl)

dimethoxysilane, (trimercaptomethyl)methoxysilane, (trimercaptoethyl)methoxysilane, (trimercaptopropyl)methoxysilane, fluoromethyltrimethoxysilane, 2-fluoroethyltrimethoxysilane, 3-fluoropropyltrimethoxysilane, bromomethyltrimethoxysilane, 2-bromoethyltrimethoxysilane, 3-bromopropyltrimethoxysilane, iodomethyltrimethoxysilane, 2-iodoethyltrimethoxysilane, 3-iodopropyltrimethoxysilane, (chloromethyl)phenyltrimethoxysilane, (chloromethyl)phenylethyltrimethoxysilane, 1-chloroethyltrimethoxysilane, 2-(chloromethyl)allyltrimethoxysilane, (3-chlorocyclohexyl)trimethoxysilane, (4-chlorocyclohexyl)trimethoxysilane, (mercaptomethyl) phenyltrimethoxysilane, (mercaptomethyl)phenylethyltrimethoxysilane, 1-mercaptoethyltrimethoxysilane, 2-(mercaptomethyl)allyltrimethoxysilane, (3-mercaptocyclohexyl) trimethoxysilane, (4-mercaptocyclohexyl)trimethoxysilane, N-(3-triethoxysilylpropyl)gluconamide, N-(3-triethoxysilylpropyl)-4-hydroxybutylamide, isocyanatemethyltrimethoxysilane, 2-isocyanateethyltrimethoxysilane, 3-isocyanatepropyltrimethoxysilane, 2-isocyanatepropyltrimethoxysilane, 4-isocyanatebutyltrimethoxysilane, 5-isocyanatepentyltrimethoxysilane, 6-isocyanatehexyltrimethoxysilane, (diisocyanatemethyl) dimethoxysilane, (diisocyanateethyl)dimethoxysilane, (diisocyanatepropyl)dimethoxysilane, (triisocyanatemethyl) methoxysilane, (triisocyanateethyl)methoxysilane, (triisocyanatepropyl)methoxysilane, ureidemethyltrimethoxysilane, 2-ureideethyltrimethoxysilane, 3-ureidepropyltrimethoxysilane, 2-ureidepropyltrimethoxysilane, 4-ureidebutyltrimethoxysilane, 5-ureidepentyltrimethoxysilane, 6-ureidehexyltrimethoxysilane, (diureidemethyl)dimethoxysilane, (diureideethyl)dimethoxysilane, (diureidepropyl)dimethoxysilane, (triureidemethyl)methoxysilane, (triureideethyl) methoxysilane, and (triureidepropyl)methoxysilane. Furthermore, other compounds may be used that are obtained by replacing the methoxy groups of the above-mentioned compounds by a chlorine group or an alkoxy group, such as an ethoxy group, an n-propoxy group, an iso-propoxy group, an n-butoxy group, or a t-butoxy group.

Preferable compounds (A) include gamma-glycidoxypropyltrimethoxysilane, gamma-glycidoxypropyltriethoxysilane, gamma-chloropropyltrimethoxysilane, gamma-chloropropyltriethoxysilane, gamma-aminopropyltrimethoxysilane, gamma-aminopropyltriethoxysilane, gamma-mercaptopropyltrimethoxysilane, gamma-mercaptopropyltriethoxysilane, gamma-isocyanatepropyltrimethoxysilane, gamma-isocyanatepropyltriethoxysilane, gamma-ureidepropyltrimethoxysilane, and gamma-ureidepropyltriethoxysilane.

The compound (B) is at least one compound that is expressed by Chemical Formula (II) below:

$$M^2(OR^2)_q R^3_{p-q-r} X^2_r \qquad (II).$$

In Chemical Formula (II), $M^2$ denotes an atom selected from Si, Al, Ti, Zr, Cu, Ca, Sr, Ba, Zn, B, Ga, Y, Ge, Pb, P, Sb, V, Ta, W, La, and Nd, and is preferably Si, Al, Ti, or Zr and particularly preferably Si, Al, or Ti. In Chemical Formula (II), $R^2$ indicates an alkyl group such as a methyl group, an ethyl group, an n-propyl group, an iso-propyl group, an n-butyl group, or a t-butyl group and is preferably a methyl group or an ethyl group. Furthermore, in Chemical Formula (II), $X^2$ denotes a halogen atom. Examples of the halogen atom that is indicated by $X^2$ include a chlorine atom, a bromine atom, and an iodine atom, but a chlorine atom is preferable. In Chemical Formula (II), $R^3$ indicates an alkyl group, an aralkyl group, an aryl group, or an alkenyl group. Examples of the alkyl group that is indicated by $R^3$ include a methyl group, an ethyl group, an n-propyl group, an iso-propyl group, an n-butyl group, a t-butyl group, and an n-octyl group. Examples of the aralkyl group that is indicated by $R^3$ include a benzyl group, a phenethyl group, and a trityl group. Examples of the aryl group that is indicated by $R^3$ include a phenyl group, a naphthyl group, a tolyl group, a xylyl group, and a mesityl group. Furthermore, examples of the alkenyl group that is indicated by $R^3$ include a vinyl group and an allyl group. In Chemical Formula (II), p is equal to the valence of a metallic element $M^2$. In Chemical Formula (II), q denotes an integer of 0 to p. Moreover, in Chemical Formula (II), r indicates an integer of 0 to p, and $1 \leq q+r \leq p$.

In Chemical Formulae (I) and (II), $M^1$ and $M^2$ may be identical to each other or may be different from each other. In addition, $R^1$ and $R^2$ also may be identical to each other or may be different from each other.

Specific examples of the compound (B) include: silicon alkoxides such as tetramethoxysilane, tetraethoxysilane, methyltrimethoxysilane, ethyltrimethoxysilane, octyltrimethoxysilane, phenyltrimethoxysilane, vinyltrimethoxysilane, vinyltriethoxysilane, chlorotrimethoxysilane, chlorotriethoxysilane, dichlorodimethoxysilane, dichlorodiethoxysilane, trichloromethoxysilane, and trichloroethoxysilane; halogenated silane such as vinyltrichlorosilane, tetrachlorosilane, and tetrabromosilane; alkoxy titanium compounds such as tetramethoxytitanium, tetraethoxytitanium, tetraisopropoxytitanium, and methyltriisopropoxytitanium; halogenated titanium such as tetrachlorotitanium; alkoxyaluminum compounds such as trimethoxyaluminum, triethoxyaluminum, triisopropoxyaluminum, methyldiisopropoxyaluminum, tributoxyaluminum, and diethoxyaluminum chloride; and alkoxyzirconium compounds such as tetraethoxyzirconium, tetraisopropoxyzirconium, and methyltriisopropoxyzirconium.

Preferably, the composition that forms the gas barrier layer of the gas barrier laminate according to the present invention contains a hydrolysis condensate of the compound (L). The halogen and alkoxy group of the compound (L) is substituted at least partly by a hydroxyl group through hydrolysis of the compound (L). Further, a compound to which a metallic element has been bonded via oxygen is formed through condensation of the hydrolysis product. When this condensation is repeated, a compound that can be considered substantially as a metal oxide is obtained.

The hydrolysis condensate of the compound (L) contained in the gas barrier layer of the gas barrier laminate has preferably a condensation degree P, which is defined below, of 65 to 99%, more preferably 70 to 99%, and further preferably 75 to 99%. The condensation degree P (%) of the hydrolysis condensate of the compound (L) is calculated as follows.

Suppose the total number of the alkoxy groups and the halogen atoms contained in one molecule of the compound (L) is indicated by a. When the proportion of the compound (L) in which the total number of the condensed alkoxy groups and halogen atoms in the hydrolysis condensate of the compound (L) is i (the number of atoms) is yi (%) of the whole compound (L), $\{(i/a) \times yi\}$ is calculated with respect to the respective values of i, which is an integer of 1 to a (including 1 and a). Then the values thus obtained are added together. That is, the condensation degree P (%) is defined by the following mathematical expression:

$$P = \sum_{i=1}^{a} \{(i/a) \times yi\}. \qquad \text{[Mathematical Expression 1]}$$

With respect to the hydrolysis condensate of the compound (L) contained in the gas barrier layer, the above-mentioned value yi can be determined by solid-state NMR (the DD/MAS method), for example.

The hydrolysis condensate can be produced using a raw material by, for example, a technique that is used in a known sol-gel method. Examples of the raw material include the compound (L), a partial hydrolysate of the compound (L), a total hydrolysate of the compound (L), a partial hydrolysis condensate of the compound (L), a product obtained through condensation of a part of a total hydrolysate of the compound (L), and a combination thereof. These raw materials may be produced by a known method, or commercially available raw materials may be used. The raw material is not particularly limited. For example, a condensate that is obtained through hydrolysis and condensation of approximately 2 to 10 molecules can be used as the raw material. Specifically, the raw material to be used herein can be a linear condensate of dimer to decamer obtained through hydrolysis and condensation of tetramethoxysilane, for example.

The number of molecules to be condensed in the hydrolysis condensate of the compound (L) contained in the composition that forms the gas barrier layer of the gas barrier laminate, can be controlled through adjustment in, for example, quantity of water or type or concentration of a catalyst, which is employed for the hydrolysis and condensation, or the temperature, at which the hydrolysis and condensation are carried out.

The method for producing the hydrolysis condensate of the compound (L) is not particularly limited. In a typical example of the sol-gel method, hydrolysis and condensation are carried out by adding water, acid, and alcohol to the above-mentioned raw materials.

In the below, the compound (L) may by described as metal alkoxide (a compound containing metal to which an alkoxy group has been bonded) in some cases. However, a compound containing metal to which halogen has been bonded may be used instead of the metal alkoxide.

As described above, the compound (L) can be at least one of the compound (A) and/or the compound (B). It is preferable that the compound (L) include the compound (A) alone or both the compound (A) and the compound (B), because in this case, the gas barrier laminate has good gas barrier properties. It is further preferable that the compound (L) be composed substantially of both the compound (A) and the compound (B) and the molar ratio of the compound (A)/the compound (B) be in the range of 0.5/99.5 to 40/60. When the compound (A) and the compound (B) are used together in such a ratio, the gas barrier laminate has excellent performance in areas such as gas barrier properties, dynamic properties such as a tensile strength and elongation, appearance, and handling properties, for example. The mole ratio of the compound (A)/the compound (B) is more preferably in the range of 3/97 to 40/60 and further preferably in the range of 5/95 to 30/70.

<Inorganic Components and Others>

Preferably, the content of inorganic components in the composition that forms the gas barrier layer is in the range of 5 to 50 wt % from the viewpoint that the gas barrier laminate is provided with good gas barrier properties. This content is more preferably in the range of 10 to 45 wt % and further preferably in the range of 15 to 40 wt %. The content of the inorganic components in the composition can be calculated from the weight of the raw materials that are used for preparing the composition. That is, suppose the compound (L), a partial hydrolysate of the compound (L), a total hydrolysate of the compound (L), a partial hydrolysis condensate of the compound (L), a product obtained through condensation of a part of a total hydrolysate of the compound (L), or a combination thereof has been totally hydrolyzed and condensed to become a metal oxide, and then the weight of the metal oxide is calculated. The weight of the metal oxide thus calculated is considered as the weight of the inorganic components contained in the component, and thereby the content of the inorganic components is calculated. When an inorganic additive such as a metal salt, a metal complex, or a metal oxide as described later is to be added, the weight of the inorganic additive that has been added to the composition is added simply to the weight of the inorganic components. The calculation of the weight of the metal oxide is described below in further detail. When the compound (A) that is expressed by Chemical Formula (I) is hydrolyzed and condensed completely, a compound whose composition is expressed by $MO_{(n+k)/2}Z^1_{m-n-k}$ is obtained. In this compound, $MO_{(n+k)/2}$ is a metal oxide. $Z^1$ is considered not to be included in inorganic components but to be an organic component. On the other hand, when the compound (B) that is expressed by Chemical Formula (II) is hydrolyzed and condensed completely, a compound whose composition is expressed by $LO_{(q+r)/2}R^3_{p-q-r}$ is obtained. In this compound, $LO_{(q+r)/2}$ is a metal oxide.

In the range that does not impair the effects of the present invention, the composition that forms the gas barrier layer may contain, if desired: for example, inorganic acid metal salt such as carbonate, hydrochloride, nitrate, hydrogen carbonate, sulfate, hydrogen sulfate, phosphate, borate, or aluminate; organic acid metal salt such as oxalate, acetate, tartrate, or stearate; a metal complex such as an acetylacetonato metal complex like aluminum acetylacetonato, a cyclopentadienyl metal complex like titanocene, or a cyano metal complex; a layered clay compound, a crosslinker, polyalcohols, high molecular compounds other than those, a plasticizer, an antioxidant, an ultraviolet absorber, or a flame retardant. The composition that forms the gas barrier layer also may contain: for example, fine powder of metal oxide produced by hydrolyzing and condensing the metal alkoxide by a wet process; fine powder of metal oxide prepared by hydrolyzing, condensing, or burning metal alkoxide by a dry process; or fine silica powder prepared from water glass.

When polyalcohols are contained in the composition that forms the gas barrier layer of the gas barrier laminate of the present invention, the gas barrier laminate has a good surface appearance. More specifically, when polyalcohols are contained, the gas barrier layer tends not to be cracked during the production of the gas barrier laminate and thereby a gas barrier laminate with a good surface appearance is obtained.

Such polyalcohols to be used in the present invention are compounds having at least two hydroxyl groups in a molecule, and they include compounds whose molecular weights range from low to high. Preferably, such polyalcohols are high-molecular-weight compounds such as polyvinyl alcohol, partially saponified polyvinyl acetate, an ethylene-vinyl alcohol copolymer, polyethylene glycol, polyhydroxyethyl (meth)acrylate, polysaccharides such as starch, and polysaccharide derivatives derived from polysaccharides such as starch.

With respect to the amount of the above-mentioned polyalcohols to be used, the weight ratio of the carboxylic acid-containing polymer/the polyalcohols is preferably in the range of 10/90 to 99.5/0.5. The weight ratio is more preferably in the range of 30/70 to 99/1, further preferably 50/50 to 99/1, and most preferably 70/30 to 98/2.

The gas barrier layer of the present invention is formed of a composition on at least one surface of a substrate film. The composition contains a neutralized product of a carboxyl group-containing polymer and preferably a hydrolysis condensate of the compound (L) described above. This gas barrier layer may be formed on only one surface of the substrate or may be formed on both the surfaces thereof. The laminate in which a gas barrier layer is formed on both the surfaces of the substrate has an advantage of facilitating a post-processing of attaching another film thereto, for example.

The thickness of the gas barrier layer is not particularly limited but is preferably in the range of 0.1 pm to 100 μm. When it is thinner than 0.1 μm, the gas barrier laminate may have unsatisfactory gas barrier properties in some cases. On the other hand, when it is thicker than 100 μm, the gas barrier layer may tend to be cracked while the gas barrier laminate is processed, transported, or used. The thickness of the gas barrier layer is more preferably in the range of 0.1 μm to 50 μm and further preferably in the range of 0.1 μm to 20 μm.

The gas barrier laminate of the present invention further can include an adhesive layer (T) disposed between the substrate and the gas barrier layer. With this structure, the adhesiveness between the substrate and the gas barrier layer can be improved. The adhesive layer (T) that is formed of an adhesive resin can be formed by treating the surface of the substrate with a known anchor coating agent, or applying a known adhesive onto the surface of the substrate.

The laminate of the present invention can include a layer formed of an inorganic substance (hereinafter also referred to as an "inorganic layer") between the substrate and the gas barrier layer. The inorganic layer can be formed with an inorganic substance such as an inorganic oxide. The inorganic layer can be formed by a vapor phase film forming method such as a vapor deposition method.

The inorganic substance composing the inorganic layer should be one having gas barrier properties with respect to, for example, oxygen and water vapor, and is preferably one having transparency. The inorganic layer can be formed using inorganic oxide such as aluminum oxide, silicon oxide, silicon oxynitride, magnesium oxide, tin oxide, or a mixture thereof, for example. Among them, aluminum oxide, silicon oxide, and magnesium oxide can be used suitably from the viewpoint that excellent barrier properties with respect to gases such as oxygen and water vapor are obtained.

Preferable thickness of the inorganic layer varies depending on the type of the inorganic oxide composing the inorganic layer but generally is in the range of 2 nm to 500 nm. The thickness that allows the gas barrier laminate to have good gas barrier properties and mechanical properties is selected in that range. When the thickness of the inorganic layer is less than 2 nm, the inorganic layer has no reproducibility in exhibiting the barrier properties with respect to gases such as oxygen and water vapor, and may not exhibit satisfactory gas barrier properties in some cases. In the case where the thickness of the inorganic layer exceeds 500 nm, the gas barrier properties tend to be degraded when the gas barrier laminate is oriented or bent. Accordingly, the thickness of the inorganic layer is preferably in the range of 5 to 200 nm and more preferably in the range of 10 to 100 nm.

An inorganic layer can be formed by depositing inorganic oxide on a substrate. Examples of the formation method include a vacuum vapor deposition method, a sputtering method, an ion plating method, and a chemical vapor deposition method (CVD). Among them, the vacuum vapor deposition method can be used suitably from the viewpoint of productivity. A preferable heating method that is employed for carrying out the vacuum vapor deposition is one of an electron ray heating method, a resistance heating method, and an induction heating method. In order to improve the adhesiveness between the inorganic layer and the substrate as well as the denseness of the inorganic layer, the vapor deposition may be carried out using the plasma assist method or the ion beam assist method. In order to improve the transparency of the inorganic layer, the reactive vapor deposition method may be employed in which, for example, oxygen gas is blown in to cause a reaction in the vapor deposition.

A transparent thermoplastic resin film and thermosetting resin film can be used for the substrate on which the gas barrier layer of the present invention is to be formed. Especially, the thermoplastic resin film is particularly useful as a substrate of the gas barrier laminate to be used for a food packaging material. The substrate can have a multilayer structure formed of a plurality of materials.

Examples of the thermoplastic resin film include films obtained through the process of forming: for example, polyolefin resins such as polyethylene and polypropylene; polyester resins such as polyethylene terephthalate, polyethylene-2,6-naphthalate, polybutylene terephthalate, and copolymers thereof polyamide resins such as polyamide 6, polyamide 66, and polyamide 12; polystyrene, poly(meth)acrylic ester, polyacrylonitrile, polyvinyl acetate, polycarbonate, polyarylate, regenerated cellulose, polyimide, polyetherimide, polysulfone, polyethersulfone, polyether ether ketone, and ionomer resins. Preferable substrates of laminates that are used for food packaging materials are films formed of polyethylene, polypropylene, polyethylene terephthalate, polyamide 6, or polyamide 66. The thermoplastic resin film can be either a non-oriented film or an oriented film, but an oriented film is preferable from the viewpoint of forming processability.

The laminate including a gas barrier layer of the present invention can include other layers in addition to the substrate and the gas barrier layer. Addition of such other layers allows dynamic properties to be improved, for example.

<Process for Producing Gas Barrier Laminate>

Hereinafter, the process for producing a gas barrier laminate of the present invention is described. According to this process, the gas barrier laminate of the present invention can be manufactured easily. The materials to be used in the production process of the present invention and the structure of the laminate are the same as those described above. Hence, the same descriptions may not be repeated in some cases.

In the production process of the present invention, first, a layer made of a composition is formed on a substrate (first step). The composition contains: a hydrolysis condensate of at least one compound (L) containing a metal atom to which at least one characteristic group selected from a halogen atom and an alkoxy group has been bonded; and a polymer (a carboxylic acid-containing polymer) containing at least one functional group selected from a carboxyl group and a carboxylic anhydride group. The first step can be carried out, for example, through: a step of preparing a solution (S) that includes a carboxylic acid-containing polymer and at least one compound containing a metallic element selected from the compound (L), a partial hydrolysate of the compound (L), a total hydrolysate of the compound (L), a partial hydrolysis condensate of the compound (L), and a product obtained through condensation of a part of a total hydrolysate of the compound (L); and a step of forming a layer containing the above-mentioned components by applying the solution (S) to the substrate and then drying it. The solution (S) can be dried by removing the solvent contained in the solution (S).

In the carboxylic acid-containing polymer that is contained in the solution (S), as described above, the —COO— groups contained in the functional group (F) may have been neutralized at least partly (for example, 0.1 to 10 mol %) with univalent ions.

Next, the layer formed on the substrate is brought into contact with a solution containing metal ions with a valence of two or more (second step; hereinafter this step also may be referred to as an "ionization step" in some cases). The functional groups (F) (carboxylic acid and/or carboxylic anhydride) contained in the carboxylic acid-containing polymer in the layer are neutralized at least partly with divalent metal ions through the second step. In this case, the proportion (ionization degree) of the functional groups that are neutralized with the divalent metal ions can be adjusted by changing conditions such as the temperature of the solution containing the metal ions, the metal ion concentration, and the period of time for immersing the layer in the solution containing the metal ions.

The second step can be carried out by spraying a solution containing the metal ions with a valence of two or more on the layer that has been formed, or immersing both the substrate and the layer formed on the substrate in the solution containing the metal ions with a valence of two or more, for example.

In the below, the laminate obtained before the ionization step may be referred to as a "laminate (A)" while the laminate obtained after the ionization step may be referred to as a "laminate (B)" in some cases.

Hereinafter, the at least one compound containing a metallic element selected from the compound (L), a partial hydrolysate of the compound (L), a total hydrolysate of the compound (L), a partial hydrolysis condensate of the compound (L), and a product obtained through condensation of a part of a total hydrolysate of the compound (L) may be referred to as a "compound (L) component". The solution (S) can be prepared using a compound (L) component, a carboxylic acid-containing polymer, and a solvent. For example, a process (1) can be employed in which the compound (L) component is added to a solvent in which a carboxylic-acid containing polymer has been dissolved, which is then mixed together. Furthermore, a process (2) also can be employed in which a compound (A), which is a compound (L) component, is added to a solvent in which a carboxylic-acid containing polymer has been dissolved, and thereafter a compound (L) component is added thereto, which is then mixed together. Moreover, a process (3) also can be employed in which an oligomer (one type of hydrolysis condensate) is prepared from a compound (L) component in the presence of a solvent or in the absence of a solvent, and then a solution in which a carboxylic-acid containing polymer has been dissolved is mixed with the oligomer. The compound (L) component and the oligomer thereof may be added to a solvent individually or may be added to a solvent in the form of a solution in which they have been dissolved.

By using the above-mentioned preparation process (3) as a process of preparing the solution (S), a gas barrier laminate is obtained that has particularly high gas barrier properties. Hereinafter, the preparation process (3) is described in further detail.

The preparation process (3) includes: a step (St1) of preparing a solution by dissolving a carboxylic acid-containing polymer in a solvent; a step (St2) of preparing an oligomer by hydrolyzing and condensing a compound (L) component under specific conditions; and a step (St3) of mixing the solution obtained in step (St1) and the oligomer obtained in step (St2) together.

The solvent that is used for dissolving the carboxylic acid-containing polymer in step (St1) can be selected according to the type of the carboxylic acid-containing polymer. For example, in the case of a water-soluble polymer such as polyacrylic acid and polymethacrylic acid, water is suitable. In the case of polymers such as an isobutylene-maleic anhydride copolymer and a styrene-maleic anhydride copolymer, water containing an alkaline substance such as ammonia, sodium hydroxide, or potassium hydroxide is suitable. Moreover, in step (St1), it is possible to use the following materials additionally, as long as they do not hinder the carboxylic acid-containing polymer from dissolving: alcohols such as methanol and ethanol; ethers such as tetrahydrofuran, dioxane, and trioxane; ketones such as acetone and methyl ethyl ketone; glycols such as ethylene glycols and propylene glycol; glycol derivatives such as methyl cellosolve, ethyl cellosolve, and n-butyl cellosolve; glycerin; acetonitrile, dimethylformamide, dimethylsulfoxide, sulfolane, and dimethoxyethane.

In step (St2), it is preferable that the oligomer be obtained by hydrolyzing and condensing a compound (L) component in a reaction system that includes the compound (L) component, an acid catalyst, water, and, if necessary, an organic solvent. Specifically, the technique that is used in a known sol-gel process is applicable. When the compound (L) is used as the compound (L) component, a gas barrier laminate with further improved gas barrier properties can be obtained.

The acid catalyst that is used in step (St2) can be a known acid catalyst. Examples thereof include hydrochloric acid, sulfuric acid, nitric acid, p-toluenesulfonic acid, benzoic acid, acetic acid, lactic acid, butyric acid, carbonic acid, oxalic acid, and maleic acid. Among them, hydrochloric acid, sulfuric acid, nitric acid, acetic acid, lactic acid, and butyric acid are particularly preferred. A preferable amount of the acid catalyst to be used varies depending on the type of the catalyst to be used. However, with respect to 1 mol of metal atoms of the compound (L) component, the amount of the acid catalyst is preferably in the range of $1 \times 10^{-5}$ to 10 mol, more preferably in the range of $1 \times 10^{-4}$ to 5 mol, and further preferably in the range of $5 \times 10^{-4}$ to 1 mol. When the amount of the acid catalyst to be used is in this range, a gas barrier laminate with excellent gas barrier properties is obtained.

A preferable amount of water to be used in step (St2) varies depending on the type of the compound (L) component. However, with respect to 1 mol of the alkoxy groups or the halogen atoms (when the both are present together, 1 mol in total) of the compound (L) component, the amount of water to be used is preferably in the range of 0.05 to 10 mol, more preferably in the range of 0.1 to 4 mol, and further preferably in the range of 0.2 to 3 mol. When the amount of water to be used is in this range, a gas barrier laminate to be obtained has particularly excellent gas barrier properties. In step (St2), when using a component containing water like hydrochloric acid, it is preferable that the amount of water to be used be determined in consideration of the quantity of water to be introduced by the component.

Furthermore, in the reaction system in step (St2), an organic solvent may be used if needed. The organic solvent to be used is not particularly limited, as long as the compound (L) component is dissolved therein. For example, alcohols such as methanol, ethanol, isopropanol, and normal propanol can be used suitably as the organic solvent. Alcohol having a molecular structure (an alkoxy component) of the same type as that of the alkoxy group that is contained in the compound (L) component is used further suitably. Specifically, methanol is preferable with respect to tetramethoxysilane, while ethanol is preferable with respect to tetraethoxysilane. The amount of the organic solvent to be used is not particularly limited. Preferably, however, it allows the concentration of the compound (L) component to be 1 to 90 wt %, more preferably 10 to 80 wt %, and further preferably 10 to 60 wt %.

In step (St2), the temperature of the reaction system that is employed when the compound (L) component is hydrolyzed and condensed in the reaction system is not necessarily limited. However, the temperature of the reaction system is generally in the range of 2 to 100° C., preferably in the range of 4 to 60° C., and more preferably in the range of 6 to 50° C. The reaction time varies depending on the reaction conditions such as the quantity and type of the catalyst. It, however, is generally in the range of 0.01 to 60 hours, preferably in the range of 0.1 to 12 hours, and more preferably in the range of 0.1 to 6 hours. The atmosphere of the reaction system also is not necessarily limited. The atmosphere to be employed herein can be an air atmosphere, a carbon dioxide atmosphere, an argon atmosphere, or a nitrogen gas stream atmosphere.

In step (St2), all amount of the compound (L) component may be added to the reaction system at once, or the compound (L) component may be added several times to the reaction system little by little. In both the cases, it is preferable that the total amount of the compound (L) component to be used satisfy the above-mentioned suitable range. When the oligomer that is prepared in step (St2) is indicated in terms of the above-mentioned condensation degree P, it is preferable that it have a condensation degree of approximately 25 to 60%.

In step (St3), the solution (S) is prepared by mixing the oligomer that is derived from the compound (L) component and a solution including a carboxylic acid-containing polymer together. From the viewpoints of the storage stability of the solution (S) and the gas barrier properties of the gas barrier laminate to be obtained, the pH of the solution (S) is preferably in the range of 1.0 to 7.0, more preferably in the range of 1.0 to 6.0, and further preferably in the range of 1.5 to 4.0.

The pH of the solution (S) can be adjusted by a known method. For example, it can be adjusted by adding: an acid compound such as hydrochloric acid, nitric acid, sulfuric acid, phosphoric acid, acetic acid, butyric acid, or ammonium sulfate; and a basic compound such as sodium hydroxide, potassium hydroxide, ammonia, trimethylamine, pyridine, sodium carbonate, or sodium acetate. In this case, when using a basic compound that introduces univalent positive ions into the solution, an effect can be obtained that the carboxyl group and/or carboxylic anhydride group of the carboxylic acid-containing polymer can be neutralized partly by the univalent ions.

In the range in which the effects of the present invention are not impaired, the solution (S) also can contain, if desired: inorganic acid-metal salt such as carbonate, hydrochloride, nitrate, hydrogen carbonate, sulfate, hydrogen sulfate, phosphate, borate, or aluminate; organic acid-metal salt such as oxalate, acetate, tartrate, or stearate; a metal complex such as an acetylacetonato metal complex like aluminum acetylacetonato, a cyclopentadienyl metal complex like titanocene, or a cyano metal complex; a layered clay compound, a crosslinker, the above-mentioned polyalcohols, high molecular compounds other than those, a plasticizer, an antioxidant, an ultraviolet absorber, or a flame retardant. The solution (S) also may include fine powder of metal oxide produced by hydrolyzing and polycondensing the above-mentioned metal alkoxide by a wet process; fine powder of metal oxide prepared by hydrolyzing, polycondensing, or burning metal alkoxide by a dry process; or fine silica powder prepared from water glass, for example.

The solution (S) prepared in step (St3) is applied to at least one surface of a substrate. Before the application of the solution (S), the surface of the substrate may be treated with a known anchor coating agent, or a known adhesive may be applied to the surface of the substrate. The method of applying the solution (S) to the substrate is not particularly limited and a known method therefore can be employed. Examples of a preferable method include a cast method, a dipping method, a roll coating method, a gravure coating method, a screen printing method, a reverse coating method, a spray coating method, a kit coating method, a die coating method, a metering bar coating method, a chamber doctor coating method, and a curtain coating method.

After application of the solution (S) onto the substrate, the solvent contained in the solution (S) is removed and thereby a laminate (laminate (A)) in the state before being subjected to the ionization step is obtained. The method of removing the solvent is not particularly limited and a known method therefore can be used. Specifically, methods such as a hot-air drying method, a hot roll contact method, an infrared heating method, and a microwave heating method can be used individually or in combination. The drying temperature is not particularly limited as long as it is lower than the flow start temperature of the substrate by at least 15 to 20° C. and also is lower than the thermal decomposition start temperature of the carboxylic acid-containing polymer by at least 15 to 20° C. The drying temperature is preferably in the range of 80° C. to 200° C., more preferably in the range of 100 to 180° C., and further preferably in the range of 110 to 180° C. The solvent can be removed under either a normal pressure or a reduced pressure.

The laminate (A) obtained through the above-mentioned steps is brought into contact with a solution (hereinafter also referred to as a "solution (MI)" in some cases) containing metal ions with a valence of two or more (ionization step). Thus, the gas barrier laminate of the present invention is obtained. The ionization step may be carried out at any stage, as long as the effects of the present invention are not impaired. The ionization step can be carried out before or after the laminate is processed into the form of a packaging material, or after the packaging material is filled with contents and then is sealed, for example.

The solution (MI) can be prepared by dissolving, in a solvent, a compound (a polyvalent metal compound) that releases metal ions with a valence of two or more upon dissolution. The solvent to be used for preparing the solution (MI) is desirably water but may be a mixture of water and an organic solvent that can be mixed with water. Examples of such a solvent include organic solvents of lower alcohols such as methanol, ethanol, n-propanol, and isopropanol; ethers such as tetrahydrofuran, dioxane, and trioxane; ketones such as acetone, methyl ethyl ketone, methyl vinyl ketone, and methyl isopropyl ketone; glycols such as ethylene glycol and propylene glycol; glycol derivatives such as methyl cellosolve, ethyl cellosolve, and n-butyl cellosolve; glycerin; acetonitrile, dimethylformamide, dimethylacetamide, dimethylsulfoxide, sulfolane, and dimethoxyethane.

The polyvalent metal compound to be used herein can be a compound that releases metal ions (i.e. metal ions with a valence of two or more) described as examples with respect to the gas barrier laminate of the present invention. Examples thereof include: calcium acetate, calcium hydroxide, calcium chloride, calcium nitrate, calcium carbonate, magnesium acetate, magnesium hydroxide, magnesium chloride, magnesium carbonate, iron(II) acetate, iron(II) chloride, iron(III) acetate, iron(III) chloride, zinc acetate, zinc chloride, copper (II) acetate, copper(III) acetate, lead acetate, mercury(II) acetate, barium acetate, barium sulfate, nickel sulfate, lead sulfate, zirconium chloride, zirconium nitrate, aluminum sulfate, potassium alum ($KAl(SO_4)_2$), and titanium(IV) sulfate. Only one of the polyvalent metal compounds may be used or two or more of them may be used in combination. Examples of a preferable polyvalent metal compound include calcium acetate, calcium hydroxide, magnesium acetate, and zinc acetate.

The concentration of the polyvalent metal compound in the solution (MI) is not particularly limited. It, however, is preferably in the range of $5\times10^{-4}$ wt % to 50 wt %, more preferably in the range of $1\times10^{-2}$ wt % to 30 wt %, and further preferably in the range of 1 wt % to 20 wt %.

When the laminate (A) is brought into contact with the solution (MI), the temperature of the solution (MI) is not particularly limited. However, the higher the temperature, the higher the ionization rate of the carboxyl group-containing polymer. Preferable temperature is, for example, in the range of 30 to 140° C. The temperature is preferably in the range of 40° C. to 120° C. and more preferably in the range of 50° C. to 100° C.

Desirably, after the laminate (A) is brought into contact with the solution (MI), the solvent that has remained on the laminate is removed. The method of removing the solvent is not particularly limited. A known method can be used. Specifically, drying techniques such as a hot-air drying method, a hot roll contact method, an infrared heating method, and a microwave heating method can be used individually or two or more of them can be used in combination. The temperature at which the solvent is removed is not particularly limited as long as it is lower than the flow start temperature of the substrate by at least 15 to 20° C. and also is lower than the thermal decomposition start temperature of the carboxylic acid-containing polymer by at least 15 to 20° C. The drying temperature is preferably in the range of 40° C. to 200° C., more preferably in the range of 40 to 150° C., and further preferably in the range of 40 to 100° C. The solvent can be removed under either a normal pressure or a reduced pressure.

In order not to impair the surface appearance of the gas barrier laminate, it is preferable that the superfluous polyvalent metal compound that has adhered to the surface of the laminate be removed before or after the solvent is removed. A preferable method of removing the polyvalent metal compound is washing using a solvent in which the polyvalent metal compound dissolves. A solvent that can be used for the solution (MI) can be employed as the solvent in which the polyvalent metal compound dissolves, and it is preferable that the same solvent as that of the solution (MI) be used.

The production process of the present invention further may include a step of heat-treating the layer formed in the first step at a temperature of 120 to 240° C., after the first step and before and/or after the second step. In other words, the laminate (A) or (B) can be heat-treated. The heat treatment can be carried out at any stage after the solvent of the solution (S) that had been applied has been removed substantially. However, when the laminate (i.e. the laminate (A)) is heat-treated before being subjected to the ionization step, a gas barrier laminate with a good surface appearance is obtained. The temperature for the heat treatment is preferably in the range of 120° C. to 240° C., more preferably in the range of 130° C. to 230° C., and further preferably in the range of 150° C. to 210° C. The heat treatment can be carried out, for example, in air, a nitrogen atmosphere, or an argon atmosphere.

In the production process of the present invention, the laminate (A) or (B) may be irradiated with ultraviolet rays. The ultraviolet irradiation may be carried out any time after the solvent of the solution (S) that had been applied has been removed substantially. The method of the ultraviolet irradiation is not particularly limited, and a know method can be used. The wavelengths of the ultraviolet rays that are used for the irradiation are preferably in the range of 170 to 250 nm and more preferably in the range of 170 to 190 nm and/or in the range of 230 to 250 nm. Furthermore, instead of the ultraviolet irradiation, irradiation with radial rays such as electron rays or gamma rays may be carried out.

Only either the heat treatment or the ultraviolet irradiation may be carried out, or the both may be employed together. When the heat treatment and/or the ultraviolet irradiation are/is carried out, the laminate may exhibit further improved gas barrier properties in some cases.

When the surface of the substrate is subjected to a treatment (a treatment to be carried out using an anchor coating agent, or application of an adhesive) before the application of the solution (S) in order to dispose the adhesive layer (T) between the substrate and the gas barrier layer, it is preferable that a maturing process in which the substrate to which the solution (S) has been applied is allowed to stand at a relatively low temperature for a long period of time be carried out after the first step (the application of the solution (S)) but before the above-mentioned heat treatment and the second step (the ionization step). The temperature for the maturing process is preferably 30 to 200° C., more preferably 30 to 150° C., and further preferably 30 to 120° C. The period of time for the maturing process is preferably in the range of 0.5 to 10 days, more preferably in the range of 1 to 7 days, and further preferably in the range of 1 to 5 days. When such a maturing process is carried out, the adhesiveness between the substrate and the gas barrier layer further improves. It is preferable that the above-mentioned heat treatment (a heat treatment at 120° C. to 240° C.) further be carried out after the maturing process.

The gas barrier laminate of the present invention has excellent transparency and excellent barrier properties with respect to gases such as oxygen, water vapor, carbon dioxide, and nitrogen. It can maintain excellent barrier properties to a high degree even under a high humidity condition or even after it is subjected to a bending condition. Furthermore, even after it is subjected to a retort process, it exhibits excellent gas barrier properties. As described above, since the gas barrier laminate of the present invention has good gas barrier properties that do not depend on the environmental conditions such as humidity, and exhibits high gas barrier properties even after being subjected to a bending condition, the paper container with a window of the present invention is applicable to various uses because it is easy to produce, the gas barrier properties thereof are not degraded during transportation, and the contents thereof can be viewed easily. For instance, the paper container with a window of the present invention is particularly useful as a food packaging material. Furthermore, it also can be used as packaging materials for packaging, for example, chemicals such as agricultural chemicals and medicines.

The retort paper container of the present invention has excellent barrier properties with respect to gases such as oxygen, steam, carbon dioxide, and nitrogen and can retain the excellent barrier properties to a high degree even under a high humidity condition or even after being subjected to a bending condition. Moreover, even after it is subjected to a retort process, it exhibits excellent gas barrier properties. Thus, the paper container of the present invention has good gas barrier properties that do not depend on the environmental conditions such as humidity, and it exhibits excellent gas barrier properties even after it is subjected to a bending condition. It therefore is applicable to various uses. For instance, the gas barrier laminate of the present invention is particularly useful as a food packaging material (particularly, a packaging material for pouch-packed foods). The gas barrier laminate of the present invention also can be used as a packaging material for packaging, for example, chemicals such as agricultural chemicals and medicines.

The vacuum heat insulator of the present invention can be used for various applications that require cold insulation and heat insulation. More specifically, it can be used as a vacuum heat insulator for various applications such as a refrigerator, a freezer, a ceiling part of a car, a battery, a freezing carrier, a refrigerated vessel, a heat insulation container, a freezer showcase, a cold showcase, a portable cooler, a heat insulation case for cooking, a vending machine, a solar water heater, a building material (a wall part, a ceiling part, an attic part, and a floor part), a pipe or duct, for example, for hot water, cooling water, or cryogenic fluid, clothes, and bedclothes, which require insulation such as cold insulation and heat insulation.

The infusion bag of the present invention has transparency and flexibility. Furthermore, it has high oxygen barrier properties before and after the heat sterilization process and can prevent liquid pharmaceutical agents such as an amino-acid transfusion, an electrolyte transfusion, a sugar transfusion, and a fat emulsion for transfusion from being deteriorated by oxygen.

The cover member of the present invention has high oxygen barrier properties even under high humidity. Furthermore, the oxygen barrier properties thereof are not degraded during, for example, processes or transportation. Moreover, it has environmental suitability. The cover member of the present invention can be used as a cover member of a container with a cover whose content is, for example, rice, cup noodle, yogurt, fruit jelly, pudding, or a soybean paste. It can prevent the content from being deteriorated for a long period of time.

The laminate tube container of the present invention has high oxygen barrier properties and the oxygen barrier properties thereof are not degraded even after it is squeezed. Accordingly, it allows contents susceptible to oxygen deterioration to be protected from oxygen for a long period of time. Furthermore, it allows contents to be seen through it and has no problem in disposal. The laminate tube container of the present invention can be used as a laminate tube container whose content is, for example, a cosmetic, a chemical, a pharmaceutical agent, a toiletry article such as a toothpaste, or a foodstuff such as a mustard paste or a green horseradish paste.

In the vacuum packaging bag of the present invention, the gas barrier properties thereof are not degraded by deformation of the packaging bag due to, for example, folding, bending, expansion, or contraction at the time of vacuum packaging or by deformation of the packaging bag due to, for example, expansion, contraction, or bending at the time of heat sterilization process to be carried out thereafter. Accordingly, the vacuum packaging bag of the present invention has excellent oxygen barrier properties even after vacuum packaging or vacuum packaging and heat sterilization. Furthermore, the vacuum packaging bag allows the state of contents to be checked and is environmentally suitable. The vacuum packaging bag of the present invention has a prominent effect as compared to conventional barrier materials when the content includes a solid content. Examples of such content include corn on the cob, bamboo shoots, potato, pickles, tea leaves, peanuts, beans, coffee beans, cheese, meat, hamburgers, sausages, fish, and confectionery.

The pouch with a spout of the present invention can be produced by a bag-making process usually employed. It can be formed into arbitrary shape and size according to, for example, the intended use. A bag-making process to be employed herein can be a bag-making process in which a single laminate formed of a gas barrier laminate used in the present invention described above or a multilayer laminate including a gas barrier laminate is formed and then a bag is made from the laminate. When a bag is made from laminates, after the laminates are placed on top of each other and the periphery thereof is heat-sealed into a predetermined shape to form a bag, a plug member obtained by, for example, injection molding of polyethylene or polypropylene can be attached by heat seal.

Hereinafter, the present invention is described in further detail using examples. The present invention, however, is not limited by the examples.

Oxygen Barrier Properties (in the Case of Examples 1-1 to 1-3)

With respect to a laminate having a predetermined structure, the oxygen transmission rate was measured using an oxygen transmission rate test system ("MOCON OX-TRAN 10/50", manufactured by Modern Controls, Inc.). Specifically, the laminate was set in such a manner that the gas barrier layer faced the oxygen supply side and OPET faced the career gas side. Then the oxygen transmission rate (unit: $cm^3/m^2 \cdot day \cdot atm$) was measured under conditions including a temperature of 20° C., an oxygen pressure of 1 atm, and a career gas pressure of 1 atm. For the measurement, three humidity conditions, specifically, 65% RH, 85% RH, and 95% RH, were employed. The oxygen supply side and the career gas side had the same humidity.

Oxygen Barrier Properties (in the Case of Examples 2-1 to 2-4)

With respect to a brick-type paper container having a predetermined structure, the oxygen transmission rate was measured using the oxygen transmission rate test system ("MOCON OX-TRAN 10/50", manufactured by Modern Controls, Inc.). Specifically, a circular sample with a diameter of 6.5 cm was cut out from the side face of the brick-type paper container and was placed on a circle with a diameter of 4.5 cm cut in aluminum foil (with a thickness of 30 µm) of 10 cm square, and the sample and the aluminum foil were sealed together with a two-component curable epoxy adhesive provided therebetween, which was then set on the oxygen transmission rate test system. Then the oxygen transmission rate (unit: $cm^3/m^2 \cdot day \cdot atm$) was measured under conditions including a temperature of 20° C., an oxygen pressure of 1 atm, and a career gas pressure of 1 atm. The humidity condition employed for the measurement was 85% RH, and the oxygen supply side and the career gas side had the same humidity.

Oxygen Barrier Properties Obtained after Retort Process (in the Case of Examples 2-1 to 2-4)

After 500 g of distilled water was poured into a brick-type paper container (with a volume of 500 ml) having a predetermined structure, it was immersed in an autoclave filled with tap water or ion-exchanged water and thereby was retort-processed at 120° C. for 30 minutes. After the retort process, heating was stopped and the brick-type paper container was removed from the autoclave when the internal temperature became 60° C. The brick-type paper container was then allowed to stand for one hour in a room whose humidity had been conditioned to 85% RH at 20° C. Thereafter, the heat-sealed portion was cut off with scissors. Water adhering to the surface of the laminate was wiped off with a paper towel pressed lightly against it. Thereafter, the brick-type paper container was allowed to stand for one week in a room whose humidity had been conditioned to 85% RH at 20° C. The sample was cut out from the resultant brick-type paper container and then was subjected to the same measurement as that of "(2) Oxygen barrier properties" described above. Thus, the oxygen barrier properties obtained after the retort process were evaluated.

The calcium metal contained in the tap water used for the retort process had a concentration of 15 ppm. Furthermore, it was confirmed that the ion-exchanged water was free from metal atoms. In the following examples and comparative examples, the retort processes were carried out using tap water unless otherwise specified.

Evaluation of Appearance Observed after High-pressure Steam Sterilization Process Infusion bags obtained in Examples 4-1 to 4-5 were filled with distilled water. Thereafter, they each were subjected to a high-pressure steam sterilization process under two conditions, one at 110° C. for 30 minutes and one at 135° C. for 30 minutes, or under one condition at 110° C. for 30 minutes. The appearances thereof were observed visually after the high-pressure steam sterilization process with respect to, for example, transparency, change in shape (bag breakage or crease), and blocking.

Oxygen Barrier Properties Obtained after High-pressure Steam Sterilization Process (in the Case of Examples 4-1 to 4-5)

After the high-pressure steam sterilization process, samples for oxygen transmission rate measurement were cut off from the infusion bags whose appearances had been observed. Thereafter, water adhering to the surface of each sample was wiped off with a paper towel pressed lightly against it, and the oxygen transmission rate thereof was measured. The oxygen transmission rate was measured using the oxygen transmission rate test system ("MOCON OX-TRAN 10/50", manufactured by Modern Controls, Inc.). Specifically, the laminate composing the infusion bag was set in such a manner that the outer layer of the laminate faced the oxygen supply side and the inner layer of the laminate faced the career gas side. Then the oxygen transmission rate (unit: $cm^3/m^2 \cdot days \cdot atm$) was measured under conditions including a temperature of 20° C., a humidity on the oxygen supply side of 85% RH, a humidity on the carrier gas side of 100% RH, an oxygen pressure of 1 atm, and a career gas pressure of 1 atm.

Oxygen Barrier Properties Under High Humidity (in the Case of Examples 5-1 to 5-3)

A sample for oxygen transmission rate measurement was cut off from each cover member obtained in the examples. The oxygen transmission rate was measured using an oxygen transmission rate test system ("MOCON OX-TRAN 10/20", manufactured by Modern Controls, Inc.). Specifically, the laminate composing the cover member was set in such a manner that the outer layer of the laminate faced the oxygen supply side and the inner layer of the laminate faced the career gas side. Then the oxygen transmission rate (unit: $cm^3/m^2 \cdot day \cdot atm$) was measured under conditions including a temperature of 20° C., a humidity on the oxygen supply side of 90% RH, a humidity on the carrier gas side of 90% RH, an oxygen pressure of 1 atm, and a career gas pressure of 1 atm.

Oxygen Barrier Properties Obtained after Bending

In the cover member of the present invention, the degradation in oxygen barrier properties caused due to, for instance, physical impacts or deformation during, for example, processing and transportation is suppressed to a low degree. Bending caused by a Gelbo flex tester (manufactured by Rigaku Kogyo Co., Ltd.) was used for physical impact and deformation. The laminate for each cover member obtained in the examples was cut into a size of A4. This was subjected to 200 cycles of bending with the Gelbo flex tester. After bending, a sample for oxygen transmission rate measurement was cut off. Thereafter, the oxygen transmission rate (unit: $cm^3/m^2 \cdot day \cdot atm$) was measured by the aforementioned method under conditions including a temperature of 20° C., a humidity on the oxygen supply side of 90% RH, a humidity on the carrier gas side of 90% RH, an oxygen pressure of 1 atm, and a career gas pressure of 1 atm.

Measurement of Oxygen Barrier Properties (in the Case of Examples 6-1 to 6-3)

A sample for oxygen transmission rate measurement was cut off from each of the laminate tube containers obtained in the examples. The oxygen transmission rate was measured using an oxygen transmission rate test system ("MOCON OX-TRAN 2/20", manufactured by Modern Controls, Inc.). Specifically, the laminate composing the cover member was set in such a manner that the outer layer of the laminate faced the oxygen supply side and the inner layer of the laminate faced the career gas side. Then the oxygen transmission rate (unit: $cm^3/m^2 \cdot day \cdot atm$) was measured under conditions including a temperature of 20° C., a humidity on the oxygen supply side of 90% RH, a humidity on the carrier gas side of 90% RH, an oxygen pressure of 1 atm, and a career gas pressure of 1 atm.

Oxygen Barrier Properties Obtained after Squeezing

A laminate tube container filled with a green horseradish paste was held between fingers and was reciprocated in the direction along the laminate tube while being pressed with the fingers by a certain force. After 2000 reciprocations, the content, the green horseradish paste, was removed and a sample for oxygen transmission rate measurement was cut off from the laminate tube container. The content was wiped off with a paper towel. The oxygen transmission rate was measured under the same conditions as those employed for the measurement in (1) described above.

Oxygen Barrier Properties (in the Case of Examples 7-1 to 7-3)

A sample for oxygen transmission rate measurement was cut out from each vacuum packaging bag obtained in the examples. The oxygen transmission rate was measured using the oxygen transmission rate test system ("MOCON OX-TRAN 2/20", manufactured by Modern Controls, Inc.). Specifically, the laminate composing the vacuum packaging bag was set in such a manner that the outer layer of the laminate faced the oxygen supply side and the inner layer of the laminate faced the career gas side. Then the oxygen transmission rate (unit: $cm^3/m^2 \cdot day \cdot atm$) was measured under conditions including a temperature of 20° C., a humidity on the oxygen supply side of 85% RH, a humidity on the carrier gas side of 100% RH, an oxygen pressure of 1 atm, and a career gas pressure of 1 atm.

Measurement of Tensile Strength at Break Point and Tensile Elongation at Break (in the Case of Example 7-2)

Samples for oxygen transmission rate measurement were cut off from the vacuum packaging bag that had been obtained in the example, before and after the retort process. The samples were measured for tensile rupture strength and tensile elongation at break according to JIS-7127. After humidity conditioning was carried out for seven days under an atmosphere of 50% RH at 23° C., a strip piece with a width of 15 mm and a length of 100 mm was prepared. This film sample was used to measure the tensile rupture strength and tensile elongation at break under conditions including a chuck interval of 50 mm and a tensile speed of 500 mm/min with an autograph AGS-H type manufactured by Shimadzu Corporation. The measurement was carried out with respect to 10 samples each and the average was then determined.

Appearance Evaluation after Retort Sterilization Process (in the Case of Examples 8-1 to 8-3)

The pouches with a spout obtained in Examples 1 and 2 as well as Comparative Example 1 were filled with distilled water. Thereafter, they each were subjected to a retort sterilization process under two conditions, one at 110° C. for 30 minutes and one at 135° C. for 30 minutes, or under one condition at 110° C. for 30 minutes. The appearances thereof were observed visually after the retort sterilization process with respect to, for example, transparency, change in shape (bag breakage or crease), and blocking.

Oxygen Barrier Properties Obtained after Retort Sterilization Process (in the Case of Examples 8-1 to 8-3)

After the retort sterilization process, samples for oxygen transmission rate measurement were cut off from the pouches with a spout whose appearances had been observed. Thereafter, water adhering to the surface of each sample was wiped off with a paper towel pressed lightly against it, and the oxygen transmission rate thereof was measured. The oxygen transmission rate was measured using the oxygen transmission rate test system ("MOCON OX-TRAN 10/50", manufactured by Modern Controls, Inc.). Specifically, the laminate composing the pouch with a spout was set in such a manner that the outer layer of the laminate faced the oxygen supply side and the inner layer of the laminate faced the career gas side. Then the oxygen transmission rate (unit: $cm^3/m^2 \cdot days \cdot atm$) was measured under conditions including a temperature of 20° C., a humidity on the oxygen supply side of 85% RH, a humidity on the carrier gas side of 100% RH, an oxygen pressure of 1 atm, and a career gas pressure of 1 atm.

Appearance Evaluation after Bag Drop Breakage Test

The pouches with a spout obtained in Examples 8-1 and 8-2 as well as Comparative Example 1 were filled with distilled water. They each were dropped 50 times from a height of 1.5 m, with the side wall face of the pouch with a spout facing downward. Thereby the presence of bag breakage was observed visually.

◯: absence of bag breakage
X: presence of bag breakage

[Neutralization Degree (Ionization Degree) of Carboxyl Groups Achieved with Metal Ions]

With respect to the laminate produced for evaluating the oxygen barrier properties as described above, the peak of the stretching vibration of C═O that was contained in the gas barrier layer was observed in the mode of ATR (attenuated total reflection) using a Fourier Transform Infrared Spectrophotometer (8200PC, manufactured by Shimadzu Corporation). The peak that was derived from the stretching vibration of C═O of the carboxyl group contained in the carboxylic acid-containing polymer before ionization was observed in the range of $1600 \, cm^{-1}$ to $1850 \, cm^{-1}$. The stretching vibration of C═O of the carboxyl group after ionization was observed in the range of $1500 \, cm^{-1}$ to $1600 \, cm^{-1}$. Then, the ratio thereof was calculated from the maximum absorbance in the respective ranges. Subsequently, the ionization degree was determined using the ratio and the analytical curve that had been prepared beforehand by the following process.

[Preparation of Analytical Curve]

Polyacrylic acid with a number average molecular weight of 150,000 was dissolved in distilled water, and carboxyl groups were neutralized with a predetermined amount of sodium hydroxide. A substrate was coated with an aqueous solution of the neutralized product of the polyacrylic acid thus obtained, in such a manner that the aqueous solution had the same thickness as that of the gas barrier layer of the laminate to be subjected to the measurement of ionization degree. This then was dried. The substrate used herein was an oriented PET film (Lumirror (trade name) with a thickness of 12 μm, manufactured by Toray Industries, Inc.; hereinafter abbreviated as "OPET" in some cases) whose surface was coated with a two-component anchor coating agent (Takelac 3210 (trade name) and Takenate A3072 (trade name), manufactured by Mitsui Takeda Chemicals, Inc.; hereinafter abbreviated as "AC" in some cases). Thus, 11 standard samples [laminates (layer formed of neutralized product of polyacrylic acid/AC/OPET)] were produced. The 11 standard samples were different from each other in neutralization degree of the carboxyl groups, with the neutralization degree varying between 0 and 100 mol % by increments of 10 mol %. With respect to these samples, the infrared absorption spectrum was measured in the mode of ATR (attenuated total reflection) using a Fourier Transform Infrared Spectrophotometer (8200PC, manufactured by Shimadzu Corporation). With respect to the two peaks corresponding to the stretching vibration of C═O that was contained in the layer formed of the neutralized product of polyacrylic acid, i.e. the peak observed in the range of $1600 \, cm^{-1}$ to $1850 \, cm^{-1}$ and the peak observed in the range of $1500 \, cm^{-1}$ to $1600 \, cm^{-1}$, the ratio between the maximum values of absorbance was calculated. Then using the ratios thus calculated and the ionization degrees of the respective standard samples, the analytical curve was prepared.

EXAMPLE 1-1

Polyacrylic acid (PAA) with a number average molecular weight of 150,000 was dissolved in distilled water. Thereafter, ammonia water was added thereto and thereby 1.5 mol % of the carboxyl groups of the polyacrylic acid were neutralized. Thus, a polyacrylic acid aqueous solution was obtained that had a solid content concentration of 10 wt %.

Next, 68.4 parts by weight of tetramethoxysilane (TMOS) was dissolved in 82.0 parts by weight of methanol. Subsequently, 13.6 parts by weight of gamma-glycidoxypropyltrimethoxysilane was dissolved therein. Thereafter, 5.13 parts by weight of distilled water and 12.7 parts by weight of 0.1N (0.1 normal) hydrochloric acid were added thereto. Thus, a sol was prepared. This was allowed to undergo hydrolysis and condensation reactions at 10° C. for one hour while being stirred. The sol thus obtained was diluted with 185 parts by weight of distilled water, which then was added promptly to 634 parts by weight of the above-mentioned 10-wt % polyacrylic acid aqueous solution that was being stirred. Thus a solution (S1) was obtained.

On the other hand, an oriented PET film (OPET; Lumirror (trade name), manufactured by Toray Industries, Inc.) was coated with a two-component anchor coating agent (AC; Takelac A626 (trade name) and Takenate A50 (trade name), manufactured by Mitsui Takeda Chemicals, Inc.), which then was dried. Thus a substrate (AC/OPET) having an anchor coating layer was produced. The anchor coating layer of the substrate was coated with the solution (S1) using a bar coater in such a manner that the solution (S1) formed a layer with a thickness of 1 μm after being dried. This was dried at 80° C. for five minutes. The opposite surface of the oriented PET film was coated with the anchor coating agent and the solution (S1) in the same manner. Thereafter, it further was heat-treated in dry air at 200° C. for five minutes. Thus, a laminate (gas barrier layer (1 μm)/AC layer/OPET layer (12 μm)/AC layer/gas barrier layer (1 μm)) with gas barrier layers that were colorless and transparent and had a good appearance was obtained (hereinafter, this laminate may be referred to as a "laminate (1)").

Next, calcium acetate was dissolved in distilled water so that the concentration thereof was 10 wt %. This aqueous solution was kept warm at 80° C. Then, the laminate (1) obtained above was immersed in this aqueous solution (80° C.; MI-1) for approximately 300 seconds. Thereafter, this laminate was removed therefrom. Then the surfaces of the laminate were washed with distilled water whose temperature had been adjusted to 80° C. After that, it was dried at 80° C. for five minutes. Thus, a laminate (B-1) of the present invention was obtained. With respect to the laminate (B-1), the neutralization degree of the carboxyl groups of the polyacrylic acid contained in the gas barrier layers was determined by the aforementioned method. As a result, it was proved that 95 mol % of the carboxyl groups had been neutralized by calcium ions.

The oxygen gas barrier properties of the laminate (B-1) were determined. It exhibited a very good value, specifically an oxygen transmission rate of 0.10 cc/m$^2$·day·atm at 20° C. and 85% RH.

Using a 400 g/m$^2$ paperboard, a laminate composed of polypropylene (PP) layer/polypropylene adhesive resin (PP adhesive) layer/paper layer/PP adhesive layer/PP layer was produced by the extrusion lamination process. Extrusion coating was carried out so that each PP layer had a thickness of 25 μm and each PP adhesive resin layer had a thickness of 5 μm. Thereafter, a portion was cut out from a predetermined place thereof. An adhesive was applied to one surface thereof and a laminate (B-1) was laminated thereon. An adhesive was applied to the other surface of the laminate (B-1), and a 50-μm thick non-oriented polypropylene film (CPP) (Tohcello CP RXC-18, manufactured by Tohcello Co., Ltd.) was bonded thereto. Thus a laminate was produced having a structure of PP layer/paper layer/PP layer/laminate (B-1)/CPP layer. In the production of this laminate, an anchor coating agent was used according to need. This laminate was used to produce a gable top paper container provided with a slot-shaped cutout in a position as indicated in FIG. 1. The paper container was filled with a content to package it. The sealed liquid paper container produced above had excellent barrier properties with respect to oxygen gas, did not allow deterioration of the content to be observed, tolerated distribution in the market, and was excellent in, for example, preservation and storage properties.

EXAMPLE 1-2

Polyacrylic acid (PAA) with a number average molecular weight of 150,000 was dissolved in distilled water. Thereafter, ammonia water was added thereto and thereby 1.5 mol % of carboxyl groups of the polyacrylic acid were neutralized. Thus, a polyacrylic acid aqueous solution was obtained that had a solid content concentration of 10 wt %.

Next, 68.4 parts by weight of tetramethoxysilane (TMOS) was dissolved in 79.7 parts by weight of methanol. Subsequently, 11.3 parts by weight of 3-mercaptopropyltrimethoxysilane (manufactured by Chisso Corporation) was dissolved therein. Thereafter, 5.13 parts by weight of distilled water and 12.7 parts by weight of 0.1N hydrochloric acid were added thereto. Thus, a sol was prepared. This was allowed to undergo hydrolysis and condensation reactions at 10° C. for one hour while being stirred. The sol thus obtained was diluted with 189 parts by weight of distilled water, which then was added promptly to 658 parts by weight of the above-mentioned 10-wt % polyacrylic acid aqueous solution that was being stirred. Thus a solution (S2) was obtained.

On the other hand, an oriented PET film (OPET; Lumirror (trade name), manufactured by Toray industries, Inc.) was coated with a two-component anchor coating agent (AC; Takelac A626 (trade name) and Takenate A50 (trade name), manufactured by Mitsui Takeda Chemicals, Inc.), which then was dried. Thus a substrate (AC/OPET) having an anchor coating layer was produced. The anchor coating layer of the substrate was coated with the solution (S2) using a bar coater in such a manner that the solution (S2) formed a layer with a thickness of 1 μm after being dried. This was dried at 80° C. for five minutes. The opposite surface of the oriented PET film also was coated with the anchor coating agent and the solution (S2) in the same manner. Thereafter, it further was heat-treated in dry air at 200° C. for five minutes. Thus, a laminate (gas barrier layer (1 μm)/AC layer/OPET layer (12 μm)/AC layer/gas barrier layer (1 μm)) with gas barrier layers that were colorless and transparent and had a good appearance was obtained (hereinafter, this laminate may be referred to as a "laminate (2)").

Next, calcium acetate was dissolved in distilled water so that the concentration thereof was 10 wt %. This aqueous solution was kept warm at 80° C. The laminate (1) obtained above was then immersed in this aqueous solution (80° C.; MI-2) for approximately 300 seconds. Thereafter, this laminate was removed therefrom. Then the surfaces of the laminate were washed with distilled water whose temperature had been adjusted to 80° C. After that, it was dried at 80° C. for five minutes. Thus, a laminate (B-2) of the present invention was obtained. With respect to the laminate (B-2), the neutralization degree of the carboxyl groups of the polyacrylic acid contained in the gas barrier layers was determined by the aforementioned method. As a result, it was proved that 99 mol % of the carboxyl groups had been neutralized by calcium ions.

Extrusion coating with low density polyethylene (LDPE) was carried out with respect to both surfaces of a 400 g/m$^2$ paperboard, with each layer of LDPE having a thickness of 25 μm. Thereafter, a portion was cut out from a predetermined place thereof. An adhesive was applied to one surface thereof and a laminate (B-2) was laminated thereon. The other surface of the laminate (B-2) was subjected to extrusion coating with low density polyethylene (LDPE) with a thickness of 40 μm. Thus, a laminate was produced having a structure of LDPE layer/paper board/LDPE layer/laminate (B-2)/LDPE layer. In the production of this laminate, an anchor coating agent was used according to need. This laminate was used to produce a gable top paper container provided with a slot-shaped cutout in a position as indicated in FIG. 1. The paper container was filled with a content to package it.

The sealed liquid paper container produced above had excellent barrier properties with respect to oxygen gas, did not allow deterioration of the content to be observed, tolerated distribution in the market, and was excellent in, for example, preservation and storage properties.

EXAMPLE 1-3

Polyacrylic acid (PAA) with a number average molecular weight of 150,000 was dissolved in distilled water. Thereafter, ammonia water was added thereto and thereby 1.5 mol % of carboxyl groups of the polyacrylic acid were neutralized. Thus, a polyacrylic acid aqueous solution (S3) was obtained that had a solid content concentration of 10 wt %.

Hereinafter, the same operation as in Example 1-1 was carried out except that the solution (S3) was used instead of the solution (S1). Thus, a laminate (1) with gas barrier layers that were colorless and transparent and had a good appearance was obtained.

Next, calcium acetate was dissolved in distilled water so that the concentration thereof was 10 wt %. This aqueous solution was kept warm at 80° C. Then the laminate (3) obtained above was immersed in this aqueous solution (80° C.; MI-1) for approximately 300 seconds. Thereafter, this laminate was removed therefrom. Then the surfaces of the laminate were washed with distilled water whose temperature had been adjusted to 80° C. After that, it was dried at 80° C. for five minutes. Thus, a laminate (B-3) of the present invention was obtained. With respect to the laminate (B-3), the neutralization degree of the carboxyl groups of the polyacrylic acid contained in the gas barrier layers was determined by the aforementioned method. As a result, it was proved that 95 mol % of the carboxyl groups had been neutralized by calcium ions.

This laminate (1) was measured for oxygen gas barrier properties. As a result, it exhibited a very good value, specifically an oxygen transmission rate of 0.10 cc/m$^2$·day·atm at 20° C. and 85% RH.

Using a 400 g/m$^2$ paperboard, a laminate composed of polypropylene (PP) layer/polypropylene adhesive resin (PP adhesive) layer/paper layer/PP adhesive layer/PP layer was produced by the extrusion lamination process. Extrusion coating was carried out so that each PP layer had a thickness of 25 μm and each PP adhesive resin layer had a thickness of 5 μm. Thereafter, a portion was cut out from a predetermined place thereof. An adhesive was applied to one surface thereof and a laminate (B-3) was laminated thereon. An adhesive was applied to the other surface of the laminate (B-3), and a 50-μm thick non-oriented polypropylene film (CPP) (Tohcello CP RXC-18, manufactured by Tohcello Co., Ltd.) was bonded thereto. Thus a laminate was produced having a structure of PP layer/paper layer/PP layer/laminate (B-3)/CPP layer. In the production of this laminate, an anchor coating agent was used according to need. This laminate was used to produce a gable top paper container provided with a slot-shaped cutout in a position as indicated in FIG. 1. The paper container was filled with a content to package it. The sealed liquid paper container produced above had excellent barrier properties with respect to oxygen gas, did not allow deterioration of the content to be observed, tolerated distribution in the market, and was excellent in, for example, preservation and storage properties.

EXAMPLE 2-1

Polyacrylic acid (PAA) with a number average molecular weight of 150,000 was dissolved in distilled water. Thereafter, ammonia water was added thereto to neutralize 1.5 mol % of carboxyl groups of the polyacrylic acid. Thus a polyacrylic acid aqueous solution was obtained that had a solid content concentration of 10 wt %.

Next, 68.4 parts by weight of tetramethoxysilane (TMOS) was dissolved in 82.0 parts by weight of methanol. Subsequently, 13.6 parts by weight of gamma-glycidoxypropyltrimethoxysilane was dissolved therein. Thereafter, 5.13 parts by weight of distilled water and 12.7 parts by weight of 0.1N (0.1 regulation) hydrochloric acid were added thereto. Thus, a sol was prepared. This was allowed to undergo hydrolysis and condensation reactions at 10° C. for one hour while being stirred. The sol thus obtained was diluted with 185 parts by weight of distilled water, which then was added promptly to 634 parts by weight of the above-mentioned 10-wt % polyacrylic acid aqueous solution that was being stirred. Thus a solution (S1) was obtained.

On the other hand, an oriented PET film (OPET; Lumirror (trade name), manufactured by Toray Industries, Inc.) was coated with a two-component anchor coating agent (AC; Takelac A626 (trade name) and Takenate A50 (trade name), manufactured by Mitsui Takeda Chemicals, Inc.), which then was dried. Thus a substrate (AC/OPET) having an anchor coating layer was produced. The anchor coating layer of the substrate was coated with the solution (S1) using a bar coater in such a manner that the solution (S1) formed a layer with a thickness of 1 μm after being dried. This was dried at 80° C. for five minutes. The opposite surface of the oriented PET film was coated with the anchor coating agent and the solution (S1) in the same manner. Thereafter, it further was heat-treated in dry air at 200° C. for five minutes. Thus, a laminate (gas barrier layer (1 μm)/AC/OPET (12 μm)/AC/gas barrier layer (1 μm)) with gas barrier layers that were colorless and transparent and had a good appearance was obtained (hereinafter, this laminate may be referred to as a "laminate (1)").

Next, calcium acetate was dissolved in distilled water so that the concentration thereof was 10 wt %. This aqueous solution was kept warm at 80° C. Then, the laminate (1) obtained above was immersed in the aqueous solution (80° C.; MI-1) for approximately 300 seconds. Thereafter, this laminate was removed therefrom. Then the surfaces of the laminate were washed with distilled water whose temperature had been adjusted to 80° C. After that, it was dried at 80° C. for five minutes. Thus, a laminate (B-1) of the present invention was obtained. With respect to the laminate (B-1), the neutralization degree of the carboxyl groups of the polyacrylic acid contained in the gas barrier layers was determined by the aforementioned method. As a result, it was proved that 95 mol % of the carboxyl groups had been neutralized by calcium ions.

After an adhesive was applied to both surfaces of a 400 g/m$^2$ paperboard, extrusion lamination of polypropylene resin (PP) was carried out so that each PP layer had a thickness of 20 μm. An adhesive was then applied to one surface thereof and the laminate (B-1) was laminated thereon. An adhesive was applied to the other surface of the laminate (B-1), and a 50-μm thick non-oriented polypropylene film (CPP) (Tohcello CP RXC-18, manufactured by Tohcello Co., Ltd.) was bonded thereto. Thus a laminate was produced having a structure of PP/paperboard/PP/laminate (B-1)/CPP. In the production of this laminate, an anchor coating agent was used according to need. This laminate was used to produce a brick-type paper container. It was filled with a content to package it. Even when the sealed liquid paper container produced above was retort-processed at 120° C. for 30 minutes, it had no change in appearance as compared to that observed before the process. Furthermore, it had excellent barrier properties with respect to oxygen gas, did not allow deterioration of the content to be observed, tolerated distribution in the market, and was excellent in, for example, preservation and storage properties. The oxygen gas barrier properties of the brick-type paper container were determined. As a result, it exhibited a very good value, specifically an oxygen transmission rate of 0.10 cc/m$^2$·day·atm at 20° C. and 85% RH. Furthermore, the oxygen barrier properties also were determined after the retort process carried out at 120° C. for 30 minutes. As a result, it also exhibited a very good value, specifically an oxygen transmission rate of 0.30 cc/m$^2$·day·atm at 20° C. and 85% RH.

EXAMPLE 2-2

After an adhesive was applied to both surfaces of a 400 g/m$^2$ paperboard, extrusion lamination of polypropylene (PP)

was carried out so that each PP layer had a thickness of 20 µm. An adhesive was then applied to one surface thereof and a biaxially-oriented polypropylene film (OPP) was bonded thereto. Furthermore, an adhesive was applied to the other surface of the OPP and the laminate (B-1) produced in Example 2-1 was laminated thereon. An adhesive was applied to the other surface of the laminate (B-1), and a 50-µm thick non-oriented polypropylene film (CPP) (Tohcello CP RXC-18, manufactured by Tohcello Co., Ltd.) was bonded thereto. Thus a laminate was produced having a structure of PP/paperboard/PP/OPP/laminate (B-1)/CPP. In the production of this laminate, an anchor coating agent was used according to need. This laminate was used to produce a brick-type paper container. It was filled with a content to package it. Even when the sealed liquid paper container produced above was retort-processed at 120° C. for 30 minutes, it had no change in appearance as compared to that observed before the process. Furthermore, it had excellent barrier properties with respect to oxygen gas, did not allow deterioration of the content to be observed, tolerated distribution in the market, and was excellent in, for example, preservation and storage properties. The oxygen gas barrier properties of the brick-type paper container were determined. As a result, it exhibited a very good value, specifically an oxygen transmission rate of 0.10 cc/m$^2$·day·atm at 20° C. and 85% RH. Furthermore, the oxygen barrier properties also were determined after the retort process carried out at 120° C. for 30 minutes. As a result, it also exhibited a very good value, specifically an oxygen transmission rate of 0.30 cc/m$^2$·day·atm at 20° C. and 85% RH.

EXAMPLE 2-3

Polyacrylic acid (PAA) with a number average molecular weight of 150,000 was dissolved in distilled water. Thereafter, ammonia water was added thereto to neutralize 1.5 mol % of carboxyl groups of the polyacrylic acid. Thus a polyacrylic acid aqueous solution was obtained that had a solid content concentration of 10 wt %.

Next, 68.4 parts by weight of tetramethoxysilane (TMOS) was dissolved in 79.7 parts by weight of methanol. Subsequently, 11.3 parts by weight of 3-mercaptopropyltrimethoxysilane (manufactured by Chisso Corporation) was dissolved therein. Thereafter, 5.13 parts by weight of distilled water and 12.7 parts by weight of 0.1N hydrochloric acid were added thereto. Thus, a sol was prepared. This was allowed to undergo hydrolysis and condensation reactions at 10° C. for one hour while being stirred. The sol thus obtained was diluted with 189 parts by weight of distilled water, which then was added promptly to 658 parts by weight of the above-mentioned 10-wt % polyacrylic acid aqueous solution that was being stirred. Thus a solution (S2) was obtained.

On the other hand, an oriented PET film (OPET; Lumirror (trade name), manufactured by Toray industries, Inc.) was coated with a two-component anchor coating agent (AC; Takelac A626 (trade name) and Takenate A50 (trade name), manufactured by Mitsui Takeda Chemicals, Inc.), which then was dried. Thus a substrate (AC/OPET) having an anchor coating layer was produced. The anchor coating layer of the substrate was coated with the solution (S2) using a bar coater in such a manner that the solution (S2) formed a layer with a thickness of 1 µm after being dried. This was dried at 80° C. for five minutes. The opposite surface of the oriented PET film also was coated with the anchor coating agent and the solution (S2) in the same manner. Thereafter, it further was heat-treated in dry air at 200° C. for five minutes. Thus, a laminate (gas barrier layer (1 µm)/AC/OPET (12 µm)/AC/gas barrier layer (1 µm)) with gas barrier layers that were colorless and transparent and had a good appearance was obtained (hereinafter, this laminate may be referred to as a "laminate (2)").

Next, calcium acetate was dissolved in distilled water so that the concentration thereof was 10 wt %. This aqueous solution was kept warm at 80° C. The laminate (1) obtained above was then immersed in this aqueous solution (80° C.; MI-2) for approximately 300 seconds. Thereafter, this laminate was removed therefrom. Then the surfaces of the laminate were washed with distilled water whose temperature had been adjusted to 80° C. After that, it was dried at 80° C. for five minutes. Thus, a laminate (B-2) of the present invention was obtained. With respect to the laminate (B-2), the neutralization degree of the carboxyl groups of the polyacrylic acid contained in the gas barrier layers was determined by the aforementioned method. As a result, it was proved that 99 mol % of the carboxyl groups had been neutralized by calcium ions.

After an adhesive was applied to both surfaces of a 400 g/m$^2$ paperboard, extrusion lamination of polypropylene (PP) was carried out so that each PP layer had a thickness of 20 µm. An adhesive was then applied to one surface thereof and the laminate (B-2) was laminated thereon. An adhesive was applied to the other surface of the laminate (B-2), and a 50-µm thick non-oriented polypropylene film (CPP) (Tohcello CP RXC-18, manufactured by Tohcello Co., Ltd.) was bonded thereto. Thus a laminate was produced having a structure of PP/paperboard/PP/laminate (B-2)/CPP. In the production of this laminate, an anchor coating agent was used according to need. This laminate was used to produce a brick-type paper container. It was filled with a content to package it. Even when the sealed liquid paper container produced above was retort-processed at 120° C. for 30 minutes, it had no change in appearance as compared to that observed before the process. Furthermore, it had excellent barrier properties with respect to oxygen gas, did not allow deterioration of the content to be observed, tolerated distribution in the market, and was excellent in, for example, preservation and storage properties. The oxygen gas barrier properties of the brick-type paper container were determined. As a result, it exhibited a very good value, specifically an oxygen transmission rate of 0.20 cc/m$^2$·day·atm at 20° C. and 85% RH. Furthermore, the oxygen barrier properties also were determined after the retort process carried out at 120° C. for 30 minutes. As a result, it also exhibited a very good value, specifically an oxygen transmission rate of 0.40 cc/m$^2$·day·atm at 20° C. and 85% RH.

EXAMPLE 2-4

Polyacrylic acid (PAA) with a number average molecular weight of 150,000 was dissolved in distilled water, and thereby a polyacrylic acid aqueous solution (S4) was obtained that had a solid content concentration of 10 wt %.

Hereinafter, the same operation as in Example 2-1 was carried out except that the solution (S4) was used instead of the solution (S1). As a result, a laminate (4) with gas barrier layers that were colorless and transparent and had a good appearance was obtained.

Next, calcium acetate was dissolved in distilled water so that the concentration thereof was 10 wt %. This aqueous solution was kept warm at 80° C. Then the laminate (4) obtained above was immersed in this aqueous solution (80° C.; MI-1) for approximately 300 seconds. Thereafter, this laminate was removed therefrom. Then the surfaces of the laminate were washed with distilled water whose temperature had been adjusted to 80° C. After that, it was dried at 80° C. for five minutes. Thus, a laminate (B-4) of the present invention was obtained. With respect to the laminate (B-4), the neutralization degree of the carboxyl groups of the polyacrylic acid contained in the gas barrier layers was determined by the aforementioned method. As a result, it was proved that 95 mol % of the carboxyl groups had been neutralized by calcium ions.

After an adhesive was applied to both surfaces of a 400 g/m² paperboard, extrusion lamination of polypropylene resin (PP) was carried out so that each PP layer had a thickness of 20 µm. An adhesive was then applied to one surface thereof and the laminate (B-1) was laminated thereon. An adhesive was applied to the other surface of the laminate (B-1), and a 50-µm thick non-oriented polypropylene film (CPP) (Tohcello CP RXC-18, manufactured by Tohcello Co., Ltd.) was bonded thereto. Thus a laminate was produced having a structure of PP/paperboard/PP/laminate (B-4)/CPP. In the production of this laminate, an anchor coating agent was used according to need. This laminate was used to produce a brick-type paper container. It was filled with a content to package it. Even when the sealed liquid paper container produced above was retort-processed at 120° C. for 30 minutes, it had no change in appearance as compared to that observed before the process. Furthermore, it had excellent barrier properties with respect to oxygen gas, did not allow deterioration of the content to be observed, tolerated distribution in the market, and was excellent in, for example, preservation and storage properties. The oxygen gas barrier properties of this paper container sample were determined. As a result, it exhibited a very good value, specifically an oxygen transmission rate of 1.5 cc/m²·day·atm at 20° C. and 85% RH. Furthermore, the oxygen barrier properties also were determined after the retort process carried out at 120° C. for 30 minutes. As a result, it exhibited a good value, specifically an oxygen transmission rate of 3.2 cc/m² days atm at 20° C. and 85% RH.

EXAMPLE 3-1

Polyacrylic acid (PAA) with a number average molecular weight of 150,000 was dissolved in distilled water. Thereafter, ammonia water was added thereto to neutralize 1.5 mol % of carboxyl groups of the polyacrylic acid. Thus a polyacrylic acid aqueous solution was obtained that had a solid content concentration of 10 wt %.

Next, 68.4 parts by weight of tetramethoxysilane (TMOS) was dissolved in 82.0 parts by weight of methanol. Subsequently, 13.6 parts by weight of gamma-glycidoxypropyltrimethoxysilane was dissolved therein. Thereafter, 5.13 parts by weight of distilled water and 12.7 parts by weight of 0.1N (0.1 normal) hydrochloric acid were added thereto. Thus, a sol was prepared. This was allowed to undergo hydrolysis and condensation reactions at 10° C. for one hour while being stirred. The sol thus obtained was diluted with 185 parts by weight of distilled water, which then was added promptly to 634 parts by weight of the above-mentioned 10-wt % polyacrylic acid aqueous solution that was being stirred. Thus a solution (S1) was obtained.

Subsequently, deposited aluminum of an aluminum deposited, oriented PET film (VM-PET) (E7471, manufactured by Toyobo Co., Ltd.) was coated with a two-component anchor coating (AC) agent (Takelac A3210 and Takenate A3072, manufactured by Mitsui Takeda Chemicals, Inc., which then was dried. Thus a substrate (AC layer/VM-PET layer) having an anchor coating layer was produced. The anchor coating layer of the substrate was coated with the solution (S1) using a bar coater in such a manner that the solution (S1) formed a layer with a thickness of 1 µm after being dried. This was dried at 80° C. for five minutes. The opposite surface (non-deposited surface) of the aluminum deposited, oriented PET film also was coated with the anchor coating agent and the solution (S1) in the same manner. Thereafter, it further was heat-treated in dry air at 200° C. for five minutes. Thus, a laminate (gas barrier layer (1 µm)/AC layer/VM-PET (12 µm) layer/AC layer/gas barrier layer (1 µm)) with gas barrier layers that had a good appearance was obtained (hereinafter, this laminate may be referred to as a "laminate (1)").

Next, calcium acetate was dissolved in distilled water so that the concentration thereof was 10 wt %. This aqueous solution was kept warm at 80° C. Then, the laminate (2) obtained above was immersed in this aqueous solution (80° C.; MI-1) for approximately 300 seconds. Thereafter, this laminate was removed therefrom. Then the surfaces of the laminate were washed with distilled water whose temperature had been adjusted to 80° C. After that, it was dried at 80° C. for five minutes. Thus, a laminate (B-1) of the present invention was obtained. With respect to the laminate (B-1), the neutralization degree of the carboxyl groups of the polyacrylic acid contained in the gas barrier layers was determined by the aforementioned method. As a result, it was proved that 95 mol % of the carboxyl groups had been neutralized by calcium ions.

An adhesive was applied to one surface of each of a 60-µm thick non-oriented linear low density polyethylene film (LLDPE) (Senesi L600, manufactured by Daicel Chemical Industries, Ltd.) and a 15-µm thick oriented polyamide film (OPA) (Emblem, manufactured by Unitika, Ltd.). Thereafter, the LLDPE film, the OPA film, and the laminate (B-1) were laminated together so as to form a structure of OPA layer/adhesive layer/laminate (B-1)/adhesive layer/LLDPE layer. Thus a laminate (C-1) was obtained. In this case, they were laminated so that the aluminum deposited surface of the aluminum deposited, oriented PET film contained in the laminate (B-1) was located on the LLDPE layer side.

Figure 3:
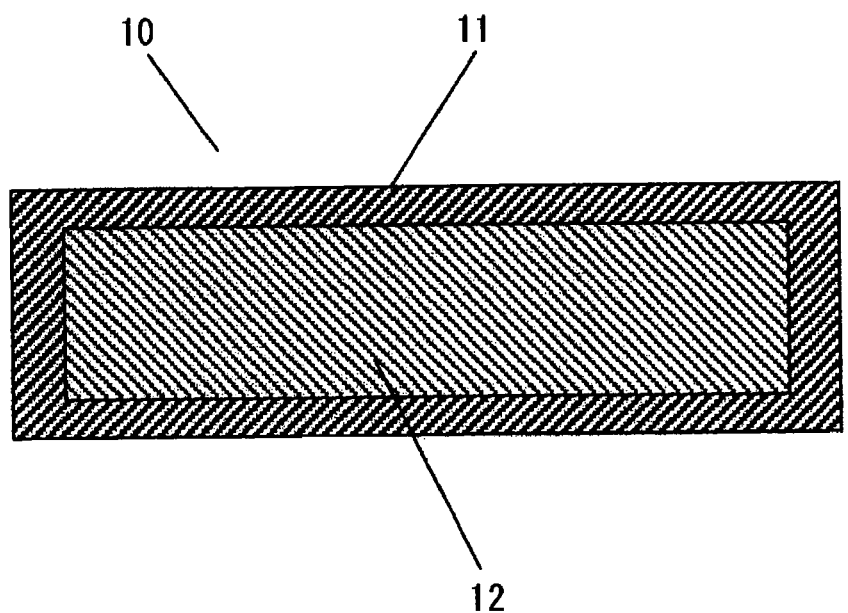
FIG. 3 is a cross-sectional view showing an embodiment of the vacuum heat insulator according to the present invention.

FIG. 3 shows a sectional view of a vacuum heat insulator. Numeral 10 indicates a vacuum heat insulator, numeral 11 denotes a packaging material, and numeral 12 indicates a core material formed of open-cell urethane foam. Two sheets of the laminate (C-1) described above that had been cut into 70 cm×30 cm were placed on top of each other, with the LLDPE layers thereof being inner surfaces. Three sides thereof with a width of 10 mm were heat-sealed. Thus a bag with three sealed sides was produced. The bag was filled through the opening with open-cell urethane foam that served as a heat insulating core material, with the open-cell urethane foam having been dried under an atmosphere of 120° C. for four hours beforehand. Thereafter, this was sealed with a vacuum packaging machine (VAC-STAR 2500, manufactured by Frimark GmbH) at a temperature of 20° C. and an internal pressure of 13 Pa (0.1 torr). Thus a vacuum heat insulator 31 was produced. This vacuum heat insulator was allowed to stand at 40° C. for 90 days. Thereafter, the internal pressure was measured using a Pirani vacuum gauge. The internal pressure obtained after it was allowed to stand at 40° C. for 90 days showed a very good value, specifically 20 Pa (0.15 torr).

EXAMPLE 3-2

An adhesive was applied to one surface of each of a 60-µm thick non-oriented polypropylene film (CPP) (Tohcello CP RXC-18, manufactured by Tohcello Co., Ltd.) and a 15-µm thick oriented polyamide film (OPA) (Emblem, manufactured by Unitika, Ltd.). Thereafter, the CPP film, the OPA film, and the laminate (B-1) were laminated together so as to form a structure of OPA layer/adhesive layer/laminate (B-1)/ adhesive layer/CPP layer. Thus a laminate (C-2) was obtained. In this case, they were laminated so that the aluminum deposited surface of the aluminum deposited, oriented PET film contained in the laminate (B-1) was located on the CPP layer side.

Figure 4:
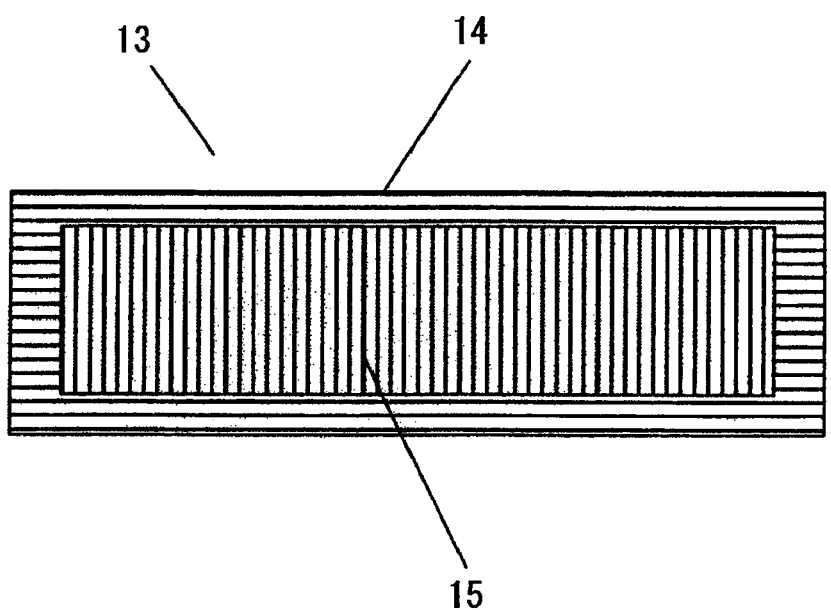
FIG. 4 is a cross-sectional view showing another embodiment of the vacuum heat insulator according to the present invention.

FIG. 4 shows a sectional view of a vacuum heat insulator. Numeral 13 indicates a vacuum heat insulator, numeral 14 denotes a packaging material, and numeral 15 indicates a core material formed of open-cell urethane foam. Two sheets of the laminate (C-2) described above that had been cut into 70 cm×30 cm were placed on top of each other, with the CPP layers thereof forming inner surfaces. Three sides thereof with a width of 10 mm were heat-sealed. Thus a bag with three sealed sides was produced. The bag was filled through the opening with fine silica powder that served as a heat insulating core material, with the fine silica powder having been dried under an atmosphere of 120° C. for four hours beforehand. Thereafter, this was sealed with a vacuum packaging machine (VAC-STAR 2500, manufactured by Frimark GmbH) at a temperature of 20° C. and an internal pressure of 13 Pa (0.1 torr). Thus a vacuum heat insulator 34 was produced. This vacuum heat insulator was allowed to stand at 40° C. for 50 days. Thereafter, the internal pressure was measured using the Pirani vacuum gauge. The internal pressure obtained after it was allowed to stand at 40° C. for 90 days showed a very good value, specifically 20 Pa (0.15 torr).

EXAMPLE 3-3

Polyacrylic acid (PAA) with a number average molecular weight of 150,000 was dissolved in distilled water, and thereby a polyacrylic acid aqueous solution (S3) was obtained that had a solid content concentration of 10 wt %.

Hereinafter, the same operation as in Example 3-1 was carried out except that the solution (S3) was used instead of the solution (S1). Thus, a laminate (1) with gas barrier layers that were colorless and transparent and had a good appearance was obtained.

Next, calcium acetate was dissolved in distilled water so that the concentration thereof was 10 wt %. This aqueous solution was kept warm at 80° C. Then the laminate (3) obtained above was immersed in this aqueous solution (80° C.; MI-1) for approximately 300 seconds. Thereafter, this laminate was removed therefrom. Then the surfaces of the laminate were washed with distilled water whose temperature had been adjusted to 80° C. After that, it was dried at 80° C. for five minutes. Thus, a laminate (B-3) of the present invention was obtained. With respect to the laminate (B-3), the neutralization degree of the carboxyl groups of the polyacrylic acid contained in the gas barrier layers was determined by the aforementioned method. As a result, it was proved that 95 mol % of the carboxyl groups had been neutralized by calcium ions.

Hereinafter, the same operation as in Example 3-1 was carried out except that the laminate (B-3) was used instead of the laminate (B-1) of Example 3-1. Thus, a vacuum heat insulator 3 was produced. After this vacuum heat insulator was allowed to stand at 40° C. for 50 days, the internal pressure was measured with the Pirani vacuum gauge. The internal pressure obtained after it was allowed to stand at 40° C. for 90 days showed a good value, specifically 55 Pa (0.42 torr).

COMPARATIVE EXAMPLE 3-1

An adhesive was applied to one surface of each of a 60-μm thick non-oriented linear low density polyethylene film (LLDPE) (Senesi L600, manufactured by Daicel Chemical Industries, Ltd.) and a 15-μm thick oriented polyamide film (OPA) (Emblem, manufactured by Unitika, Ltd.). Thereafter, the LLDPE film, the OPA film, and an aluminum deposited, oriented PET film (VM-PET) (E7471, manufactured by Toyobo Co., Ltd.) were laminated together so as to form a structure of OPA layer/adhesive layer/aluminum deposited, oriented PET film/adhesive layer/LLDPE layer. Thus a laminate (C-3) was obtained. In this case, they were laminated so that the aluminum deposited surface of the aluminum deposited, oriented PET film was located on the LLDPE layer side.

Figure 5:
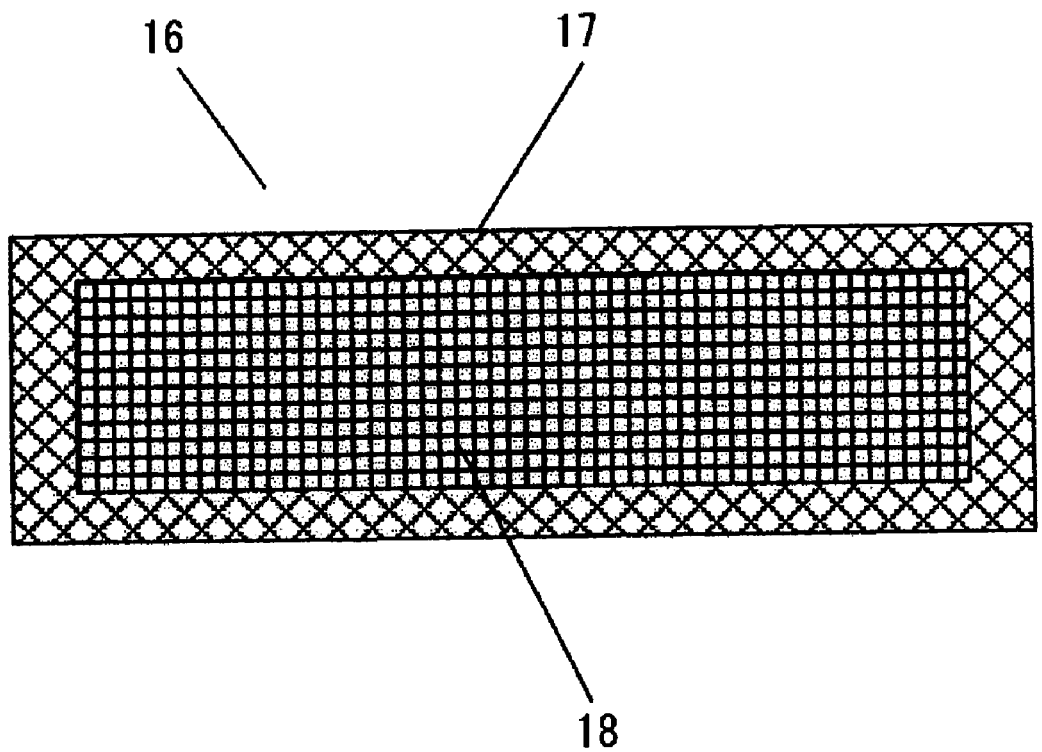
FIG. 5 is a cross-sectional view showing another embodiment of the vacuum heat insulator.

FIG. 5 shows a sectional view of a vacuum heat insulator. Numeral 16 indicates a vacuum heat insulator, numeral 17 denotes a packaging material, and numeral 18 indicates a core material formed of open-cell urethane foam. Two sheets of the laminate (C-3) described above that had been cut into 70 cm×30 cm were placed on top of each other, with the LLDPE layers thereof being inner surfaces. Three sides thereof with a width of 10 mm were heat-sealed. Thus a bag with three sealed sides was produced. The bag was filled through the opening with open-cell urethane foam that served as a heat insulating core material, with the open-cell urethane foam having been dried under an atmosphere of 120° C. for four hours beforehand. Thereafter, this was sealed with a vacuum packaging machine (VAC-STAR 2500, manufactured by Frimark GmbH) at a temperature of 20° C. and an internal pressure of 13 Pa (0.1 torr). Thus a vacuum heat insulator 37 was produced. This vacuum heat insulator was allowed to stand at 40° C. for 90 days. Thereafter, the internal pressure was measured using the Pirani vacuum gauge. The internal pressure obtained after it was allowed to stand at 40° C. for 90 days was 160 Pa (1.2 torr) and thus the result was degraded as compared to Examples 3-1 to 3-3.

EXAMPLE 4-1

Polyacrylic acid (PAA) with a number average molecular weight of 150,000 was dissolved in distilled water. Thereafter, ammonia water was added thereto to neutralize 1.5 mol % of carboxyl groups of the polyacrylic acid. Thus a polyacrylic acid aqueous solution was obtained that had a solid content concentration of 10 wt %.

Next, 68.4 parts by weight of tetramethoxysilane (TMOS) was dissolved in 82.0 parts by weight of methanol. Subsequently, 13.6 parts by weight of gamma-glycidoxypropyltrimethoxysilane was dissolved therein. Thereafter, 5.13 parts by weight of distilled water and 12.7 parts by weight of 0.1N (0.1 normal) hydrochloric acid were added thereto. Thus, a sol was prepared. This was allowed to undergo hydrolysis and condensation reactions at 10° C. for one hour while being stirred. The sol thus obtained was diluted with 185 parts by weight of distilled water, which then was added promptly to 634 parts by weight of the above-mentioned 10-wt % polyacrylic acid aqueous solution that was being stirred. Thus a solution (S1) was obtained.

On the other hand, an oriented PET film (OPET; Lumirror (trade name), manufactured by Toray Industries, Inc.) was coated with a two-component anchor coating agent (AC; Takelac A626 (trade name) and Takenate A50 (trade name), manufactured by Mitsui Takeda Chemicals, Inc., which then was dried. Thus a substrate (AC/OPET) having an anchor coating layer was produced. The anchor coating layer of the substrate was coated with the solution (S1) using a bar coater in such a manner that the solution (S1) formed a layer with a thickness of 1 μm after being dried. This was dried at 80° C. for five minutes. The opposite surface of the oriented PET film also was coated with the anchor coating agent and the solution (S1) in the same manner. Thereafter, it further was heat-treated in dry air at 200° C. for five minutes. Thus, a laminate (gas barrier layer (1 m)/AC layer/OPET layer (12 µm)/AC layer/gas barrier layer (1 µm)) with gas barrier layers that were colorless and transparent and had a good appearance was obtained (hereinafter, this laminate may be referred to as a "laminate (1)").

Next, calcium acetate was dissolved in distilled water so that the concentration thereof was 10 wt %. This aqueous solution was kept warm at 80° C. Then, the laminate (1) obtained above was immersed in this aqueous solution (80° C.; MI-1) for approximately 300 seconds. Thereafter, this laminate was removed therefrom. Then the surfaces of the laminate were washed with distilled water whose temperature had been adjusted to 80° C. After that, it was dried at 80° C. for five minutes. Thus, a laminate (B-1) of the present invention was obtained. With respect to the laminate (B-1), the neutralization degree of the carboxyl groups of the polyacrylic acid contained in the gas barrier layers was determined by the aforementioned method. As a result, it was proved that 95 mol % of the carboxyl groups had been neutralized by calcium ions.

Figure 6:
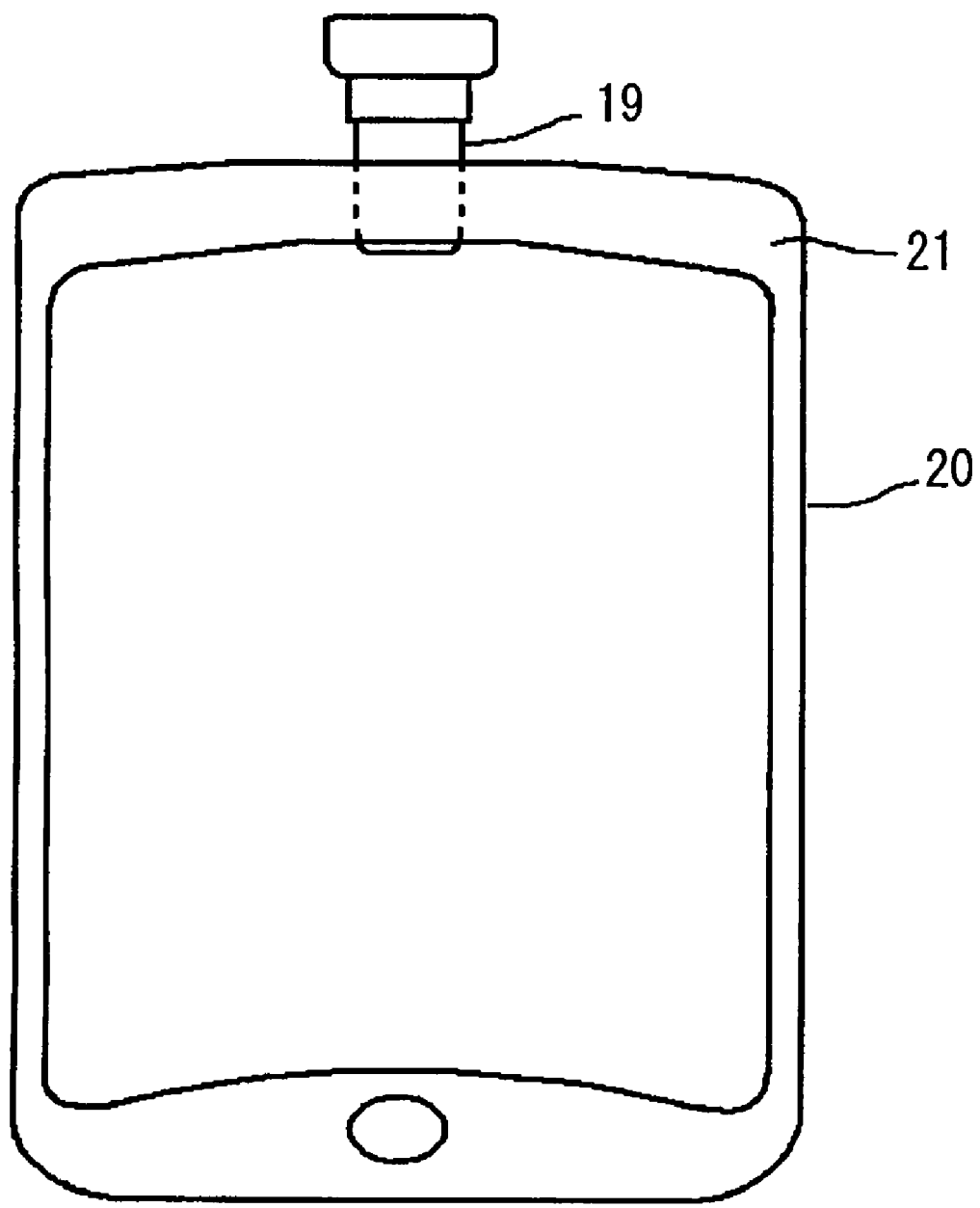
FIG. 6 is a front view showing an embodiment of the infusion bag according to the present invention.

An adhesive was applied to one surface of a 60-µm thick non-oriented polypropylene film (CPP) (Tohcello CP RXC-18, manufactured by Tohcello Co., Ltd.). The CPP film and the laminate (B-1) were laminated together so as to form a structure of CPP layer/adhesive layer/laminate (B-1)/adhesive layer/CPP layer. Two sheets of the laminate of CPP layer/adhesive layer/laminate (B-1)/adhesive layer/CPP layer (laminate (C-1)) were cut into the shape of the infusion bag shown in FIG. 6 by a common method. Subsequently, two sheets of the laminate (C-1) were placed on top of each other, and the peripheries of the sheets cut into the form of the infusion bag were heat-sealed. Then a spout member made of polypropylene was attached thereto by heat seal. Thus an infusion bag was obtained.

With respect to the infusion bag thus obtained, the appearance observed after the high-pressure steam sterilization process and the oxygen barrier properties were evaluated by the methods described above. No change in appearance occurred as compared to that observed before the process under both the high-pressure steam sterilization process conditions of 110° C. for 30 minutes and 135° C. for 30 minutes. That is, the transparency was maintained, and occurrence of bag breakage, crease, or blocking was not observed. The oxygen transmission rates obtained under the aforementioned measurement conditions showed very good results, specifically the oxygen transmission rate obtained after the high-pressure steam sterilization process carried out at 110° C. for 30 minutes was 0.2 cm$^3$/m$^2$·day·atm and the oxygen transmission rate obtained after the high-pressure steam sterilization process carried out at 135° C. for 30 minutes was 0.1 cm$^3$/m$^2$·day·atm.

EXAMPLE 4-2

The laminate (B-1) obtained in Example 4-1 was used to produce a laminate for an infusion bag. An adhesive was applied to one surface of a 60-µm thick non-oriented linear low density polyethylene film (LLDPE) (Senesi L600, manufactured by Daicel Chemical Industries, Ltd.). Thereafter, the LLDPE film and the laminate (B-1) obtained in Example 4-1 were laminated together so as to form a structure of LLDPE layer/adhesive layer/laminate (B-1)/adhesive layer/LLDPE layer. Two sheets of the laminate of LLDPE layer/adhesive layer/laminate (B-1)/adhesive layer/CPP layer (laminate (C-2)) were cut into the shape of the infusion bag shown in FIG. 6 by a common method. Subsequently, two sheets of the laminate (C-2) were placed on top of each other, and the peripheries of the sheets cut into the form of the infusion bag were heat-sealed. Then a spout member made of linear low density polyethylene was attached thereto by heat seal. Thus an infusion bag was obtained.

With respect to the infusion bag thus obtained, the appearance observed after the high-pressure steam sterilization process carried out at 110° C. for 30 minutes and the oxygen barrier properties were evaluated by the methods described above. No change in appearance occurred as compared to that observed before the process under the high-pressure steam sterilization process condition. That is, the transparency was maintained, and occurrence of bag breakage, crease, or blocking was not observed. The oxygen transmission rate obtained under the aforementioned measurement condition showed a very good result, specifically the oxygen transmission rate obtained after the high-pressure steam sterilization process carried out at 110° C. for 30 minutes was 0.4 cm$^3$/m$^2$·day·atm.

EXAMPLE 4-3

The laminate B-1 obtained in Example 4-1 was used to produce a laminate for an infusion bag. An adhesive was applied to one surface of the laminate (B-1) and a high density polyethylene (HDPE) layer was laminated on the adhesive through a process of extrusion lamination of high density polyethylene resin (Novatech HD LY20, manufactured by Japan Polychem Corporation). Furthermore, an adhesive was applied to the opposite surface of the laminate (B-1) and an HDPE layer was laminated on the adhesive through a process of extrusion lamination of high density polyethylene resin (Novatech HD LY20, manufactured by Japan Polychem Corporation) in the same manner. Thus a laminate of HDPE layer/adhesive layer/laminate (B-1)/adhesive layer/HDPE layer (laminate (C-3)) was produced. The extrusion lamination was carried out so that two HDPE layers in the laminate (C-3) each had a thickness of 60 µm. Two sheets of the laminate (C-3) were cut into the shape of the infusion bag shown in FIG. 6 by a common method. Subsequently, two sheets of the laminate (C-3) were placed on top of each other, and the peripheries of the sheets cut into the form of the infusion bag were heat-sealed. Then a spout member made of high density polyethylene was attached thereto by heat seal. Thus an infusion bag was obtained.

With respect to the infusion bag thus obtained, the appearance observed after the high-pressure steam sterilization process carried out at 110° C. for 30 minutes and the oxygen barrier properties were evaluated by the methods described above. No change in appearance occurred as compared to that observed before the process even under the high-pressure steam sterilization process condition. That is, the transparency was maintained, and occurrence of bag breakage, crease, or blocking was not observed. The oxygen transmission rate under the aforementioned measurement condition showed a very good result, specifically the oxygen transmission rate obtained after the high-pressure steam sterilization process carried out at 110° C. for 30 minutes was 0.4 cm$^3$/m$^2$·day·atm.

EXAMPLE 4-4

Polyacrylic acid (PAA) with a number average molecular weight of 150,000 was dissolved in distilled water. Thereafter, ammonia water was added thereto and thereby 1.5 mol % of carboxyl groups of the polyacrylic acid were neutralized.

Thus, a polyacrylic acid aqueous solution was obtained that had a solid content concentration of 10 wt %.

Next, 68.4 parts by weight of tetramethoxysilane (TMOS) was dissolved in 79.7 parts by weight of methanol. Subsequently, 11.3 parts by weight of 3-mercaptopropyltrimethoxysilane (manufactured by Chisso Corporation) was dissolved therein. Thereafter, 5.13 parts by weight of distilled water and 12.7 parts by weight of 0.1N hydrochloric acid were added thereto. Thus, a sol was prepared. This was allowed to undergo hydrolysis and condensation reactions at 10° C. for one hour while being stirred. The sol thus obtained was diluted with 189 parts by weight of distilled water, which then was added promptly to 658 parts by weight of the above-mentioned 10-wt % polyacrylic acid aqueous solution that was being stirred. Thus a solution (S2) was obtained.

On the other hand, an oriented PET film (OPET; Lumirror (trade name), manufactured by Toray industries, Inc.) was coated with a two-component anchor coating agent (AC; Takelac A626 (trade name) and Takenate A50 (trade name), manufactured by Mitsui Takeda Chemicals, Inc., which then was dried. Thus a substrate (AC/OPET) having an anchor coating layer was produced. The anchor coating layer of the substrate was coated with the solution (S2) using a bar coater in such a manner that the solution (S2) formed a layer with a thickness of 1 μm after being dried. This was dried at 80° C. for five minutes. The opposite surface of the oriented PET film also was coated with the anchor coating agent and the solution (S2) in the same manner. Thereafter, it further was heat-treated in dry air at 200° C. for five minutes. Thus, a laminate (gas barrier layer (1 μm)/AC layer/OPET layer (12 μm)/AC layer/gas barrier layer (1 μm)) with gas barrier layers that were colorless and transparent and had a good appearance was obtained (hereinafter, this laminate may be referred to as a "laminate (2)").

Next, calcium acetate was dissolved in distilled water so that the concentration thereof was 10 wt %. This aqueous solution was kept warm at 80° C. The laminate (1) obtained above was then immersed in this aqueous solution (80° C.; MI-2) for approximately 300 seconds. Thereafter, this laminate was removed therefrom. Then the surfaces of the laminate were washed with distilled water whose temperature had been adjusted to 80° C. After that, it was dried at 80° C. for five minutes. Thus, a laminate (B-2) of the present invention was obtained. With respect to the laminate (B-2), the neutralization degree of the carboxyl groups of the polyacrylic acid contained in the gas barrier layers was determined by the aforementioned method. As a result, it was proved that 99 mol % of the carboxyl groups had been neutralized by calcium ions.

An adhesive was applied to one surface of a 60-μm thick non-oriented polypropylene film (CPP) (Tohcello CP RXC-18, manufactured by Tohcello Co., Ltd.). Thereafter, the CPP film and the laminate (B-2) were laminated together so as to form a structure of CPP layer/adhesive layer/laminate (B-2)/adhesive layer/CPP layer. Two sheets of the laminate of CPP layer/adhesive layer/laminate (B-2)/adhesive layer/CPP layer (laminate (C-4)) were cut into the shape of the infusion bag shown in FIG. 6 by a common method. Subsequently, two sheets of the laminate (C-4) were placed on top of each other, and the peripheries of the sheets cut into the form of the infusion bag were heat-sealed. Then a spout member made of polypropylene was attached thereto by heat seal. Thus an infusion bag was obtained.

With respect to the infusion bag thus obtained, the appearance observed after the high-pressure steam sterilization process and the oxygen barrier properties were evaluated by the methods described above. No change in appearance occurred as compared to that observed before the process under both the high-pressure steam sterilization process conditions of 110° C. for 30 minutes and 135° C. for 30 minutes. That is, the transparency was maintained, and occurrence of bag breakage, crease, or blocking was not observed. The oxygen transmission rates obtained under the aforementioned measurement conditions showed very good results, specifically the oxygen transmission rate obtained after the high-pressure steam sterilization process carried out at 110° C. for 30 minutes was 0.3 cm$^3$/m$^2$·day·atm and the oxygen transmission rate obtained after the high-pressure steam sterilization process carried out at 135° C. for 30 minutes was 0.3 cm$^3$/m$^2$·day·atm.

EXAMPLE 4-5

Polyacrylic acid (PAA) with a number average molecular weight of 150,000 was dissolved in distilled water and thereby a polyacrylic acid aqueous solution (S5) was obtained that had a solid content concentration of 10 wt %.

Hereinafter, the same operation as in Example 4-1 was carried out except that the solution (S5) was used instead of the solution (S1). Thus, a laminate (5) with gas barrier layers that were colorless and transparent and had a good appearance was obtained.

Next, calcium acetate was dissolved in distilled water so that the concentration thereof was 10 wt %. This aqueous solution was kept warm at 20° C. Then the laminate (5) obtained above was immersed in this aqueous solution (80° C.; MI-1) for approximately 300 seconds. Thereafter, this laminate was removed therefrom. Then the surfaces of the laminate were washed with distilled water whose temperature had been adjusted to 20° C. After that, it was dried at 20° C. for five minutes. Thus, a laminate (B-5) of the present invention was obtained. With respect to the laminate (B-5), the neutralization degree of the carboxyl groups of the polyacrylic acid contained in the gas barrier layers was determined by the aforementioned method. As a result, it was proved that 95 mol % of the carboxyl groups had been neutralized by calcium ions.

Hereinafter, the same operation as in Example 4-1 was carried out except that the laminate (B-5) was used instead of the laminate (B-1) of Example 4-1. Thus an infusion bag was obtained.

With respect to the infusion bag thus obtained, the appearance observed after the high-pressure steam sterilization process and the oxygen barrier properties were evaluated by the methods described above. No change in appearance occurred as compared to that observed before the process under both the high-pressure steam sterilization process conditions of 110° C. for 30 minutes and 135° C. for 30 minutes. That is, the transparency was maintained, and occurrence of bag breakage, crease, or blocking was not observed. The oxygen transmission rates obtained under the aforementioned measurement conditions showed very good results, specifically the oxygen transmission rate obtained after the high-pressure steam sterilization process carried out at 110° C. for 30 minutes was 2.5 cm$^3$/m$^2$·day·atm and the oxygen transmission rate obtained after the high-pressure steam sterilization process carried out at 135° C. for 30 minutes was 3.5 cm$^3$/m$^2$·day·atm.

EXAMPLE 5-1

Polyacrylic acid (PAA) with a number average molecular weight of 150,000 was dissolved in distilled water. Thereafter, ammonia water was added thereto and thereby 1.5 mol % of carboxyl groups of the polyacrylic acid were neutralized. Thus, a polyacrylic acid aqueous solution was obtained that had a solid content concentration of 10 wt %.

Next, 68.4 parts by weight of tetramethoxysilane (TMOS) was dissolved in 82.0 parts by weight of methanol. Subsequently, 13.6 parts by weight of gamma-glycidoxypropyltrimethoxysilane was dissolved therein. Thereafter, 5.13 parts by weight of distilled water and 12.7 parts by weight of 0.1N (0.1 normal) hydrochloric acid were added thereto. Thus, a sol was prepared. This was allowed to undergo hydrolysis and condensation reactions at 10° C. for one hour while being stirred. The sol thus obtained was diluted with 185 parts by weight of distilled water, which then was added promptly to 634 parts by weight of the above-mentioned 10-wt % polyacrylic acid aqueous solution that was being stirred. Thus a solution (S1) was obtained.

On the other hand, an oriented PET film (OPET; Lumirror (trade name), manufactured by Toray Industries, Inc.) was coated with a two-component anchor coating agent (AC; Takelac A626 (trade name) and Takenate A50 (trade name), manufactured by Mitsui Takeda Chemicals, Inc., which then was dried. Thus a substrate (AC/OPET) having an anchor coating layer was produced. The anchor coating layer of the substrate was coated with the solution (S1) using a bar coater in such a manner that the solution (S1) formed a layer with a thickness of 1 µm after being dried. This was dried at 80° C. for five minutes. The opposite surface of the oriented PET film also was coated with the anchor coating agent and the solution (S1) in the same manner. Thereafter, it further was heat-treated in dry air at 200° C. for five minutes. Thus, a laminate (gas barrier layer (1 µm)/AC layer/OPET layer (12 µm)/AC layer/gas barrier layer (1 µm)) with gas barrier layers that were colorless and transparent and had a good appearance was obtained (hereinafter, this laminate may be referred to as a "laminate (1)").

Next, calcium acetate was dissolved in distilled water so that the concentration thereof was 10 wt %. This aqueous solution was kept warm at 80° C. Then, the laminate (1) obtained above was immersed in this aqueous solution (80° C.; MI-1) for approximately 300 seconds. Thereafter, this laminate was removed therefrom. Then the surfaces of the laminate were washed with distilled water whose temperature had been adjusted to 80° C. After that, it was dried at 80° C. for five minutes. Thus, a laminate (B-1) of the present invention was obtained. With respect to the laminate (B-1), the neutralization degree of the carboxyl groups of the polyacrylic acid contained in the gas barrier layers was determined by the aforementioned method. As a result, it was proved that 97 mol % of the carboxyl groups had been neutralized by calcium ions.

An oriented polyamide film (Emblem (trade name) with a thickness of 15 µm, manufactured by Unitika, Ltd.; hereinafter may be abbreviated as "OPA") and a polypropylene film (RXC-18 (trade name) with a thickness of 50 µm, manufactured by Tohcello Co., Ltd.; hereinafter may be abbreviated as "PP") each were coated with a two-component adhesive (A-385 (trade name) and A-50 (trade name), manufactured by Mitsui Takeda Chemicals, Inc.), which were then dried. They were laminated on one surface of the above-mentioned laminate (B-1: gas barrier layer/AC/OPET/AC/gas barrier layer) that had been subjected to printing by the gravure process. Thus, a laminate (B-1-1) was obtained having a structure of gas barrier layer/AC layer/OPET layer/AC layer/gas barrier layer/printed layer/adhesive/OPA/adhesive/PP. The laminate was cut out into a predetermined shape and thereby a cover member was obtained. The oxygen transmission rate that the cover member exhibited under high humidity showed a very good value, specifically 0.12 $cm^3/m^2 \cdot day \cdot atm$. Furthermore, the oxygen transmission rate obtained after bending was 0.15 $cm^3/m^2 \cdot day \cdot atm$, and the decrease in oxygen transmission rate was hardly observed as compared to that obtained before bending.

EXAMPLE 5-2

On the other hand, an oriented polyamide film (Emblem (trade name) with a thickness of 15 µm, manufactured by Unitika, Ltd.) was coated with a two-component anchor coating agent (AC; Takelac A626 (trade name) and Takenate A50 (trade name), manufactured by Mitsui Takeda Chemicals, Inc., which then was dried. Thus a substrate (AC/OPA) having an anchor coating layer was produced. The anchor coating layer of the substrate was coated with the solution (S1) obtained in Example 5-1 using a bar coater in such a manner that the solution (S1) formed a layer with a thickness of 1 µm after being dried. This was then dried at 80° C. for five minutes. The opposite surface of the oriented polyamide film also was coated with the anchor coating agent and the solution (S1) in the same manner. Thereafter, it further was heat-treated in dry air at 200° C. for five minutes. Thus, a laminate (gas barrier layer (1 µm)/AC layer/OPA layer (15 µm)/AC layer/gas barrier layer (1 µm)) with gas barrier layers that were colorless and transparent and had a good appearance was obtained (hereinafter, this laminate may be referred to as a "laminate (2)").

Next, calcium acetate was dissolved in distilled water so that the concentration thereof was 10 wt %. This aqueous solution was kept warm at 80° C. Then, the laminate (2) obtained above was immersed in this aqueous solution (80° C.; MI-1) for approximately 300 seconds. Thereafter, this laminate was removed therefrom. Then the surfaces of the laminate were washed with distilled water whose temperature had been adjusted to 80° C. After that, it was dried at 80° C. for five minutes. Thus, a laminate (B-2) of the present invention was obtained. With respect to the laminate (B-2), the neutralization degree of the carboxyl groups of the polyacrylic acid contained in the gas barrier layers was determined by the aforementioned method. As a result, it was proved that 96 mol % of the carboxyl groups had been neutralized by calcium ions.

A polypropylene film (RXC-18 (trade name) with a thickness of 50 µm, manufactured by Tohcello Co., Ltd.; hereinafter may be abbreviated as "PP") was coated with a two-component adhesive (A-385 (trade name) and A-50 (trade name), manufactured by Mitsui Takeda Chemicals, Inc.), which was then dried. This was laminated on one surface of the above-mentioned laminate (B-2: gas barrier layer/AC/OPA/AC/gas barrier layer) that had been subjected to printing by the gravure process. Thus, a laminate (B-2-1) was obtained having a structure of gas barrier layer/AC layer/OPA layer/AC layer/gas barrier layer/printed layer/adhesive layer/PP. This laminate was cut out into a predetermined shape and thereby a cover member was obtained. The oxygen transmission rate that the cover member exhibited under high humidity showed a very good value, specifically 0.14 $cm^3/m^2 \cdot day \cdot atm$. Furthermore, the oxygen transmission rate obtained after bending was 0.15 $cm^3/m^2 \cdot day \cdot atm$, and the decrease in oxygen transmission rate was hardly observed as compared to that obtained before bending.

EXAMPLE 5-3

Polyacrylic acid (PAA) with a number average molecular weight of 150,000 was dissolved in distilled water and thereby a polyacrylic acid aqueous solution (S3) was obtained that had a solid content concentration of 10 wt %.

Hereinafter, the same operation as in Example 5-1 was carried out except that the solution (S3) was used instead of the solution (S1). Thus, a laminate (3) with gas barrier layers that were colorless and transparent and had a good appearance was obtained.

Next, calcium acetate was dissolved in distilled water so that the concentration thereof was 10 wt %. This aqueous solution was kept warm at 80° C. Then the laminate (3) obtained above was immersed in this aqueous solution (80° C.; MI-1) for approximately 300 seconds. Thereafter, this laminate was removed therefrom. Then the surfaces of the laminate were washed with distilled water whose temperature had been adjusted to 80° C. After that, it was dried at 80° C. for five minutes. Thus, a laminate (B-3) of the present invention was obtained. With respect to the laminate (B-3), the neutralization degree of the carboxyl groups of the polyacrylic acid contained in the gas barrier layers was determined by the aforementioned method. As a result, it was proved that 95 mol % of the carboxyl groups had been neutralized by calcium ions.

Hereinafter, the same operation as in Example 5-1 was carried out except that the laminate (B-3) was used instead of the laminate (B-1) of Example 5-1. Thus a cover member was obtained.

The oxygen transmission rate that the cover member exhibited under high humidity showed a good value, specifically 1.5 cm$^3$/m$^2$·day·atm. Furthermore, the oxygen transmission rate obtained after bending was 2.8 cm$^3$/m$^2$·day·atm.

EXAMPLE 6-1

Polyacrylic acid (PAA) with a number average molecular weight of 150,000 was dissolved in distilled water. Thereafter, ammonia water was added thereto to neutralize 1.5 mol % of carboxyl groups of the polyacrylic acid. Thus a polyacrylic acid aqueous solution was obtained that had a solid content concentration of 10 wt %.

Next, 68.4 parts by weight of tetramethoxysilane (TMOS) was dissolved in 82.0 parts by weight of methanol. Subsequently, 13.6 parts by weight of gamma-glycidoxypropyltrimethoxysilane was dissolved therein. Thereafter, 5.13 parts by weight of distilled water and 12.7 parts by weight of 0.1N (0.1 normal) hydrochloric acid were added thereto. Thus, a sol was prepared. This was allowed to undergo hydrolysis and condensation reactions at 10° C. for one hour while being stirred. The sol thus obtained was diluted with 185 parts by weight of distilled water, which then was added promptly to 634 parts by weight of the above-mentioned 10-wt % polyacrylic acid aqueous solution that was being stirred. Thus a solution (S1) was obtained.

On the other hand, an oriented PET film (OPET; Lumirror (trade name), manufactured by Toray Industries, Inc.) was coated with a two-component anchor coating agent (AC; Takelac A626 (trade name) and Takenate A50 (trade name), manufactured by Mitsui Takeda Chemicals, Inc., which then was dried. Thus a substrate (AC/OPET) having an anchor coating layer was produced. The anchor coating layer of the substrate was coated with the solution (S1) using a bar coater in such a manner that the solution (S1) formed a layer with a thickness of 1 µm after being dried. This was dried at 80° C. for five minutes. The opposite surface of the oriented PET film also was coated with the anchor coating agent and the solution (S1) in the same manner. Thereafter, it further was heat-treated in dry air at 200° C. for five minutes. Thus, a laminate (gas barrier layer (1 µm)/AC layer/OPET layer (12 µm)/AC layer/gas barrier layer (1 µm)) with gas barrier layers that were colorless and transparent and had a good appearance was obtained (hereinafter, this laminate may be referred to as a "laminate (1)").

Next, calcium acetate was dissolved in distilled water so that the concentration thereof was 10 wt %. This aqueous solution was kept warm at 80° C. Then, the laminate (1) obtained above was immersed in this aqueous solution (80° C.; MI-1) for approximately 300 seconds. Thereafter, this laminate was removed therefrom. Then the surfaces of the laminate were washed with distilled water whose temperature had been adjusted to 80° C. After that, it was dried at 80° C. for five minutes. Thus, a laminate (B-1) of the present invention was obtained. With respect to the laminate (B-1), the neutralization degree of the carboxyl groups of the polyacrylic acid contained in the gas barrier layers was determined by the aforementioned method. As a result, it was proved that 97 mol % of the carboxyl groups had been neutralized by calcium ions.

An oriented polyamide film (Emblem (trade name) with a thickness of 15 µm, manufactured by Unitika, Ltd.; hereinafter may be abbreviated as "OPA") and a polypropylene film (RXC-18 (trade name) with a thickness of 50 µm, manufactured by Tohcello Co., Ltd.; hereinafter may be abbreviated as "PP") each were coated with a two-component adhesive (A-385 (trade name) and A-50 (trade name), manufactured by Mitsui Takeda Chemicals, Inc.), which were then dried. They were laminated on one surface of the above-mentioned laminate (B-1: gas barrier layer/AC/OPET/AC/gas barrier layer) that had been subjected to printing by the gravure process. Thus, a laminate (B-1-1) was obtained having a structure of gas barrier layer/AC layer/OPET layer/AC layer/gas barrier layer/printed layer/adhesive/OPA/adhesive/PP. This laminate was cut out into a predetermined shape and thereby a cover member was obtained. The oxygen transmission rate that the cover member exhibited under high humidity showed a very good value, specifically 0.12 cm$^3$/m$^2$·day·atm. Furthermore, the oxygen transmission rate obtained after bending was 0.15 cm$^3$/m$^2$·day·atm, and the decrease in oxygen transmission rate was hardly observed as compared to that obtained before bending.

EXAMPLE 6-2

On the other hand, an oriented polyamide film (Emblem (trade name) with a thickness of 15 µm, manufactured by Unitika, Ltd.) was coated with a two-component anchor coating agent (AC; Takelac A626 (trade name) and Takenate A50 (trade name), manufactured by Mitsui Takeda Chemicals, Inc., which then was dried. Thus a substrate (AC/OPA) having an anchor coating layer was produced. The anchor coating layer of the substrate was coated with the solution (S1) obtained in Example 6-1 using a bar coater in such a manner that the solution (S1) formed a layer with a thickness of 1 µm after being dried. This was then dried at 80° C. for five minutes. The opposite surface of the oriented polyamide film also was coated with the anchor coating agent and the solution (S1) in the same manner. Thereafter, it further was heat-treated in dry air at 200° C. for five minutes. Thus, a laminate (gas barrier layer (1 µm)/AC layer/OPA layer (15 µm)/AC layer/gas barrier layer (1 µm)) with gas barrier layers that were colorless and transparent and had a good appearance was obtained (hereinafter, this laminate may be referred to as a "laminate (2)").

Next, calcium acetate was dissolved in distilled water so that the concentration thereof was 10 wt %. This aqueous solution was kept warm at 80° C. Then, the laminate (2)

obtained above was immersed in this aqueous solution (80° C.; MI-1) for approximately 300 seconds. Thereafter, this laminate was removed therefrom. Then the surfaces of the laminate were washed with distilled water whose temperature had been adjusted to 80° C. After that, it was dried at 80° C. for five minutes. Thus, a laminate (B-2) of the present invention was obtained. With respect to the laminate (B-2), the neutralization degree of the carboxyl groups of the polyacrylic acid contained in the gas barrier layers was determined by the aforementioned method. As a result, it was proved that 96 mol % of the carboxyl groups had been neutralized by calcium ions.

A polypropylene film (RXC-18 (trade name) with a thickness of 50 µm, manufactured by Tohcello Co., Ltd.; hereinafter may be abbreviated as "PP") was coated with a two-component adhesive (A-385 (trade name) and A-50 (trade name), manufactured by Mitsui Takeda Chemicals, Inc.), which was then dried. This was laminated on one surface of the above-mentioned laminate (B-2: gas barrier layer/AC/OPA/AC/gas barrier layer) that had been subjected to printing by the gravure process. Thus, a laminate (B-2-1) was obtained having a structure of gas barrier layer/AC layer/OPA layer/AC layer/gas barrier layer/printed layer/adhesive layer/PP. The laminate was cut out into a predetermined shape and thereby a cover member was obtained. The oxygen transmission rate that the cover member exhibited under high humidity showed a very good value, specifically 0.14 cm$^3$/m$^2$·day·atm. Furthermore, the oxygen transmission rate obtained after bending was 0.15 cm$^3$/m$^2$·day·atm, and the decrease in oxygen transmission rate was hardly observed as compared to that obtained before bending.

EXAMPLE 6-3

Polyacrylic acid (PAA) with a number average molecular weight of 150,000 was dissolved in distilled water and thereby a polyacrylic acid aqueous solution (S3) was obtained that had a solid content concentration of 10 wt %.

Hereinafter, the same operation as in Example 6-1 was carried out except that the solution (S3) was used instead of the solution (S1). Thus, a laminate (3) with gas barrier layers that were colorless and transparent and had a good appearance was obtained.

Next, calcium acetate was dissolved in distilled water so that the concentration thereof was 10 wt %. This aqueous solution was kept warm at 80° C. Then the laminate (3) obtained above was immersed in this aqueous solution (80° C.; MI-1) for approximately 300 seconds. Thereafter, this laminate was removed therefrom. Then the surfaces of the laminate were washed with distilled water whose temperature had been adjusted to 80° C. After that, it was dried at 80° C. for five minutes. Thus, a laminate (B-3) of the present invention was obtained. With respect to the laminate (B-3), the neutralization degree of the carboxyl groups of the polyacrylic acid contained in the gas barrier layers was determined by the aforementioned method. As a result, it was proved that 95 mol % of the carboxyl groups had been neutralized by calcium ions.

Hereinafter, the same operation as in Example 6-1 was carried out except that the laminate (B-3) was used instead of the laminate (B-1) of Example 6-1. Thus, a cover member was obtained.

The oxygen transmission rate that the cover member exhibited under high humidity showed a good value, specifically 1.5 cm$^3$/m$^2$·day·atm. Furthermore, the oxygen transmission rate obtained after bending was 2.8 cm$^3$/m$^2$·day·atm.

EXAMPLE 7-1

Polyacrylic acid (PAA) with a number average molecular weight of 150,000 was dissolved in distilled water. Thereafter, ammonia water was added thereto to neutralize 1.5 mol % of carboxyl groups of the polyacrylic acid. Thus a polyacrylic acid aqueous solution was obtained that had a solid content concentration of 10 wt %.

Next, 68.4 parts by weight of tetramethoxysilane (TMOS) was dissolved in 82.0 parts by weight of methanol. Subsequently, 13.6 parts by weight of gamma-glycidoxypropyltrimethoxysilane was dissolved therein. Thereafter, 5.13 parts by weight of distilled water and 12.7 parts by weight of 0.1N (0.1 normal) hydrochloric acid were added thereto. Thus, a sol was prepared. This was allowed to undergo hydrolysis and condensation reactions at 10° C. for one hour while being stirred. The sol thus obtained was diluted with 185 parts by weight of distilled water, which then was added promptly to 634 parts by weight of the above-mentioned 10-wt % polyacrylic acid aqueous solution that was being stirred. Thus a solution (S1) was obtained.

On the other hand, an oriented PET film (OPET; Lumirror (trade name), manufactured by Toray Industries, Inc.) was coated with a two-component anchor coating agent (AC; Takelac A626 (trade name) and Takenate A50 (trade name), manufactured by Mitsui Takeda Chemicals, Inc., which then was dried. Thus a substrate (AC/OPET) having an anchor coating layer was produced. The anchor coating layer of the substrate was coated with the solution (S1) using a bar coater in such a manner that the solution (S1) formed a layer with a thickness of 1 µm after being dried. This was dried at 80° C. for five minutes. The opposite surface of the oriented PET film also was coated with the anchor coating agent and the solution (S1) in the same manner. Thereafter, it further was heat-treated in dry air at 200° C. for five minutes. Thus, a laminate (gas barrier layer (1 µm)/AC layer/OPET layer (12 µm)/AC layer/gas barrier layer (1 µm)) with gas barrier layers that were colorless and transparent and had a good appearance was obtained (hereinafter, this laminate may be referred to as a "laminate (1)").

Next, calcium acetate was dissolved in distilled water so that the concentration thereof was 10 wt %. This aqueous solution was kept warm at 80° C. Then, the laminate (1) obtained above was immersed in this aqueous solution (80° C.; MI-1) for approximately 300 seconds. Thereafter, this laminate was removed therefrom. Then the surfaces of the laminate were washed with distilled water whose temperature had been adjusted to 80° C. After that, it was dried at 80° C. for five minutes. Thus, a gas barrier laminate (B-1) used in the present invention was obtained. With respect to the gas barrier laminate (B-1), the neutralization degree of the carboxyl groups of the polyacrylic acid contained in the gas barrier layers was determined by the aforementioned method. As a result, it was proved that 96 mol % of the carboxyl groups had been neutralized by calcium ions.

An oriented polyamide film (Emblem (trade name) with a thickness of 15 µm, manufactured by Unitika, Ltd.; hereinafter may be abbreviated as "OPA") and a polypropylene film (RXC-18 (trade name) with a thickness of 50 µm, manufactured by Tohcello Co., Ltd.; hereinafter may be abbreviated as "PP") each were coated with a two-component adhesive (A-385 (trade name) and A-50 (trade name), manufactured by Mitsui Takeda Chemicals, Inc.), which were then dried. Thereafter, the OPA film, the PP film, and the laminate (B-1)

were laminated so as to form a structure of gas barrier layer/ AC layer/OPET layer/AC layer/gas barrier layer/printed layer/adhesive layer/OPA layer/adhesive layer/PP layer. Thus a laminate (B-1-1) was obtained. From this laminate, two sheets of a rectangular laminate of 15 cm×30 cm were cut out and were placed on top of each other, with the PP layers thereof being located on the inner side. Thereafter, three sides of the rectangle were heat-sealed. In this heat-sealed bag, corn on the cob was packaged, air inside the packaging bag was expelled, and the remaining side was heat-sealed. The sweet corn on the cob was vacuum-packaged, with the packaging bag being in close contact with it along the contour thereof. Thereafter, it was retort-processed at 130° C. for 30 minutes. After that, a sample for oxygen transmission rate measurement was cut out from the vacuum packaging bag. It exhibited a very good value, specifically the oxygen transmission rate at 20° C. and 85% RH or 100% RH was 0.10 cm$^3$/m$^2$·day·atm.

EXAMPLE 7-2

On the other hand, an oriented polyamide film (Emblem (trade name) with a thickness of 15 μm, manufactured by Unitika, Ltd.) was coated with a two-component anchor coating agent (AC; Takelac A626 (trade name) and Takenate A50 (trade name), manufactured by Mitsui Takeda Chemicals, Inc., which then was dried. Thus a substrate (AC/OPA) having an anchor coating layer was produced. The anchor coating layer of the substrate was coated with the solution (S1) obtained in Example 7-1 using a bar coater in such a manner that the solution (S1) formed a layer with a thickness of 1 μm after being dried. This was then dried at 80° C. for five minutes. The opposite surface of the oriented polyamide film also was coated with the anchor coating agent and the solution (S1) in the same manner. Thereafter, it further was heat-treated in dry air at 200° C. for five minutes. Thus, a laminate (gas barrier layer (1 μm)/AC layer/OPA layer (15 μm)/AC layer/gas barrier layer (1 μm)) with gas barrier layers that were colorless and transparent and had a good appearance was obtained (hereinafter, this laminate may be referred to as a "laminate (2)").

Next, calcium acetate was dissolved in distilled water so that the concentration thereof was 10 wt %. This aqueous solution was kept warm at 80° C. Then, the laminate (2) obtained above was immersed in this aqueous solution (80° C.; MI-1) for approximately 300 seconds. Thereafter, this laminate was removed therefrom. Then the surfaces of the laminate were washed with distilled water whose temperature had been adjusted to 80° C. After that, it was dried at 80° C. for five minutes. Thus, a gas barrier laminate (B-2) used in the present invention was obtained. With respect to the laminate (B-2), the neutralization degree of the carboxyl groups of the polyacrylic acid contained in the gas barrier layers was determined by the aforementioned method. As a result, it was proved that 98 mol % of the carboxyl groups had been neutralized by calcium ions.

A polypropylene film (RXC-18 (trade name) with a thickness of 50 μm, manufactured by Tohcello Co., Ltd.; hereinafter may be abbreviated as "PP") was coated with a two-component adhesive (A-385 (trade name) and A-50 (trade name), manufactured by Mitsui Takeda Chemicals, Inc.), which was then dried. Thereafter, the PP film and the laminate (B-2; gas barrier layer/AC layer/OPA layer/AC layer/gas barrier layer) were laminated together so as to form a structure of gas barrier layer/AC layer/OPA layer/AC layer/gas barrier layer/adhesive layer/PP layer. Thus a laminate (B-2-1) was obtained. From this laminate, two sheets of a rectangular laminate of 15 cm×30 cm were cut out and were placed on top of each other, with the PP layers thereof being located on the inner side. Thereafter, three sides of the rectangle were heat-sealed. In this heat-sealed bag, corn on the cob was packaged, air inside the packaging bag was expelled, and the remaining side was heat-sealed. The sweet corn on the cob was vacuum-packaged, with the packaging bag being in close contact with it along the contour thereof. Thereafter, it was retort-processed at 130° C. for 30 minutes. After that, samples for oxygen transmission rate measurement and a tensile test were cut out from the vacuum packaging bag. It exhibited a further better value than that in Example 7-1, specifically the oxygen transmission rate at 20° C. and 85% RH or 100% RH was 0.02 cm$^3$/m$^2$·day·atm. Moreover, the tensile rupture strength was 65 kgf/mm$^2$, and the tensile elongation at break was 100%. Similarly, the sample cut out from the vacuum packaging bag that had not been retort-processed yet also was measured for the tensile rupture strength and the tensile elongation at break. As a result, the tensile rupture strength was 65 kgf/mm$^2$, and the tensile elongation at break was 120%, under an atmosphere of 50% RH at 23° C. The tensile rupture strength and the tensile elongation at break obtained before and after the retort process remained at the same level. The same operation as in Example 7-2 was carried out except that the OPA layer alone was used instead of the laminate (B-2-1) in Example 7-2. The sample obtained before the retort process and a sample that had been retort-processed at 120° C. or higher under a condition that a biaxially-oriented nylon film was in direct contact with retort process water also were measured for the tensile rupture strength and the tensile elongation at break in the same manner. As a result, the sample obtained before the retort process had a tensile rupture strength of 65 kgf/mm$^2$ and a tensile elongation at break of 105%, while the sample that had been retort-processed had a tensile rupture strength of 39 kgf/mm$^2$ and a tensile elongation at break of 27%. The dynamic or mechanical properties were degraded considerably after the retort process. Accordingly, it can be understood that coating with the gas barrier layers of the present invention prevents the dynamic or mechanical properties from being degraded by the retort process.

EXAMPLE 7-3

Polyacrylic acid (PAA) with a number average molecular weight of 150,000 was dissolved in distilled water and thereby a polyacrylic acid aqueous solution (S4) was obtained that had a solid content concentration of 10 wt %.

Hereinafter, the same operation as in Example 7-1 was carried out except that the solution (S3) was used instead of the solution (S1). Thus, a laminate (3) with gas barrier layers that were colorless and transparent and had a good appearance was obtained.

Next, calcium acetate was dissolved in distilled water so that the concentration thereof was 10 wt %. This aqueous solution was kept warm at 80° C. Then the laminate (3) obtained above was immersed in this aqueous solution (80° C.; MI-1) for approximately 300 seconds. Thereafter, this laminate was removed therefrom. Then the surfaces of the laminate were washed with distilled water whose temperature had been adjusted to 80° C. After that, it was dried at 80° C. for five minutes. Thus, a laminate (B-3) of the present invention was obtained. With respect to the laminate (B-3), the neutralization degree of the carboxyl groups of the polyacrylic acid contained in the gas barrier layers was determined by the aforementioned method. As a result, it was proved that 95 mol % of the carboxyl groups had been neutralized by calcium ions.

Hereinafter, the same operation as in Example 7-1 was carried out except that the laminate (B-3) was used instead of the laminate (B-1) of Example 7-1, and a bag whose three sides had been heat-sealed was produced. In this heat-sealed bag, corn on the cob was packaged, air inside the packaging bag was expelled, and the remaining side was heat-sealed. The sweet corn on the cob was vacuum-packaged, with the packaging bag being in close contact with it along the contour thereof. Thereafter, it was retort-processed at 130° C. for 30 minutes. After that, a sample for oxygen transmission rate measurement was cut out from the vacuum packaging bag. It exhibited a very good value, specifically the oxygen transmission rate at 20° C. and 85% RH or 100% RH was 3.3 $cm^3/m^2 \cdot day \cdot atm$.

EXAMPLE 8-1

Polyacrylic acid (PAA) with a number average molecular weight of 150,000 was dissolved in distilled water. Thereafter, ammonia water was added thereto to neutralize 1.5 mol % of carboxyl groups of the polyacrylic acid. Thus a polyacrylic acid aqueous solution was obtained that had a solid content concentration of 10 wt %.

Next, 68.4 parts by weight of tetramethoxysilane (TMOS) was dissolved in 82.0 parts by weight of methanol. Subsequently, 13.6 parts by weight of gamma-glycidoxypropyltrimethoxysilane was dissolved therein. Thereafter, 5.13 parts by weight of distilled water and 12.7 parts by weight of 0.1N (0.1 normal) hydrochloric acid were added thereto. Thus, a sol was prepared. This was allowed to undergo hydrolysis and condensation reactions at 10° C. for one hour while being stirred. The sol thus obtained was diluted with 185 parts by weight of distilled water, which then was added promptly to 634 parts by weight of the above-mentioned 10-wt % polyacrylic acid aqueous solution that was being stirred. Thus a solution (S1) was obtained.

On the other hand, an oriented PET film (OPET; Lumirror (trade name), manufactured by Toray Industries, Inc.) was coated with a two-component anchor coating agent (AC; Takelac A626 (trade name) and Takenate A50 (trade name), manufactured by Mitsui Takeda Chemicals, Inc., which then was dried. Thus a substrate (AC/OPET) having an anchor coating layer was produced. The anchor coating layer of the substrate was coated with the solution (S1) using a bar coater in such a manner that the solution (S1) formed a layer with a thickness of 1 μm after being dried. This was dried at 80° C. for five minutes. The opposite surface of the oriented PET film also was coated with the anchor coating agent and the solution (S1) in the same manner. Thereafter, it further was heat-treated in dry air at 200° C. for five minutes. Thus, a laminate (gas barrier layer (1 μm)/AC layer/OPET layer (12 μm)/AC layer/gas barrier layer (1 μm)) with gas barrier layers that were colorless and transparent and had a good appearance was obtained (hereinafter, this laminate may be referred to as a "laminate (1)").

Next, calcium acetate was dissolved in distilled water so that the concentration thereof was 10 wt %. This aqueous solution was kept warm at 80° C. Then, the laminate (1) obtained above was immersed in this aqueous solution (80° C.; MI-1) for approximately 300 seconds. Thereafter, this laminate was removed therefrom. Then the surfaces of the laminate were washed with distilled water whose temperature had been adjusted to 80° C. After that, it was dried at 80° C. for five minutes. Thus, a laminate (B-1) of the present invention was obtained. With respect to the laminate (B-1), the neutralization degree of the carboxyl groups of the polyacrylic acid contained in the gas barrier layers was determined by the aforementioned method. As a result, it was proved that 95 mol % of the carboxyl groups had been neutralized by calcium ions.

Figure 7:
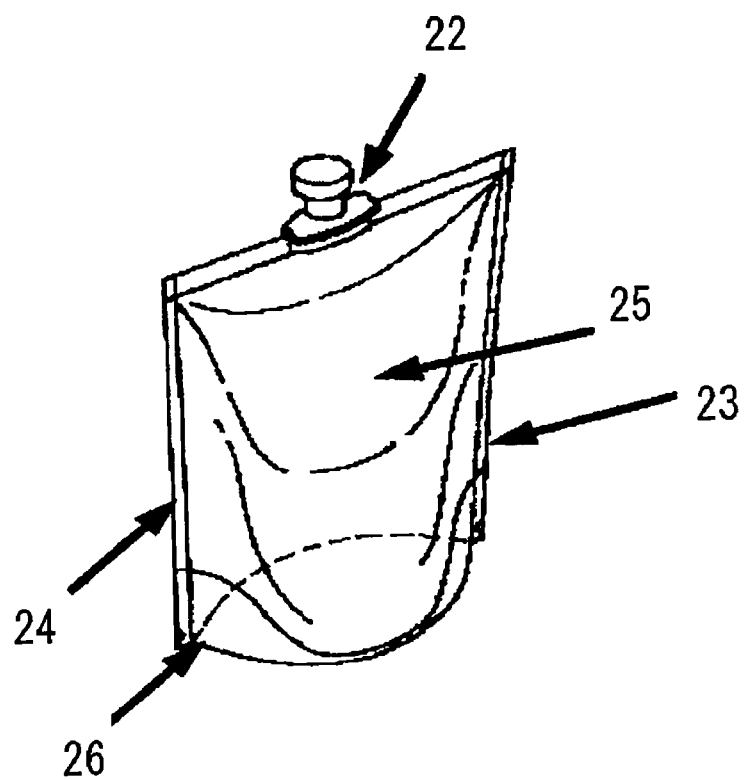
FIG. 7 is a diagram showing an embodiment (in a standing form) of a pouch with a spout according to the present invention.
Figure 8:
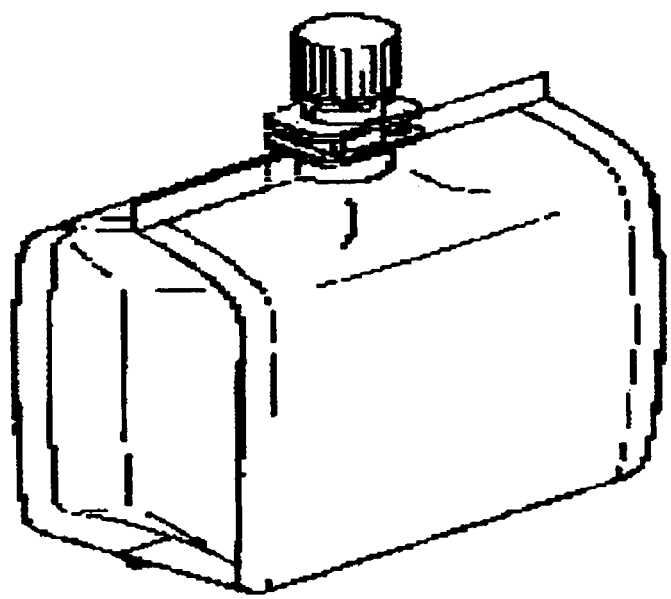
FIG. 8 is a diagram showing an embodiment (in a pillow form) of a pouch with a spout according to the present invention.

An oriented polyamide film (Emblem (trade name) with a thickness of 15 μm, manufactured by Unitika, Ltd.; hereinafter may be abbreviated as "OPA") and a polypropylene film (RXC-18 (trade name) with a thickness of 50 μm, manufactured by Tohcello Co., Ltd.; hereinafter may be abbreviated as "PP") each were coated with a two-component adhesive (A-385 (trade name) and A-50 (trade name), manufactured by Mitsui Takeda Chemicals, Inc.), which were then dried. They were laminated together with the above-mentioned laminate (B-1: gas barrier layer/AC/OPET). Thus, a laminate (B-1-1) was obtained having a structure of gas barrier layer/AC/OPET/adhesive/OPA/adhesive/PP. Two sheets of the laminate, gas barrier layer/AC/OPET/adhesive/OPA/adhesive/PP (laminate B-1-1), were cut out into the shape of the pouch with a spout shown in FIG. 7 by a common method. Subsequently, the two sheets of the laminate (B-1-1) were placed on top of each other and the peripheries of the sheets that had been cut out in the shape of the pouch with a spout were heat-sealed. Thereafter, a spout made of polypropylene was attached thereto by heat seal. Thus a pouch with a spout was obtained.

With respect to the pouch with a spout thus obtained, the appearance observed after the retort sterilization process and oxygen barrier properties were evaluated and a bag drop breakage test was carried out, by the methods described above. No change in appearance occurred as compared to that observed before the process under both the retort sterilization process conditions of 110° C. for 30 minutes and 135° C. for 30 minutes. That is, the transparency was maintained, and occurrence of bag breakage, crease, or blocking was not observed. The oxygen transmission rates obtained under the aforementioned measurement conditions showed very good results, specifically the oxygen transmission rate obtained after the retort sterilization process carried out at 110° C. for 30 minutes was 0.2 $cm^3/m^2 \cdot day \cdot atm$ and the oxygen transmission rate obtained after the retort sterilization process carried out at 135° C. for 30 minutes was 0.1 $cm^3/m^2 \cdot day \cdot atm$. In the appearance evaluation carried out after the bag drop breakage test, no bag breakage was observed (evaluation result: ◯).

EXAMPLE 8-2

Polyacrylic acid (PAA) with a number average molecular weight of 150,000 was dissolved in distilled water. Thereafter, ammonia water was added thereto to neutralize 1.5 mol % of carboxyl groups of the polyacrylic acid. Thus a polyacrylic acid aqueous solution was obtained that had a solid content concentration of 10 wt %.

Next, 68.4 parts by weight of tetramethoxysilane (TMOS) was dissolved in 79.7 parts by weight of methanol. Subsequently, 11.3 parts by weight of 3-mercaptopropyltrimethoxysilane (manufactured by Chisso Corporation) was dissolved therein. Thereafter, 5.13 parts by weight of distilled water and 12.7 parts by weight of 0.1N hydrochloric acid were added thereto. Thus, a sol was prepared. This was allowed to undergo hydrolysis and condensation reactions at 10° C. for one hour while being stirred. The sol thus obtained was diluted with 189 parts by weight of distilled water, which then was added promptly to 658 parts by weight of the above-mentioned 10-wt % polyacrylic acid aqueous solution that was being stirred. Thus a solution (S2) was obtained.

On the other hand, an oriented PET film (OPET; Lumirror (trade name), manufactured by Toray industries, Inc.) was coated with a two-component anchor coating agent (AC; Takelac A626 (trade name) and Takenate A50 (trade name), manufactured by Mitsui Takeda Chemicals, Inc.), which then was dried. Thus a substrate (AC/OPET) having an anchor coating layer was produced. The anchor coating layer of the substrate was coated with the solution (S2) using a bar coater in such a manner that the solution (S2) formed a layer with a thickness of 1 µm after being dried. This was dried at 80° C. for five minutes. The opposite surface of the oriented PET film also was coated with the anchor coating agent and the solution (S2) in the same manner. Thereafter, it further was heat-treated in dry air at 200° C. for five minutes. Thus, a laminate (gas barrier layer (1 µm)/AC layer/OPET layer (12 µm)/AC layer/gas barrier layer (1 µm)) with gas barrier layers that were colorless and transparent and had a good appearance was obtained (hereinafter, this laminate may be referred to as a "laminate (2)").

Next, calcium acetate was dissolved in distilled water so that the concentration thereof was 10 wt %. This aqueous solution was kept warm at 80° C. The laminate (1) obtained above was then immersed in this aqueous solution (80° C.; MI-2) for approximately 300 seconds. Thereafter, this laminate was removed therefrom. Then the surfaces of the laminate were washed with distilled water whose temperature had been adjusted to 80° C. After that, it was dried at 80° C. for five minutes. Thus, a laminate (B-2) of the present invention was obtained. With respect to the laminate (B-2), the neutralization degree of the carboxyl groups of the polyacrylic acid contained in the gas barrier layers was determined by the aforementioned method. As a result, it was proved that 99 mol % of the carboxyl groups had been neutralized by calcium ions.

An oriented polyamide film (Emblem (trade name) with a thickness of 15 µm, manufactured by Unitika, Ltd.; hereinafter may be abbreviated as "OPA") and a polypropylene film (RXC-18 (trade name) with a thickness of 50 µm, manufactured by Tohcello Co., Ltd.; hereinafter may be abbreviated as "PP") each were coated with a two-component adhesive (A-385 (trade name) and A-50 (trade name), manufactured by Mitsui Takeda Chemicals, Inc.), which were then dried. They were laminated together with the above-mentioned laminate (B-2: gas barrier layer/AC/OPET). Thus, a laminate (B-2-1) was obtained having a structure of gas barrier layer/AC/OPET/adhesive/OPA/adhesive/PP. Two sheets of the laminate, gas barrier layer/AC/OPET/adhesive/OPA/adhesive/PP (laminate B-2-1), were cut out into the shape of the pouch with a spout shown in FIG. 7 by a common method. Subsequently, the two sheets of the laminate (B-2-1) were placed on top of each other and the peripheries of the sheets that had been cut out in the shape of the pouch with a spout were heat-sealed. Thereafter, a spout made of polypropylene was attached thereto by heat seal. Thus a pouch with a spout was obtained.

With respect to the pouch with a spout thus obtained, the appearance observed after the retort sterilization process and oxygen barrier properties were evaluated and a bag drop breakage test was carried out, by the methods described above. No change in appearance occurred as compared to that observed before the process under both the retort sterilization process conditions of 110° C. for 30 minutes and 135° C. for 30 minutes. That is, the transparency was maintained, and occurrence of bag breakage, crease, or blocking was not observed. The oxygen transmission rates obtained under the aforementioned measurement conditions showed very good results, specifically the oxygen transmission rate obtained after the retort sterilization process carried out at 110° C. for 30 minutes was 0.3 cm$^3$/m$^2$·day·atm and the oxygen transmission rate obtained after the retort sterilization process carried out at 135° C. for 30 minutes was 0.3 cm$^3$/m$^2$·day·atm. In the appearance evaluation carried out after the bag drop breakage test, no bag breakage was observed (evaluation result: ○).

COMPARATIVE EXAMPLE 8-1

An oriented polyamide film (Emblem (trade name) with a thickness of 15 µm, manufactured by Unitika, Ltd.; hereinafter may be abbreviated as "OPA") and a polypropylene film (RXC-18 (trade name) with a thickness of 50 µm, manufactured by Toheello Co., Ltd.; hereinafter may be abbreviated as "PP") each were coated with a two-component adhesive (A-385 (trade name) and A-50 (trade name), manufactured by Mitsui Takeda Chemicals, Inc.), which were then dried. They were laminated together with an aluminum deposited, oriented PET film (VM-PET) (E7471, manufactured by Toyobo Co., Ltd.). Thus, a laminate (C-3) was obtained having a structure of VM-PET/adhesive/OPA/adhesive/PP. Two sheets of the laminate of VM-PET/adhesive/OPA/adhesive/PP (laminate C-3) were cut out into the shape of the pouch with a spout shown in FIG. 7 by a common method. Subsequently, the two sheets of the laminate (C-3) were placed on top of each other and the peripheries of the sheets that had been cut out in the shape of the pouch with a spout were heat-sealed. Thereafter, a spout made of polypropylene was attached thereto by heat seal. Thus a pouch with a spout was obtained.

With respect to the pouch with a spout thus obtained, the appearance observed after the retort sterilization process and oxygen barrier properties were evaluated and a bag drop breakage test was carried out, by the methods described above. No change in appearance occurred as compared to that observed before the process under the retort sterilization process condition of 110° C. for 30 minutes. That is, the transparency was maintained, and occurrence of bag breakage, crease, or blocking was not observed. However, a phenomenon of whitening was observed as compared to the appearance observed before the process under the retort sterilization process condition of 135° C. for 30 minutes. With respect to the oxygen transmission rates obtained under the aforementioned measurement conditions, the oxygen transmission rate obtained after the retort sterilization process carried out at 110° C. for 30 minutes was 2.0 cm$^3$/m$^2$·day·atm and the oxygen transmission rate obtained after the retort sterilization process carried out at 135° C. for 30 minutes was 3.0 cm$^3$/m$^2$·day·atm. In the appearance evaluation carried out after the bag drop breakage test, the water of the content leaked from an edge portion of the sealed part of the pouch side wall face (evaluation result: X).

EXAMPLE 8-3

Polyacrylic acid (PAA) with a number average molecular weight of 150,000 was dissolved in distilled water. Thereafter, ammonia water was added thereto to neutralize 1.5 mol % of carboxyl groups of the polyacrylic acid. Thus a polyacrylic acid aqueous solution (S3) was obtained that had a solid content concentration of 10 wt %.

Hereinafter, the same operation as in Example 8-1 was carried out except that the solution (S3) was used instead of the solution (S1). Thus, a laminate (3) with gas barrier layers that were colorless and transparent and had a good appearance was obtained.

Next, calcium acetate was dissolved in distilled water so that the concentration thereof was 10 wt %. This aqueous solution was kept warm at 80° C. Then the laminate (3)

obtained above was immersed in this aqueous solution (80° C.; MI-1) for approximately 300 seconds. Thereafter, this laminate was removed therefrom. Then the surfaces of the laminate were washed with distilled water whose temperature had been adjusted to 80° C. After that, it was dried at 80° C. for five minutes. Thus, a laminate (B-3) of the present invention was obtained. With respect to the laminate (B-3), the neutralization degree of the carboxyl groups of the polyacrylic acid contained in the gas barrier layers was determined by the aforementioned method. As a result, it was proved that 95 mol % of the carboxyl groups had been neutralized by calcium ions.

Hereinafter, the same operation as in Example 8-1 was carried out except that the laminate (B-3) was used instead of the laminate (B-1) of Example 8-1. Thus a pouch with a spout was obtained.

With respect to the pouch with a spout thus obtained, the appearance observed after the retort sterilization process and oxygen barrier properties were evaluated and a bag drop breakage test was carried out, by the methods described above. No change in appearance occurred as compared to that observed before the process under both the retort sterilization process conditions of 110° C. for 30 minutes and 135° C. for 30 minutes. That is, the transparency was maintained, and occurrence of bag breakage, crease, or blocking was not observed. The oxygen transmission rates obtained under the aforementioned measurement conditions showed very good results, specifically the oxygen transmission rate obtained after the retort sterilization process carried out at 110° C. for 30 minutes was 1.2 cm$^3$/m$^2$·day·atm and the oxygen transmission rate obtained after the retort sterilization process carried out at 135° C. for 30 minutes was 1.6 cm$^3$/m$^2$·day·atm. In the appearance evaluation carried out after the bag drop breakage test, no bag breakage was observed (evaluation result: ○).

INDUSTRIAL APPLICABILITY

The present invention relates to a paper container with excellent gas barrier properties that has a window through which the content can be checked. The paper container can be produced easily, can prevent the content from deteriorating for a long period of time, is excellent in, for example, storage and preservation properties, and causes, for example, less degradation in storage properties during transportation. The present invention also relates to a retort paper container that can be subjected to a retort sterilization process and has excellent gas barrier properties. The retort paper container can prevent the content from deteriorating for a long period of time, and is excellent in, for example, storage and preservation properties.

EXPLANATION OF NUMERALS

1 Paper container with a window
2 Side wall
3 Window
4 Cutout part
5 Paper layer
6 LDPE layer
7 Gas barrier layer
8 Base (PET) layer
9 Gas barrier laminate of the present invention
10 Vacuum heat insulator
11 Packaging material composed of a laminate disclosed in Example 3-1
12 Core material formed of open-cell urethane foam
13 Vacuum heat insulator
14 Packaging material composed of a laminate disclosed in Example 3-2
15 Core material formed of fine silica powder
16 Vacuum heat insulator
17 Packaging material composed of a laminate disclosed in Comparative Example 3-1
18 Core material formed of open-cell urethane foam
19 Spout member
20 Infusion bag
21 Peripheral sealing portion of an infusion bag
22 Spout member
23 Pouch with a spout part
24 Peripheral sealing portion of a pouch with a spout part
25 Side wall of a pouch with a spout part
26 Edge part of a sealing portion of a pouch with a spout part

The invention claimed is:

1. A paper container having a window and being formed of a laminate that comprises at least a paper layer, a gas barrier laminate, and a polypropylene layer,
the paper layer having a cutout part for the window,
the cutout part being hollow and covered on an inner side and/or an outer side with the gas barrier laminate, and
the gas barrier laminate comprising a substrate and a gas barrier layer laminated on at least one surface of the substrate,
wherein the gas barrier layer is formed of a composition comprising:
a polymer having at least one functional group selected from a carboxyl group and a carboxylic anhydride group, wherein at least 40 mol % of a —COO— group contained in the at least one functional group has been neutralized with a metal ion having a valence of two or more; and
a hydrolysis condensation product of at least one compound (L) containing a metal atom to which at least one characteristic group selected from a halogen atom and an alkoxy group has been bonded, wherein the compound (L) comprises:
at least one compound (A) represented by the following Chemical Formula (I):

$$M^1(OR^1)_n X^1_k Z_{m-n-k} \qquad (I),$$

where $M^1$ represents Si, Al, Ti, Zr, Cu, Ca, Sr, Ba, Zn, B, Ga, Y, Ge, Pb, P, Sb, V, Ta, W, La, or Nd, $R^1$ represents an alkyl group, $X^1$ represents a halogen atom, Z represents an alkyl group having a substituted functional group reactive with a carboxyl group, m is equal to a valence of $M^1$, n is an integer of 0 to (m−1), k is an integer of 0 to (m−1), and 1≤n+k≤(m−1); and
at least one compound (B) represented by the following Chemical Formula (II):

$$M^2(OR^2)_q R^3_{p-q-r} X^2_r \qquad (II)$$

where $M^2$ represents Si, Al, Ti, Zr, Cu, Ca, Sr, Ba, Zn, B, Ga, Y, Ge, Pb, P, Sb, V, Ta, W, La, or Nd, $R^2$ represents an alkyl group, $R^3$ represents an alkyl group, an aralkyl group, an aryl group, or an alkenyl group, $X^2$ represents a halogen atom, p is equal to a valence of $M^2$, q is an integer of 0 to p, r is an integer of 0 to p, and 1≤q+r≤p, and
wherein a molar ratio of the compound (A) / the compound (B) is from 0.5/99.5 to 40/60.

2. The paper container according to claim 1, wherein in Chemical Formula (I), the substituted functional group reactive with a carboxyl group is at least one functional group selected from the group consisting of an epoxy group, an amino group, a halogen group, a mercapto group, an isocyanate group, a ureide group, and a hydroxyl group.

3. The paper container according to claim 1, wherein the polymer is at least one polymer selected from a polyacrylic acid and a polymethacrylic acid.

4. The paper container according to claim 1, wherein the metal ion is at least one ion selected from the group consisting of a calcium ion, a magnesium ion, a barium ion, and a zinc ion.

5. The paper container according to claim 1, wherein the gas barrier laminate further comprises a layer formed of an inorganic material obtained by a vapor deposition method, between the substrate and the layer laminated on at least one surface of the substrate.

6. The paper container according to claim 1, wherein a part other than the cutout part of the paper layer consists essentially of a paper layer, a gas barrier laminate and at least one polyolefin layer.

7. The paper container according to claim 1, the cutout part being hollow, uncovered on the outer side, and covered on the inner side with the gas barrier laminate.

8. The paper container according to claim 1, the cutout part being hollow, uncovered on the inner side, and covered on the outer side with the gas barrier laminate.

9. The paper container according to claim 1, the cutout part being hollow and covered on the inner side and the outer side with the gas barrier laminate.

10. A retort paper container comprising a paper layer, a heat-resistant polyolefin layer, and a gas barrier laminate,
wherein the heat-resistant polyolefin layer is non-stretched and arranged as an innermost layer,
wherein the gas barrier laminate comprises a substrate and a gas barrier layer laminated on at least one surface of the substrate,
wherein the gas barrier layer is formed of a composition comprising:
a polymer having at least one functional group selected from a carboxyl group and a carboxylic anhydride group, wherein at least 40 mol % of a —COO— group contained in the at least one functional group has been neutralized with a metal ion having a valence of two or more; and
a hydrolysis condensation product of at least one compound (L) containing a metal atom to which at least one characteristic group selected from a halogen atom and an alkoxy group has been bonded, wherein the compound (L) comprises:
at least one compound (A) represented by the following Chemical Formula (I):

  (I), where $M^1$ represents Si, Al, Ti, Zr, Cu, Ca, Sr, Ba, Zn, B, Ga, Y, Ge, Pb, P, Sb, V, Ta, W, La, or Nd, $R^1$ represents an alkyl group, $X^1$ represents a halogen atom, Z represents an alkyl group having a substituted functional group reactive with a carboxyl group, m is equal to a valence of $M^1$, n is an integer of 0 to (m−1), k is an integer of 0 to (m−1), and 1≤n+k≤(m−1); and at least one compound (B) represented by the following Chemical Formula (II):

  (II)

where $M^2$ represents Si, Al, Ti, Zr, Cu, Ca, Sr, Ba, Zn, B, Ga, Y, Ge, Pb, P, Sb, V, Ta, W, La, or Nd, $R^2$ represents an alkyl group, $R^3$ represents an alkyl group, an aralkyl group, an aryl group, or an alkenyl group, $X^2$ represents a halogen atom, p is equal to a valence of $M^2$, q is an integer of 0 to p, r is an integer of 0 to p, and 1≤q+r≤p, wherein a molar ratio of the compound (A)/the compound (B) is from 0.5/99.5 to 40/60, and wherein the retort paper container has an oxygen transmission rate of 3.2 cc/m²·day·atm or less after a retort process.

11. The retort paper container according to claim 10, wherein in Chemical Formula (I), the functional group reactive with a carboxyl group is at least one functional group selected from the group consisting of an epoxy group, an amino group, a halogen group, a mercapto group, an isocyanate group, a ureide group, and a hydroxyl group.

12. The retort paper container according to claim 10, wherein the polymer is at least one polymer selected from a polyacrylic acid and a polymethacrylic acid.

13. The retort paper container according to claim 10, wherein the metal ion is at least one ion selected from the group consisting of a calcium ion, a magnesium ion, a barium ion, and a zinc ion.

14. The retort paper container according to claim 10, wherein the gas barrier laminate further comprises a layer formed of an inorganic material obtained by a vapor deposition method, between the substrate and the layer laminated on at least one surface of the substrate.

15. The retort paper container according to claim 10, wherein the heat-resistant polyolefin layer is a polypropylene layer.

16. The retort paper container according to claim 10, wherein the retort paper container has a cutout part for a window, the cutout part being hollow and covered on an inner side and/or an outer side with at least the gas barrier layer.

17. The retort paper container according to claim 10, wherein the oxygen transmission rate is measured at 20° C. and 85% RH.

18. The retort paper container according to claim 10, wherein the retort process is carried out at 120° C. for 30 minutes.

19. The retort paper container according to claim 16, the cutout part being hollow, uncovered on the outer side, and covered on the inner side with the gas barrier laminate.

20. The retort paper container according to claim 16, the cutout part being hollow, uncovered on the inner side, and covered on the outer side with the gas barrier laminate.

21. The retort paper container according to claim 16, the cutout part being hollow and covered on the inner side and the outer side with the gas barrier laminate.

* * * * *